United States Patent
Ito et al.

(10) Patent No.: US 8,233,362 B2
(45) Date of Patent: Jul. 31, 2012

(54) INFORMATION RECORDING MEDIUM, METHOD FOR RECORDING INFORMATION ON INFORMATION RECORDING MEDIUM, METHOD FOR REPRODUCING INFORMATION FROM INFORMATION RECORDING MEDIUM AND METHOD FOR PRODUCING INFORMATION RECORDING MEDIUM

(75) Inventors: Kiyotaka Ito, Hyogo (JP); Mamoru Shoji, Osaka (JP); Yasumori Hino, Nara (JP); Atsushi Nakamura, Osaka (JP); Naoyasu Miyagawa, Hyogo (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/719,912

(22) Filed: Mar. 9, 2010

(65) Prior Publication Data

US 2010/0290326 A1 Nov. 18, 2010

Related U.S. Application Data

(60) Provisional application No. 61/158,775, filed on Mar. 10, 2009, provisional application No. 61/158,829, filed on Mar. 10, 2009, provisional application No. 61/231,342, filed on Aug. 5, 2009.

(51) Int. Cl.
*G11B 7/00* (2006.01)
(52) U.S. Cl. ............... 369/47.15; 369/59.11; 369/59.12; 369/116; 369/283
(58) Field of Classification Search ............... 369/59.11, 369/59.12, 47.15, 116, 283
See application file for complete search history.

(56) References Cited

U.S. PATENT DOCUMENTS 6,160,784 A * 12/2000 Maeda et al. ............... 369/116
(Continued)

FOREIGN PATENT DOCUMENTS

JP 2004-046966 2/2004
(Continued)

OTHER PUBLICATIONS

"Illustrated Blu-ray Disc Reader", published by Ohmsha, Ltd., pp. 136-137, Dec. 10, 2006 with a concise explanation (cited in the specification). White Paper, Blu-ray Disc Format, General, Aug. 2004, pp. 1-37 (cited in the specification).

(Continued)

*Primary Examiner* — Wayne Young
*Assistant Examiner* — Linh Nguyen
(74) *Attorney, Agent, or Firm* — Renner, Otto, Boisselle & Sklar, LLP

(57) ABSTRACT

The present invention provides a measure for getting read/write control information stored within a space of a predetermined size in a format that ensures compatibility with media of a lower order or an older generation even if the size of the read/write control information increases significantly as the storage densities of information storage media rise in the near future. On an information storage medium, a data sequence is writable as a combination of marks and spaces. The medium has at least one information storage layer, which has an information storage area to store information and a control information area for use to perform a read/write operation on the at least one information storage layer. The control information area stores at least one set of control information, which includes a first kind of write pulse information including information to be used as a reference value and a second kind of write pulse information including information to be used as an offset value. The size of the offset value is at least a half as large as that of the reference value.

18 Claims, 40 Drawing Sheets

U.S. PATENT DOCUMENTS

| | | | |
|---|---|---|---|
| 7,248,552 B2* | 7/2007 | Furumiya et al. | 369/53.13 |
| 2004/0052176 A1 | 3/2004 | Narumi et al. | |
| 2005/0058047 A1 | 3/2005 | Fujita et al. | |
| 2005/0105421 A1 | 5/2005 | Nijboer et al. | |
| 2005/0174906 A1* | 8/2005 | Narumi et al. | 369/47.53 |
| 2007/0127343 A1* | 6/2007 | Tseng et al. | 369/59.12 |
| 2011/0107134 A1 | 5/2011 | Ito | |

FOREIGN PATENT DOCUMENTS

| | | |
|---|---|---|
| JP | 2005-092942 | 4/2005 |
| JP | 2005-519418 | 6/2005 |
| JP | 2006-313621 | 11/2006 |

OTHER PUBLICATIONS

White Paper, Blu-ray Disc Format, 3. File System Specifications for BD-RE, R, ROM, Aug. 2004, pp. 1-6 (cited in the specification).

White Paper, Blu-ray Disc Format, 4. Key Technologies, Aug. 2004, pp. 1-8 (cited in the specification).

International Search Report for corresponding International Application No. PCT/JP2010/001557 mailed Jun. 15, 2010.

Form PCT/ISA/237 and partial English translation for International Application No. PCT/JP2010/001557 dated Jun. 15, 2010.

Co-pending U.S. Appl. No. 13/008,178, filed Dec. 20, 2010 (current claims and application provided).

* cited by examiner

*FIG.4*

| CONTENTS | | |
|---|---|---|
| HEADER INFORMATION | | |
| READ/ WRITE CONTROL INFOR- MATION | DISC CONTROL INFORMATION PART | |
| | POWER INFORMATION PART | Pw RELATED PARAMETERS |
| | | Ps RELATED PARAMETERS |
| | | Pc RELATED PARAMETERS |
| | | Pb RELATED PARAMETERS |
| | | OTHER KINDS OF INFORMATION |
| | WRITE PULSE INFORMATION PART | Tmp |
| | | dTtop AT RESPECTIVE MARK LENGTHS |
| | | Ttop AT RESPECTIVE MARK LENGTHS |
| | | Tlp AT RESPECTIVE MARK LENGTHS |
| | | dTs AT RESPECTIVE MARK LENGTHS |
| | | OTHER KINDS OF INFORMATION |
| FOOTER INFORMATION | | |

FIG.5
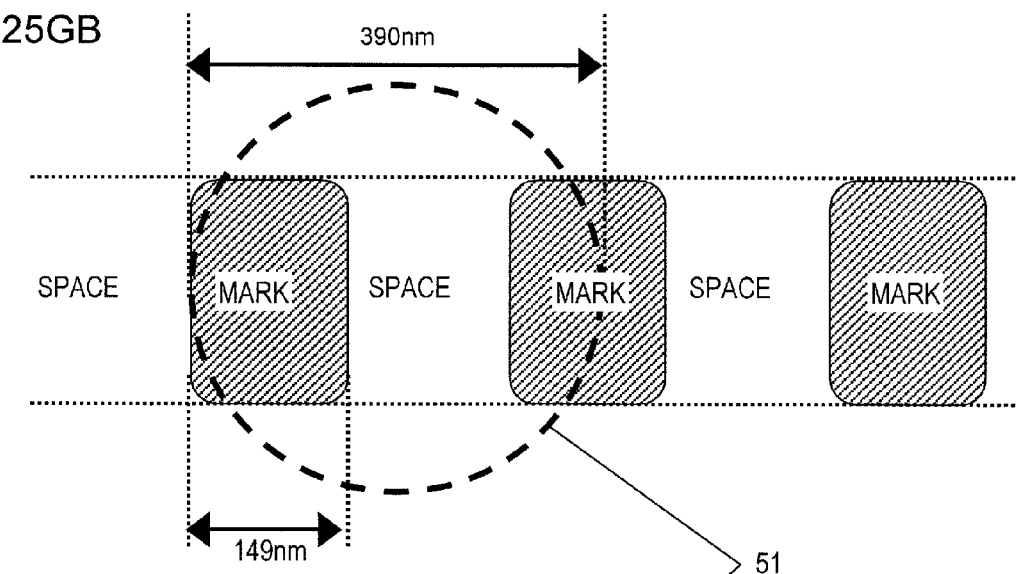
(a) 25GB
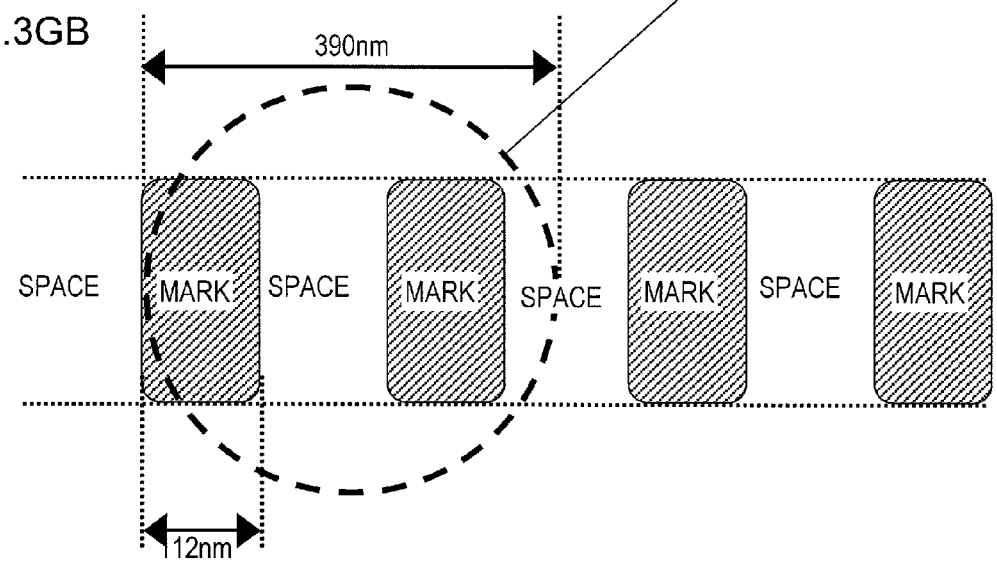
(b) 33.3GB

FIG.8

| CONTENTS | | | | | NUMBER OF Byte |
|---|---|---|---|---|---|
| HEADER INFORMATION (811) | | | | | 8Bytes |
| READ/ WRITE CONTROL INFOR- MATION (812) | DISC CONTROL INFORMATION PART (814) | | | | 28Bytes |
| | POWER INFORMATION PART (815) | | | | 20Bytes |
| | WRITE PULSE INFOR- MATION PART (816) | dTc (801) | ≧5T MARK | | 3Bytes |
| | | | 4T MARK | | |
| | | | 3T MARK | | |
| | | dTtop (802) | ≧4T MARK | PRECEDING ≧4T SPACE | 9Bytes |
| | | | | PRECEDING 3T SPACE | |
| | | | | PRECEDING 2T SPACE | |
| | | | 3T MARK | PRECEDING ≧4T SPACE | |
| | | | | PRECEDING 3T SPACE | |
| | | | | PRECEDING 2T SPACE | |
| | | | 2T MARK | PRECEDING ≧4T SPACE | |
| | | | | PRECEDING 3T SPACE | |
| | | | | PRECEDING 2T SPACE | |
| | | Ttop (803) | SAME CLASSIFICATION AS dTtop'S (802) | | 9Bytes |
| | | Tlp (804) | ≧4T MARK | | 1Byte |
| | | dTs (805) | ≧4T MARK | | 3Bytes |
| | | | 3T MARK | | |
| | | | 2T MARK | | |
| | RESERVED PART (806) | | | | 19Bytes |
| FOOTER INFORMATION (813) | | | | | 12Bytes |

| CONTENTS | | | NUMBER OF Byte |
|---|---|---|---|
| HEADER INFORMATION (811) | | | 8Bytes |
| READ/ WRITE CONTROL INFOR- MATION (812) | DISC CONTROL INFORMATION PART(914) | | 22Bytes |
| | POWER INFOR- MATION PART (915) | | 17Bytes |
| | WRITE PULSE INFOR- MATION PART (916) | FUNDAMENTAL PART(917) | 17Bytes |
| | | EXPANDED PART (918) | 35Bytes |
| | | RESERVED PART(906) | 1Bytes |
| FOOTER INFORMATION (813) | | | 12Bytes |

Total: 112 BYTES (b)

| CONTENTS | | PARAMETER CLASSIFICATION | NUMBER OF Byte |
|---|---|---|---|
| FUN- DAMEN- TAL PART (917) | FUNDA- MENTAL dTc (921) | ≧5T MARK | 3Bytes |
| | | 4T MARK | |
| | | 3T MARK | |
| | FUNDA- MENTAL dTtop (922) | ≧5T MARK | 4Bytes |
| | | 4T MARK | |
| | | 3T MARK | |
| | | 2T MARK | |
| | FUNDA- MENTAL Ttop (923) | SAME CLASSIFICATION AS FUNDAMENTAL dTtop'S (922) | 4Bytes |
| | FUNDA- MENTAL Tlp (924) | ≧5T MARK | 2Bytes |
| | | 4T MARK | |
| | FUNDA- MENTAL dTs (925) | ≧5T MARK | 4Bytes |
| | | 4T MARK | |
| | | 3T MARK | |
| | | 2T MARK | |

(c)

| CONTENTS | | PARAMETER CLASSIFICATION | | NUMBER OF Byte |
|---|---|---|---|---|
| EX- PAND- ED PART (918) | EXPANDED dTc (901) | ≧5T MARK | SUCCEEDING 2T SPACE | 3Bytes |
| | | 4T MARK | SUCCEEDING 2T SPACE | |
| | | 3T MARK | SUCCEEDING 2T SPACE | |
| | EXPAND- ED dTtop (902) | ≧5T MARK | PRECEDING 2T SPACE | 11Bytes |
| | | 4T MARK | PRECEDING 2T SPACE | |
| | | 3T MARK | PRECEDING 2T SPACE | |
| | | 2T MARK | PRECEDING ≧3T SPACE – SUCCEEDING 2T SPACE – NEXT 2T MARK | |
| | | | PRECEDING ≧3T SPACE – SUCCEEDING 2T SPACE – NEXT ≧3T MARK | |
| | | | PREVIOUS ≧3T MARK – PRECEDING 2T SPACE - SUCCEEDING 2T SPACE – NEXT 2T MARK | |
| | | | PREVIOUS ≧3T MARK – PRECEDING 2T SPACE - SUCCEEDING 2T SPACE – NEXT ≧3T MARK | |
| | | | PREVIOUS ≧3T MARK – PRECEDING 2T SPACE - SUCCEEDING ≧3T SPACE | |
| | | | PREVIOUS 2T MARK – PRECEDING 2T SPACE - SUCCEEDING 2T SPACE – NEXT 2T MARK | |
| | | | PREVIOUS 2T MARK – PRECEDING 2T SPACE - SUCCEEDING 2T SPACE – NEXT ≧3T MARK | |
| | | | PREVIOUS 2T MARK – PRECEDING 2T SPACE - SUCCEEDING ≧3T SPACE | |
| | EXPANDED Ttop (903) | SAME CLASSIFICATION AS EXPANDED dTtop'S (902) | | 11Bytes |
| | EXPANDED Tlp (904) | ≧5T MARK | SUCCEEDING 2T SPACE | 2Bytes |
| | | 4T MARK | SUCCEEDING 2T SPACE | |
| | EXPAND- ED dTs (905) | ≧5 MARK | SUCCEEDING 2T SPACE | 8Bytes |
| | | 4T MARK | SUCCEEDING 2T SPACE | |
| | | 3T MARK | SUCCEEDING 2T SPACE | |
| | | 2T MARK | PRECEDING 2T SPACE – SUCCEEDING 2T SPACE – NEXT 2T MARK | |
| | | | PRECEDING 2T SPACE – SUCCEEDING 2T SPACE – NEXT ≧3T MARK | |
| | | | PRECEDING 2T SPACE - SUCCEEDING ≧3T SPACE | |
| | | | PRECEDING ≧3T SPACE – SUCCEEDING 2T SPACE - NEXT 2T MARK | |
| | | | PRECEDING ≧3T SPACE - SUCCEEDING 2T SPACE - NEXT ≧3T MARK | |

*FIG.12*

| CONTENTS | | | | | NUMBER OF Byte |
|---|---|---|---|---|---|
| HEADER INFORMATION (811) | | | | | 8Bytes |
| READ/ WRITE CONTROL INFOR- MATION (812) | DISC CONTROL INFORMATION PART (1214) | | | | 28Bytes |
| | POWER INFORMATION PART (1215) | | | | 20Bytes |
| | WRITE PULSE INFOR- MATION PART (1216) | Tmp (1201) | (FREQUENCY DIVIDED CLOCK) | (FIXED CLOCK) | 1Byte |
| | | dTtop (1202) | ≧4T MARK | PRECEDING ≧5T SPACE | 12Bytes |
| | | | | PRECEDING 4T SPACE | |
| | | | | PRECEDING 3T SPACE | |
| | | | | PRECEDING 2T SPACE | |
| | | | 3T MARK | (SAME CLASSIFICATION AS ≧4T MARK'S) | |
| | | | 2T MARK | (SAME CLASSIFICATION AS ≧4T MARK'S) | |
| | | Ttop (1203) | (FREQUENCY DIVIDED CLOCK)≧4T MARK | PRECEDING ≧5T SPACE | 24Bytes |
| | | | | PRECEDING 4T SPACE | |
| | | | | PRECEDING 3T SPACE | |
| | | | | PRECEDING 2T SPACE | |
| | | | (FIXED CLOCK)≧4T MARK | (SAME CLASSIFICATION AS (FREQUENCY DIVIDED CLOCK)≧4T MARK'S) | |
| | | | (FREQUENCY DIVIDED CLOCK) 3T MARK | (SAME CLASSIFICATION AS (FREQUENCY DIVIDED CLOCK)≧4T MARK'S) | |
| | | | (FIXED CLOCK) 3T MARK | (SAME CLASSIFICATION AS (FREQUENCY DIVIDED CLOCK)≧4T MARK'S) | |
| | | | (FREQUENCY DIVIDED CLOCK) 2T MARK | (SAME CLASSIFICATION AS (FREQUENCY DIVIDED CLOCK)≧4T MARK'S) | |
| | | | (FIXED CLOCK) 2T MARK | (SAME CLASSIFICATION AS (FREQUENCY DIVIDED CLOCK)≧4T MARK'S) | |
| | | Tlp (1204) | ≧4T MARK | (FREQUENCY DIVIDED CLOCK) (FIXED CLOCK) | 2Bytes |
| | | | 3T MARK | (FREQUENCY DIVIDED CLOCK) (FIXED CLOCK) | |
| | | dTs (1205) | ≧4T MARK | | 3Bytes |
| | | | 3T MARK | | |
| | | | 2T MARK | | |
| | RESERVED PART (1206) | | | | 2Bytes |
| FOOTER INFORMATION (813) | | | | | 12Bytes |

| CONTENTS | | | NUMBER OF Byte | |
|---|---|---|---|---|
| HEADER INFORMATION (811) | | | 8Bytes | |
| READ/WRITE CONTROL INFORMATION (812) | DISC CONTROL INFORMATION PART(1314) | | 22Bytes | |
| | POWER INFORMATION PART (1315) | | 17Bytes | 112 BYTES |
| | WRITE PULSE INFORMATION PART (1316) | FUNDAMENTAL PART (1317) | 16Bytes | |
| | | EXPANDED PART (1318) | 34.5 Bytes | |
| | | RESERVED PART(1306) | 1.5Bytes | |
| FOOTER INFORMATION (813) | | | 12Bytes | |

(b)

| CONTENTS | | PARAMETER CLASSIFICATION | NUMBER OF Byte |
|---|---|---|---|
| FUNDAMENTAL PART (1317) | Tmp (1301) | | 1Bytes |
| | FUNDAMENTAL dTtop (1321) | ≥5T MARK | 4Bytes |
| | | 4T MARK | |
| | | 3T MARK | |
| | | 2T MARK | |
| | FUNDAMENTAL Ttop (1322) | SAME CLASSIFICATION AS FUNDAMENTAL dTtop'S (1321) | 4Bytes |
| | FUNDAMENTAL Tlp (1323) | ≥5T MARK | 3Bytes |
| | | 4T MARK | |
| | | 3T MARK | |
| | FUNDAMENTAL dTs (1324) | ≥5T MARK | 4Bytes |
| | | 4T MARK | |
| | | 3T MARK | |
| | | 2T MARK | |

(c)

| CONTENTS | | PARAMETER CLASSIFICATION | | NUMBER OF Byte |
|---|---|---|---|---|
| EXPANDED PART (1318) | EXPANDED dTtop (1302) | ≥5T MARK | PRECEDING 4T SPACE | PRECEDING 3T SPACE | 1.5Bytes |
| | | | PRECEDING 2T SPACE | | |
| | | 4T MARK | PRECEDING 4T SPACE | PRECEDING 3T SPACE | 1.5Bytes |
| | | | PRECEDING 2T SPACE | | |
| | | 3T MARK | PRECEDING 4T SPACE | PRECEDING 3T SPACE | 1.5Bytes |
| | | | PRECEDING 2T SPACE | | |
| | | 2T MARK | PRECEDING ≥5T SPACE – SUCCEEDING 2T SPACE – 2T MARK | PRECEDING ≥5T SPACE – SUCCEEDING 2T SPACE – ≥3T MARK | 7Bytes |
| | | | PRECEDING 4T SPACE – SUCCEEDING ≥3T SPACE | PRECEDING 2T SPACE – SUCCEEDING 2T SPACE – 2T MARK | |
| | | | PRECEDING 4T SPACE – SUCCEEDING 2T SPACE – ≥3T MARK | PRECEDING 3T SPACE – SUCCEEDING ≥3T SPACE | |
| | | | PRECEDING 3T SPACE – SUCCEEDING 2T SPACE – 2T MARK | PRECEDING 3T SPACE – SUCCEEDING 2T SPACE – ≥3T MARK | |
| | | | PREVIOUS ≥3T MARK– PRECEDING 2T SPACE – SUCCEEDING ≥3T SPACE | PREVIOUS ≥3T MARK– PRECEDING 2T SPACE – SUCCEEDING 2T SPACE – 2T MARK | |
| | | | PREVIOUS ≥3T MARK– PRECEDING 2T SPACE – SUCCEEDING 2T SPACE – ≥3T MARK | PREVIOUS 2T MARK– PRECEDING 2T SPACE – SUCCEEDING ≥3T SPACE | |
| | | | PREVIOUS 2T MARK– PRECEDING 2T SPACE – SUCCEEDING 2T SPACE – 2T MARK | PREVIOUS 2T MARK– PRECEDING 2T SPACE – SUCCEEDING 2T SPACE – ≥3T MARK | |
| | EXPANDED Ttop (1303) | SAME CLASSIFICATION AS EXPANDED dTtop'S (1302) | | 11.5Bytes |
| | EXPANDED Tlp (1304) | ≥5T MARK | SUCCEEDING 4T SPACE | SUCCEEDING 3T SPACE | 1.5Bytes |
| | | | SUCCEEDING 2T SPACE | | |
| | | 4T MARK | SUCCEEDING 4T SPACE | SUCCEEDING 3T SPACE | 1.5Bytes |
| | | | SUCCEEDING 2T SPACE | | |
| | | 3T MARK | SUCCEEDING 4T SPACE | SUCCEEDING 3T SPACE | 1.5Bytes |
| | | | SUCCEEDING 2T SPACE | | |
| | EXPANDED dTs (1305) | ≥5T MARK | SUCCEEDING 4T SPACE | SUCCEEDING 3T SPACE | 1.5Bytes |
| | | | SUCCEEDING 2T SPACE | | |
| | | 4T MARK | SUCCEEDING 4T SPACE | SUCCEEDING 3T SPACE | 1.5Bytes |
| | | | SUCCEEDING 2T SPACE | | |
| | | 3T MARK | SUCCEEDING 4T SPACE | SUCCEEDING 3T SPACE | 1.5Bytes |
| | | | SUCCEEDING 2T SPACE | | |
| | | 2T MARK | PRECEDING ≥3T SPACE – SUCCEEDING 2T SPACE – 2T MARK | PRECEDING ≥3T SPACE – SUCCEEDING SPACE – 3T MARK | 2.5Bytes |
| | | | PRECEDING 2T SPACE – SUCCEEDING ≥3T SPACE | PRECEDING 2T SPACE – SUCCEEDING 2T SPACE – 2T MARK | |
| | | | PRECEDING 2T SPACE – SUCCEEDING 2T SPACE – ≥3T MARK | | |

FIG. 15

| CONTENTS | | | | NUMBER OF Byte |
|---|---|---|---|---|
| HEADER INFORMATION (1511) | | | | 8Bytes |
| READ/ WRITE CONTROL INFOR- MATION (1512) | DISC CONTROL INFORMATION PART(1514) | | | 28Bytes |
| | POWER INFORMATION PAR (1515) | | | 20Bytes |
| | WRITE PULSE INFORMA- TION PART (1516) | Tmp (1501) | (FREQUENCY DIVIDED CLOCK) | 2Bytes |
| | | | (FIXED CLOCK) | |
| | | dTtop (1502) | 5T, 7T AND 9T MARKS | 4Bytes |
| | | | 4T, 6T AND 8T MARKS | |
| | | | 3T MARK | |
| | | | 2T MARK | |
| | | Ttop (1503) | (FREQUENCY DIVIDED CLOCK) 5T, 7T AND 9T MARKS | 8Bytes |
| | | | (FIXED CLOCK) 5T, 7T AND 9T MARKS | |
| | | | (FREQUENCY DIVIDED CLOCK) 4T, 6T AND 8T MARKS | |
| | | | (FIXED CLOCK) 4T, 6T AND 8T MARKS | |
| | | | (FREQUENCY DIVIDED CLOCK) 3T MARK | |
| | | | (FIXED CLOCK) 3T MARK | |
| | | | (FREQUENCY DIVIDED CLOCK) 2T MARK | |
| | | | (FIXED CLOCK) 2T MARK | |
| | | Tlp (1504) | (FREQUENCY DIVIDED CLOCK) 5T, 7T AND 9T MARKS | 4Bytes |
| | | | (FIXED CLOCK) 5T, 7T AND 9T MARKS | |
| | | | (FREQUENCY DIVIDED CLOCK) 4T, 6T AND 8T MARKS | |
| | | | (FIXED CLOCK) 4T, 6T AND 8T MARKS | |
| | | dTs (1505) | 5T, 7T AND 9T MARKS | 4Bytes |
| | | | 4T, 6T AND 8T MARKS | |
| | | | 3T MARK | |
| | | | 2T MARK | |
| | RESERVED PART(1506) | | | 22Bytes |
| FOOTER INFORMATION (1513) | | | | 12Bytes |

FIG.19

| CONTENTS | | | | | NUMBER OF Byte |
|---|---|---|---|---|---|
| HEADER INFORMATION | | | | | 8Bytes |
| READ/ WRITE CONTROL INFOR- MATION | DISC INFORMATION PART | | | | 28Bytes |
| | POWER INFORMATION PART | | | | 20Bytes |
| | WRITE PULSE INFORMATION PART | dTc (401) | ≧5T MARK | | 3Bytes |
| | | | 4T MARK | | |
| | | | 3T MARK | | |
| | | dTtop (402) | ≧4T MARK (PRECEDING ≧4T SPACE, PRECEDING 3T SPACE, PRECEDING 2T SPACE) | | 3 × 3 = 9Bytes |
| | | | 3T MARK (PRECEDING ≧4T SPACE, PRECEDING 3T SPACE, PRECEDING 2T SPACE) | | |
| | | | 2T MARK (PRECEDING ≧4T SPACE, PRECEDING 3T SPACE, PRECEDING 2T SPACE) | | |
| | | Ttop (403) | ≧4T MARK (PRECEDING ≧4T SPACE, PRECEDING 3T SPACE, PRECEDING 2T SPACE) | | 3 × 3 = 9Bytes |
| | | | 3T MARK (PRECEDING ≧4T SPACE, PRECEDING 3T SPACE, PRECEDING 2T SPACE) | | |
| | | | 2T MARK (PRECEDING ≧4T SPACE, PRECEDING 3T SPACE, PRECEDING 2T SPACE) | | |
| | | Tlp (404) | ≧4T MARK | | 1Bytes |
| | | dTs (405) | ≧4T MARK | | 3Bytes |
| | | | 3T MARK | | |
| | | | 2T MARK | | |
| | RESERVED PART (406) | | | | 19Bytes |
| FOOTER INFORMATION | | | | | 12Bytes |

FIG.20

| | PARAMETER NAME | MARK LENGTH | | NUMBER OF PARAMETERS |
|---|---|---|---|---|
| WRITE PULSE INFORMATION PART | dTc (501) | ≧5T MARK | SUCCEEDING ≧4T SPACE, SUCCEEDING 3T SPACE, SUCCEEDING 2T SPACE | 3 |
| | | 4T MARK | SUCCEEDING ≧4T SPACE, SUCCEEDING 3T SPACE, SUCCEEDING 2T SPACE | 3 |
| | | 3T MARK | SUCCEEDING ≧4T SPACE, SUCCEEDING 3T SPACE, SUCCEEDING 2T SPACE | 3 |
| | dTtop (502) | 2T MARK | PRECEDING 2T SPACE – PREVIOUS 2T MARK, PRECEDING 2T SPACE – PREVIOUS 3T MARK, PRECEDING 2T SPACE – PREVIOUS ≧4T MARK | 3 |
| | Ttop (503) | 2T MARK | PRECEDING 2T SPACE – PREVIOUS 2T MARK, PRECEDING 2T SPACE – PREVIOUS 3T MARK, PRECEDING 2T SPACE – PREVIOUS ≧4T MARK | 3 |
| | Tlp (504) | ≧4T MARK | SUCCEEDING ≧4T SPACE, SUCCEEDING 3T SPACE, SUCCEEDING 2T SPACE | 3 |
| | dTs (505) | ≧4T MARK | SUCCEEDING ≧4T SPACE, SUCCEEDING 3T SPACE, SUCCEEDING 2T SPACE | 3 |
| | | 3T MARK | SUCCEEDING ≧4T SPACE, SUCCEEDING 3T SPACE, SUCCEEDING 2T SPACE | 3 |
| | | 2T MARK | SUCCEEDING ≧4T SPACE, SUCCEEDING 3T SPACE, SUCCEEDING 2T SPACE – NEXT 2T MARK, SUCCEEDING 2T SPACE – NEXT ≧3T MARK | 4 |

FIG.24

| CONTENTS | | |
|---|---|---|
| HEADER INFORMATION | | |
| READ/ WRITE CONTROL INFOR- MATION | DISC INFORMATION PART | |
| | POWER INFORMATION PART | Pw RELATED PARAMETERS |
| | | Ps RELATED PARAMETERS |
| | | Pc RELATED PARAMETERS |
| | | Pb RELATED PARAMETERS |
| | | OTHER KINDS OF INFORMATION |
| | WRITE PULSE INFORMATION PART | Tmp |
| | | dTtop AT RESPECTIVE MARK LENGTHS |
| | | Ttop AT RESPECTIVE MARK LENGTHS |
| | | Tlp AT RESPECTIVE MARK LENGTHS |
| | | dTs AT RESPECTIVE MARK LENGTHS |
| | | OTHER KINDS OF INFORMATION |
| FOOTER INFORMATION | | |

*FIG.27*

|  |  | (1) | (2) | (3) | (4) |
|---|---|---|---|---|---|
| DI | DI-1 | PARAMETERS FOR CONVENTIONAL DENSITY | ARRANGED IN THE SAME ORDER AS IN CONVENTIONAL DENSITY BUT SPLIT HALFWAY | PARAMETERS FOR BEGINNING OF MARK | INCLUDING PARAMETERS WITH MAXIMUM NUMBER OF BYTES |
|  | DI-2 | ADDITIONAL PARAMETERS FOR HIGH DENSITY |  | PARAMETERS FOR END OF MARK |  |

FIG. 28

| CONTENTS | | | | | NUMBER OF Byte |
|---|---|---|---|---|---|
| HEADER INFORMATION | | | | | 8Bytes |
| READ/ WRITE CONTROL INFORMATION | DISC INFORMATION PART | | | | 28Bytes |
| | POWER INFORMATION PART | | | | 20Bytes |
| | WRITE PULSE INFORMATION PART | dTc (401) | ≧5T MARK | | 3Bytes |
| | | | 4T MARK | | |
| | | | 3T MARK | | |
| | | dTtop (402) | ≧4T MARK(PRECEDING ≧4T SPACE, PRECEDING 3T SPACE, PRECEDING 2T SPACE) | | 3×3= 9Bytes |
| | | | 3T MARK(PRECEDING ≧4T SPACE, PRECEDING 3T SPACE, PRECEDING 2T SPACE) | | |
| | | | 2T MARK(PRECEDING ≧4T SPACE, PRECEDING 3T SPACE, PRECEDING 2T SPACE) | | |
| | | Ttop (403) | ≧4T MARK(PRECEDING ≧4T SPACE, PRECEDING 3T SPACE, PRECEDING 2T SPACE) | | 3×3= 9Bytes |
| | | | 3T MARK(PRECEDING ≧4T SPACE, PRECEDING 3T SPACE, PRECEDING 2T SPACE) | | |
| | | | 2T MARK(PRECEDING ≧4T SPACE, PRECEDING 3T SPACE, PRECEDING 2T SPACE) | | |
| | | Tlp (404) | ≧4T MARK | | 1Bytes |
| | | dTs (405) | ≧4T MARK | | 3Bytes |
| | | | 3T MARK | | |
| | | | 2T MARK | | |
| | RESERVED PART (406) | | | | 19Bytes |
| FOOTER INFORMATION | | | | | 12Bytes |

FIG.29

| | PARAMETER NAME | MARK LENGTH | | NUMBER OF PARAMETERS |
|---|---|---|---|---|
| WRITE PULSE INFORMATION PART | dTc (501) | ≧5T MARK | SUCCEEDING ≧4T SPACE, SUCCEEDING 3T SPACE, SUCCEEDING 2T SPACE | 3 |
| | | 4T MARK | SUCCEEDING ≧4T SPACE, SUCCEEDING 3T SPACE, SUCCEEDING 2T SPACE | 3 |
| | | 3T MARK | SUCCEEDING ≧4T SPACE, SUCCEEDING 3T SPACE, SUCCEEDING 2T SPACE | 3 |
| | dTtop (502) | ≧4T MARK | PRECEDING ≧4T SPACE, PRECEDING 3T SPACE, PRECEDING 2T SPACE | 3 |
| | | 3T MARK | PRECEDING ≧4T SPACE, PRECEDING 3T SPACE, PRECEDING 2T SPACE | 3 |
| | | 2T MARK | PRECEDING ≧4T SPACE, PRECEDING 3T SPACE, PRECEDING 2T SPACE—PREVIOUS 2T MARK, PRECEDING 2T SPACE—PREVIOUS 3T MARK, PRECEDING 2T SPACE—PREVIOUS ≧4T MARK | 5 |

FIG. 30

| PARAMETER NAME | | MARK LENGTH | | NUMBER OF PARAMETERS |
|---|---|---|---|---|
| WRITE PULSE INFORMATION PART | Ttop (503) | ≧4T MARK | PRECEDING ≧4T SPACE, PRECEDING 3T SPACE, PRECEDING 2T SPACE | 3 |
| | | 3T MARK | PRECEDING ≧4T SPACE, PRECEDING 3T SPACE, PRECEDING 2T SPACE | 3 |
| | | 2T MARK | PRECEDING ≧4T SPACE, PRECEDING 3T SPACE, PRECEDING 2T SPACE – PREVIOUS 2T MARK, PRECEDING 2T SPACE – PREVIOUS 3T MARK, PRECEDING 2T SPACE – PREVIOUS ≧4T MARK | 5 |
| | Tlp (504) | ≧4T MARK | SUCCEEDING ≧4T SPACE, SUCCEEDING 3T SPACE, SUCCEEDING 2T SPACE | 3 |
| | dTs (505) | ≧4T MARK | SUCCEEDING ≧4T SPACE, SUCCEEDING 3T SPACE, SUCCEEDING 2T SPACE | 3 |
| | | 3T MARK | SUCCEEDING ≧4T SPACE, SUCCEEDING 3T SPACE, SUCCEEDING 2T SPACE | 3 |
| | | 2T MARK | SUCCEEDING ≧4T SPACE, SUCCEEDING 3T SPACE, SUCCEEDING 2T SPACE – NEXT 2T MARK, SUCCEEDING 2T SPACE – NEXT ≧3T MARK | 4 |

FIG.31

| PARAMETER NAME | | MARK LENGTH | | NUMBER OF PARAMETERS |
|---|---|---|---|---|
| WRITE PULSE INFORMATION PART | dTtop (502) | ≥4T MARK | PRECEDING ≥4T SPACE, PRECEDING 3T SPACE, PRECEDING 2T SPACE | 3 |
| | | 3T MARK | PRECEDING ≥4T SPACE, PRECEDING 3T SPACE, PRECEDING 2T SPACE | 3 |
| | | 2T MARK | PRECEDING ≥4T SPACE, PRECEDING 3T SPACE, PRECEDING 2T SPACE— PREVIOUS 2T MARK, PRECEDING 2T SPACE—PREVIOUS 3T MARK, PRECEDING 2T SPACE—PREVIOUS ≥4T MARK | 5 |
| | Ttop (503) | ≥4T MARK | PRECEDING ≥4T SPACE, PRECEDING 3T SPACE, PRECEDING 2T SPACE | 3 |
| | | 3T MARK | PRECEDING ≥4T SPACE, PRECEDING 3T SPACE, PRECEDING 2T SPACE | 3 |
| | | 2T MARK | PRECEDING ≥4T SPACE, PRECEDING 3T SPACE, PRECEDING 2T SPACE— PREVIOUS 2T MARK, PRECEDING 2T SPACE—PREVIOUS 3T MARK, PRECEDING 2T SPACE—PREVIOUS ≥4T MARK | 5 |

FIG.32

| | PARAMETER NAME | MARK LENGTH | | NUMBER OF PARAMETERS |
|---|---|---|---|---|
| WRITE PULSE INFORMATION PART | dTc (501) | ≧5T MARK | SUCCEEDING ≧4T SPACE, SUCCEEDING 3T SPACE, SUCCEEDING 2T SPACE | 3 |
| | | 4T MARK | SUCCEEDING ≧4T SPACE, SUCCEEDING 3T SPACE, SUCCEEDING 2T SPACE | 3 |
| | | 3T MARK | SUCCEEDING ≧4T SPACE, SUCCEEDING 3T SPACE, SUCCEEDING 2T SPACE | 3 |
| | Tlp (504) | ≧4T MARK | SUCCEEDING ≧4T SPACE, SUCCEEDING 3T SPACE, SUCCEEDING 2T SPACE | 3 |
| | dTs (505) | ≧4T MARK | SUCCEEDING ≧4T SPACE, SUCCEEDING 3T SPACE, SUCCEEDING 2T SPACE | 3 |
| | | 3T MARK | SUCCEEDING ≧4T SPACE, SUCCEEDING 3T SPACE, SUCCEEDING 2T SPACE | 3 |
| | | 2T MARK | SUCCEEDING ≧4T SPACE, SUCCEEDING 3T SPACE, SUCCEEDING 2T SPACE – NEXT 2T MARK, SUCCEEDING 2T SPACE – NEXT ≧3T MARK | 4 |

FIG.33

| | PARAMETER NAME | MARK LENGTH | | NUMBER OF PARAMETERS |
|---|---|---|---|---|
| WRITE PULSE INFORMATION PART | dTtop (502) | ≥4T MARK | PRECEDING ≥4T SPACE, PRECEDING 3T SPACE, PRECEDING 2T SPACE | 3 |
| | | 3T MARK | PRECEDING ≥4T SPACE, PRECEDING 3T SPACE, PRECEDING 2T SPACE | 3 |
| | | 2T MARK | PRECEDING ≥4T SPACE, PRECEDING 3T SPACE, PRECEDING 2T SPACE— PREVIOUS 2T MARK, PRECEDING 2T SPACE—PREVIOUS 3T MARK, PRECEDING 2T SPACE—PREVIOUS ≥4T MARK | 5 |
| | Ttop (503) | ≥4T MARK | PRECEDING ≥4T SPACE, PRECEDING 3T SPACE, PRECEDING 2T SPACE | 3 |
| | | 3T MARK | PRECEDING ≥4T SPACE, PRECEDING 3T SPACE, PRECEDING 2T SPACE | 3 |
| | | 2T MARK | PRECEDING ≥4T SPACE, PRECEDING 3T SPACE, PRECEDING 2T SPACE— PREVIOUS 2T MARK, PRECEDING 2T SPACE—PREVIOUS 3T MARK, PRECEDING 2T SPACE—PREVIOUS ≥4T MARK | 5 |

FIG.34

| | PARAMETER NAME | MARK LENGTH | | NUMBER OF PARAMETERS |
|---|---|---|---|---|
| WRITE PULSE INFORMATION PART | dTc (501) | ≧5T MARK | SUCCEEDING ≧4T SPACE, SUCCEEDING 3T SPACE, SUCCEEDING 2T SPACE | 3 |
| | | 4T MARK | SUCCEEDING ≧4T SPACE, SUCCEEDING 3T SPACE, SUCCEEDING 2T SPACE | 3 |
| | | 3T MARK | SUCCEEDING ≧4T SPACE, SUCCEEDING 3T SPACE, SUCCEEDING 2T SPACE | 3 |
| | Tlp (504) | ≧4T MARK | SUCCEEDING ≧4T SPACE, SUCCEEDING 3T SPACE, SUCCEEDING 2T SPACE | 3 |
| | dTs (505) | ≧4T MARK | SUCCEEDING ≧4T SPACE, SUCCEEDING 3T SPACE, SUCCEEDING 2T SPACE | 3 |
| | | 3T MARK | SUCCEEDING ≧4T SPACE, SUCCEEDING 3T SPACE, SUCCEEDING 2T SPACE | 3 |
| | | 2T MARK | SUCCEEDING ≧4T SPACE, SUCCEEDING 3T SPACE, SUCCEEDING 2T SPACE – NEXT 2T MARK, SUCCEEDING 2T SPACE – NEXT ≧3T MARK | 4 |

FIG.36
| "ANY LACKING DI?" FLAG 2101 | LACKING DI STORAGE LOCATION INFORMATION 2102 | NUMBER OF LACKING DI INFORMATION 2103 |
|---|---|---|
FIG.37
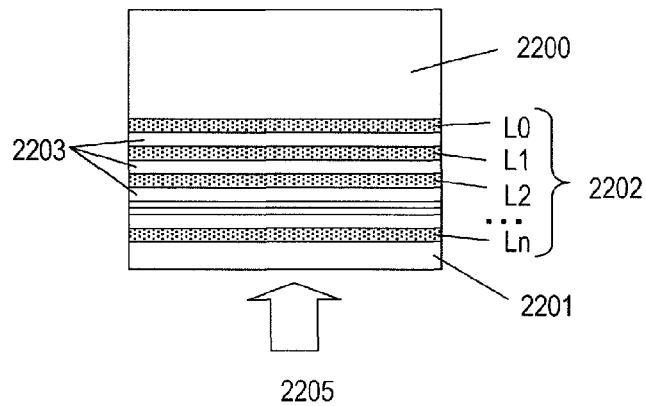
FIG.38
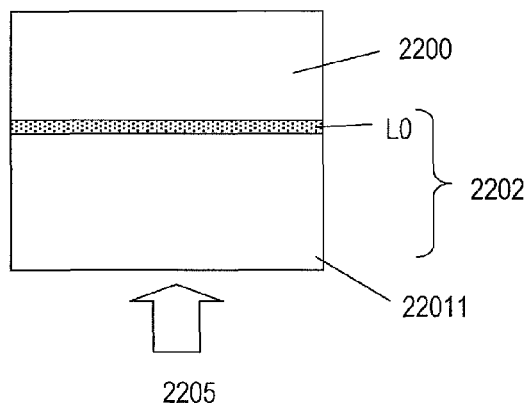
FIG.39
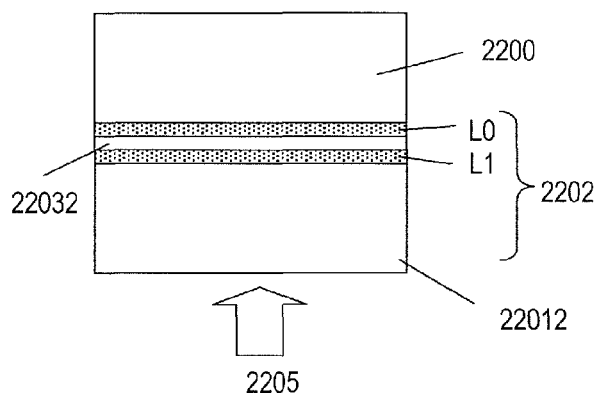

FIG.43
(A) DISC A WITH CONVENTIONAL STORAGE DENSITY
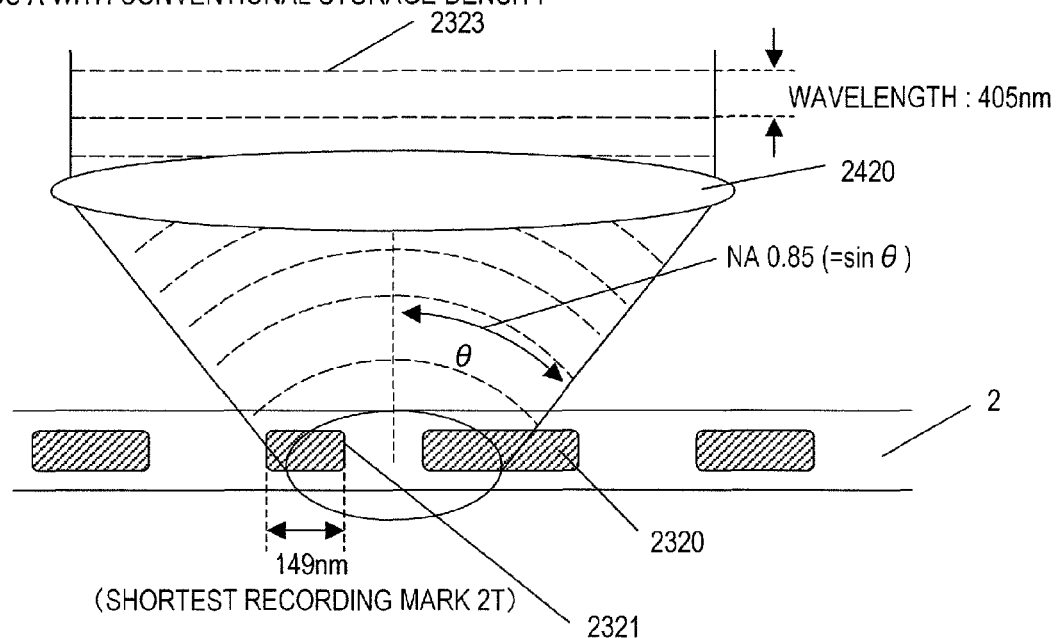
(B) DISC B WITH HIGH STORAGE DENSITY
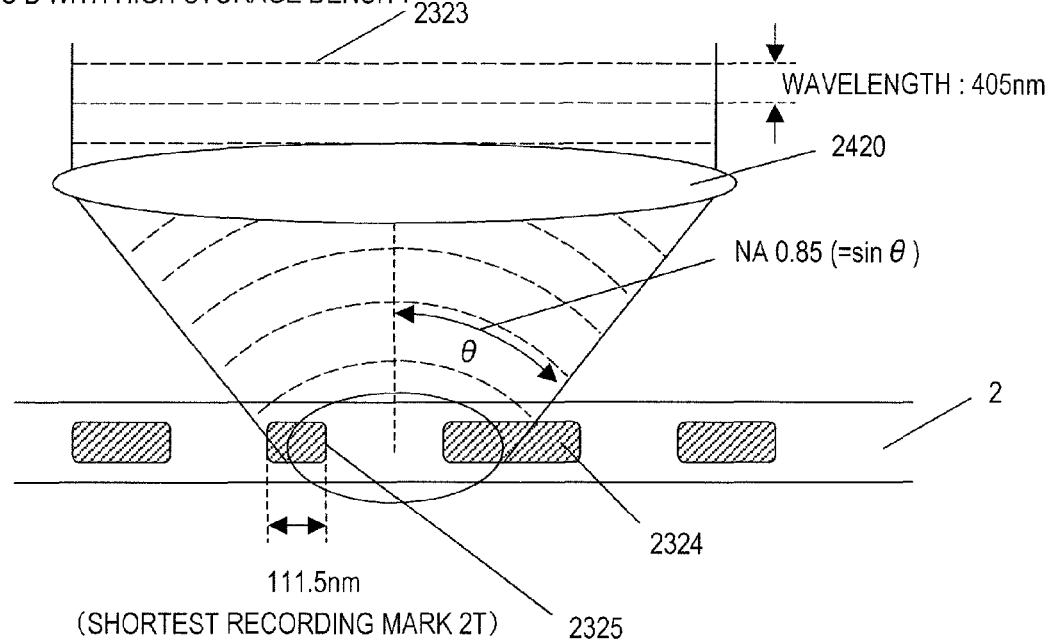

INFORMATION RECORDING MEDIUM, METHOD FOR RECORDING INFORMATION ON INFORMATION RECORDING MEDIUM, METHOD FOR REPRODUCING INFORMATION FROM INFORMATION RECORDING MEDIUM AND METHOD FOR PRODUCING INFORMATION RECORDING MEDIUM

This application claims priority under 35 U.S.C. §119 to U.S. Provisional Application Nos. 61/158,775 filed on Mar. 10, 2009, 61/158,829 filed on Mar. 10, 2009 and 61/231,342 filed on Aug. 5, 2009, which are incorporated herein by reference in its entirety.

BACKGROUND OF THE INVENTION

1. Field of the Invention

The present invention relates to a technology for storing information (or read/write control information) for use to control a write pulse when information is written on an information storage medium.

2. Description of the Related Art

On a conventional information storage medium, stored is read/write control information for use to perform a write operation.

As far as optical discs are concerned, for example, as disclosed in Japanese Patent Application Laid-Open Publication No. 2006-313621 (which will be referred to herein as "Patent Document No. 1"), so-called "disc information" (which will be abbreviated herein as "DI"), which is a piece of information including read/write control information, is stored on a Blu-ray Disc (which will be abbreviated herein as "BD").

Specifically, in DVD-RAMs, DVD-RWs, DVD+RWs, DVD-Rs and DVD+Rs, the "physical format information" (which will be abbreviated herein as "PFI") corresponds to the DI.

Also, even if read/write control information is already stored on an information storage medium, additional read/write control information could sometimes be written by an information storage medium recorder/player on a designated area on the information storage medium or in an internal memory of the recorder/player either in the same format as, or in a format similar to, the DI or the PFI mentioned above.

Hereinafter, the DI of a BD will be described as an example of the read/write control information.

FIG. 1 schematically illustrates the structure of a BD.

As for a single-layer medium with only one information storage layer, the only storage layer thereof has the structure shown in FIG. 1. In a multilayer medium with two or more information storage layers, on the other hand, either each or at least one of those layers has the structure shown in FIG. 1.

According to Patent Document No. 1, at least one piece of DI is stored in an area called "lead-in area 11" in the BD structure shown in FIG. 1.

Also, according to Patent Document No. 1, the DI has a size of 112 bytes and a single write pulse waveform, associated with a single layer and a single writing speed, is stored in the one piece of DI.

FIG. 2 schematically shows the makeup of the DI.

The DI consists of header information 21, read/write control information 22, and footer information 23. The read/write control information includes a disc control information part 24 including information about the type and the structure of the disc, a power information part 25 for use to control the power during reading or writing, and a write pulse information part 26 for use to control the write pulse waveform during writing.

A write pulse applied to make a recording mark on an optical disc includes power information indicating the power level of that pulse and write pulse information indicating the position and width of that pulse.

In the following description, those parameters of a write pulse will be referred to herein as a "write strategy" (which will be sometimes simply referred to herein as "WS").

The power information of the write strategy is stored in the power information part 25 and the write pulse information is stored in the write pulse information part 26.

Hereinafter, the power information and the write pulse information will be described by reference to an exemplary write pulse waveform shown in FIG. 3.

FIG. 3 illustrates an exemplary write pulse waveform for making an 8T mark, which is eight times as long as the width T of a channel clock pulse.

In the example illustrated in FIG. 3, the power information includes pieces of information about the parameters of a write pulse in the amplitude direction, including a peak power Pw (31), a space power Ps (32), a cooling power Pc (33), and a bottom power Pb (34).

On the other hand, the write pulse information includes pieces of information about the parameters of a write pulse in the time axis direction, including a top pulse width Ttop (35), a top pulse start point dTtop (36), a multi-pulse width Tmp (37), a last pulse width 38, and a cooling pulse end point dTs (39).

These parameters are included in the DI in the format shown in FIG. 4, for example. Optionally, these pieces of read/write control information could also be written by an information storage medium recorder/player in a designated area on an information storage medium in the same format as, or in a format similar to, the one shown in FIG. 4.

Also, in some cases, an information storage medium recorder/player could store those pieces of read/write control information in its internal memory, for example.

However, as the writing speed or the storage density increases, not just the read/write control information but also the degree of thermal interference between the marks will depend more and more on the length of the space that precedes or succeeds a mark.

If a write operation were performed using the same write pulse information with respect to each of preceding or succeeding spaces that have varying lengths when such a phenomenon is observed, the length of the recording mark left would vary according to the length of its preceding or succeeding space.

Consequently, each piece of write pulse information may sometimes be defined by not only the length of each mark but also that of a space that precedes or succeeds that mark.

Recently, as the densities of information storage media have been increasing year by year, the shortest mark length of recording marks has come closer and closer to the limit of resolution that depends on the detection system.

If the information storage medium is an optical disc medium, for example, the "resolution that depends on the detection system" refers to the optical resolution to be determined by the size of a light beam spot being formed by condensing a laser beam.

Since the shortest mark length is on the verge of reaching that limit of resolution, an increase in intersymbol interference and a decrease in SNR (signal to noise ratio) have become more and more significant these days.

Hereinafter, this phenomenon will be described with an optical disc medium that uses a blue laser beam with a wavelength of 405 nm and that has a diameter of 12 cm taken as an example.

According to "Blu-ray Disc Reader" (published by Ohmsha, Ltd.), in an optical disc medium that uses a blue laser beam, the light beam spot formed by condensing a laser beam has a size of 390 nm. And if the storage capacity per storage layer is 25 GB and if RLL (1, 7) is used as a recording code, the shortest mark has a length of 149 nm.

If such an optical disc medium needs to have a storage capacity of 33.3 GB per storage layer, the shortest mark should have a length of 112 nm. And to further increase the storage capacity, the shortest mark should have an even shorter length.

Supposing the same detection system is used, if the storage capacity per storage layer is 25 GB, then a single light beam spot 51 covers 2.6 shortest marks as shown in portion (a) of FIG. 5. However, if the storage capacity per storage layer is increased to 33.3 GB, a single light beam spot 51 covers 3.5 shortest marks as shown in portion (b) of FIG. 5. Consequently, the length of each mark decreases with respect to the same size of the light beam spot formed by a detection system for the optical disc medium.

As a result, the mark/space combination to fall within the light beam spot could not just be a combination of a single mark and its preceding or succeeding space but also be a combination of multiple marks and multiple spaces.

FIG. 6 illustrates typical relations between the mark at the present time i and patterns each including multiple marks or spaces.

Portion (a) of FIG. 6 illustrates a combination of a mark at the present time i, the preceding space at a time i−1, and the succeeding space at a time i+1.

Portion (b) of FIG. 6 illustrates a combination of a mark at the present time i, the previous mark at a time i−2, and the preceding space at the time i−1.

Portion (c) of FIG. 6 illustrates a combination of a mark at the present time i, the succeeding space at the time i+1, and the next mark at a time i+2.

Portion (d) of FIG. 6 illustrates a combination of a mark at the present time i, the preceding space at the time i−1, the succeeding space at the time i+1 and the next mark at the time i+2.

And portion (e) of FIG. 6 illustrates a combination of a mark at the present time i, the previous mark at the time i−2, the preceding space at the time i−1 and the succeeding space at the time i+1.

Thus, as the storage density is increased, the write pulse information will be defined by not just a combination of a current mark and the preceding or succeeding space but also a combination of the current mark and the preceding and succeeding spaces, a combination of the current and previous marks and the preceding space, a combination of the current and next marks and the succeeding space, a combination of the current and previous marks and the preceding and succeeding spaces, and a combination of the current and next marks and the preceding and succeeding spaces as shown in FIG. 6.

Furthermore, to get a high-density write operation done, people might try to achieve high writing performance by increasing the resolution of the write pulse information.

As described above, as the storage density is increased, it is expected that the write pulse information would be expanded and the size of the read/write control information would increase.

And if the size increased too much, then such an excessive amount of information could no longer be stored in a read/write control information storage area (to store DI or PFI, for example), of which the size is determined beforehand.

Such a problem could be overcome by changing the formats of the read/write control information storage area. If the formats were changed, however, then no compatibility would be ensured with respect to media of lower orders or older generations.

Furthermore, it is not impossible to store that increased amount of information in two or more read/write control information storage areas separately. In that case, however, information would be read more slowly, and the increase in the number of DI and PFI items would leave an even narrower space in the lead-in area, which are problems.

SUMMARY OF THE INVENTION

It is therefore an object of the present invention to provide a method for defining read/write control information for an information storage medium and an apparatus for reading and writing from/to an information storage medium, which can cope with such an increase in the size of read/write control information for a high-density information storage medium by getting the read/write control information stored within an area of a predetermined size in such a format as to ensure compatibility with media of lower orders or older generations.

An information storage medium according to the present invention can store a data sequence as a combination of marks and spaces. The information storage medium has at least one information storage layer, which has an information storage area to store information and a control information area for use to perform a read/write operation on the at least one information storage layer. The control information area stores at least one set of control information, which includes a first kind of write pulse information including information to be used as a reference value and a second kind of write pulse information including information to be used as an offset value. The size of the offset value is at least a half as large as that of the reference value.

The first kind of write pulse information may include information to be used as a reference value for a write pulse, of which the preceding or succeeding space has a length of 5T or more (where T is a channel clock pulse width).

The first kind of write pulse information may define information to be used as at least one reference value at any mark length that is at most equal to nT (where n is an integer).

The second kind of write pulse information may define information to be used as offset values that have been classified according to the lengths of the preceding and succeeding spaces for only the shortest mark.

An information writing method according to the present invention is a method for writing information on the information storage medium of the present invention and includes the steps of: retrieving the control information from the control information area; adjusting a write waveform for performing a write operation on the information storage area by reference to the first and second kinds of write pulse information that are included in the control information retrieved; and writing a data sequence on the information storage area using the write waveform adjusted.

An information reading method according to the present invention is a method for reading information from the information storage medium of the present invention and includes the steps of: irradiating the information storage area with a laser beam; and reading a data sequence that has been written on the information storage area using a write waveform that has been adjusted by reference to the first and second kinds of write pulse information included in the control information.

An information storage medium manufacturing method according to the present invention is a method of making an information storage medium on which a data sequence is writable as a combination of marks and spaces, and includes the steps of: stacking an information storage layer on a substrate and then stacking a transparent protective coating on the information storage layer; defining an information storage area to store information on the information storage layer; defining a control information area to store control information, which is used to perform a read/write operation on the information storage layer; and writing the control information on the control information area. The control information includes a first kind of write pulse information that includes information to be used as a reference value and a second kind of write pulse information that includes information to be used as an offset value. The size of the offset value is at least a half as large as that of the reference value.

Another information writing method according to the present invention is a method for writing information on an information storage medium made by the manufacturing method of the present invention. The writing method includes the steps of: retrieving the control information from the control information area; adjusting a write waveform for performing a write operation on the information storage area by reference to the first and second kinds of write pulse information that are included in the control information retrieved; and writing a data sequence on the information storage area using the write waveform adjusted.

Another information reading method according to the present invention is a method for reading information from an information storage medium made by the manufacturing of the present invention. The reading method includes the steps of: irradiating the information storage area with a laser beam; and reading a data sequence that has been written on the information storage area using a write waveform that has been adjusted by reference to the first and second kinds of write pulse information included in the control information.

Another information storage medium according to the present invention can store a data sequence as a combination of marks and spaces. The information storage medium has at least one information storage layer, which has an information storage area to store information and a control information area for use to perform a read/write operation on the at least one information storage layer. The control information area stores at least one set of control information, which includes a first kind of write pulse information including information to be used as a reference value and a second kind of write pulse information including information to be used as an offset value. If the pulse width or pulse position of a write pulse is definable with a precision of 1T/n (where T is a channel clock pulse width and n is a positive integer), the size of the offset value is large enough to define at least a 2/n range.

The first kind of write pulse information may include information to be used as a reference value for a write pulse, of which the preceding or succeeding space has a length of 5T or more (where T is a channel clock pulse width).

The first kind of write pulse information may define information to be used as at least one reference value at any mark length that is at most equal to nT (where n is an integer).

The second kind of write pulse information may define information to be used as offset values that have been classified according to the lengths of the preceding and succeeding spaces for only the shortest mark.

Still another information writing method according to the present invention is a method for writing information on the information storage medium of the present invention. The writing method includes the steps of: retrieving the control information from the control information area; adjusting a write waveform for performing a write operation on the information storage area by reference to the first and second kinds of write pulse information that are included in the control information retrieved; and writing a data sequence on the information storage area using the write waveform adjusted.

Still another information reading method according to the present invention is a method for reading information from the information storage medium of the present invention. The reading method includes the steps of: irradiating the information storage area with a laser beam; and reading a data sequence that has been written on the information storage area using a write waveform that has been adjusted by reference to the first and second kinds of write pulse information included in the control information.

Still another information storage medium manufacturing method according to the present invention is a method of making an information storage medium on which a data sequence is writable as a combination of marks and spaces. The method includes the steps of: stacking an information storage layer on a substrate and then stacking a transparent protective coating on the information storage layer; defining an information storage area to store information on the information storage layer; defining a control information area to store control information, which is used to perform a read/write operation on the information storage layer; and writing the control information on the control information area. The control information includes a first kind of write pulse information that includes information to be used as a reference value and a second kind of write pulse information that includes information to be used as an offset value. If the pulse width or pulse position of a write pulse is definable with a precision of 1T/n (where T is a channel clock pulse width and n is a positive integer), the size of the offset value is large enough to define at least a 2/n range.

Yet another information writing method according to the present invention is a method for writing information on an information storage medium made by the manufacturing method of the present invention. The writing method includes the steps of: retrieving the control information from the control information area; adjusting a write waveform for performing a write operation on the information storage area by reference to the first and second kinds of write pulse information that are included in the control information retrieved; and writing a data sequence on the information storage area using the write waveform adjusted.

Yet another information reading method according to the present invention is a method for reading information from an information storage medium made by the manufacturing method of the present invention. The reading method includes the steps of: irradiating the information storage area with a laser beam; and reading a data sequence that has been written on the information storage area using a write waveform that has been adjusted by reference to the first and second kinds of write pulse information included in the control information.

The present invention provides an information storage medium, which has multiple tracks, on which marks are formed by irradiating the tracks with pulses of a laser beam and on which information is stored as a data sequence where marks and spaces are arranged alternately. The information storage medium has at least one information storage layer to store information. The information storage layer has an information storage area to store information and a control information area for use to perform a read/write operation on the at least one information storage layer. The control information area stores at least one set of control information. The at least one set of control information includes first and second kinds of write pulse information. Information can be written on the information storage medium of the present invention by reference to either only the first kind of write pulse information or both of the first and second kinds of write pulse information. If only the first kind of write pulse information is used, even an information reading/writing apparatus that is not compatible with expanded write pulses can also perform a write operation on this information storage medium. Meanwhile, an information reading/writing apparatus that is compatible with expanded write pulses can achieve better recording quality with a higher SNR by using those expanded write pulses to get high-density writing done with the influence of intersymbol interference and thermal interference well taken into consideration.

BRIEF DESCRIPTION OF THE DRAWINGS

FIG. 4 shows exemplary contents of the DI information.

Portions (a) and (b) of FIG. 5 illustrate relations between the light beam spot size and mark lengths on optical discs with mutually different storage capacities.

Figure 1:
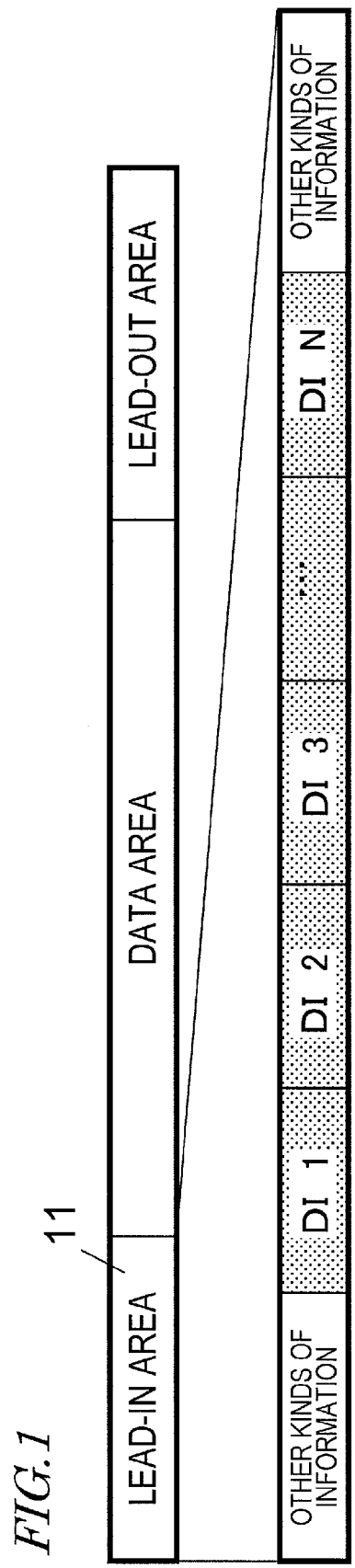
FIG. 1 schematically illustrates the structure of a BD.
Figure 2:
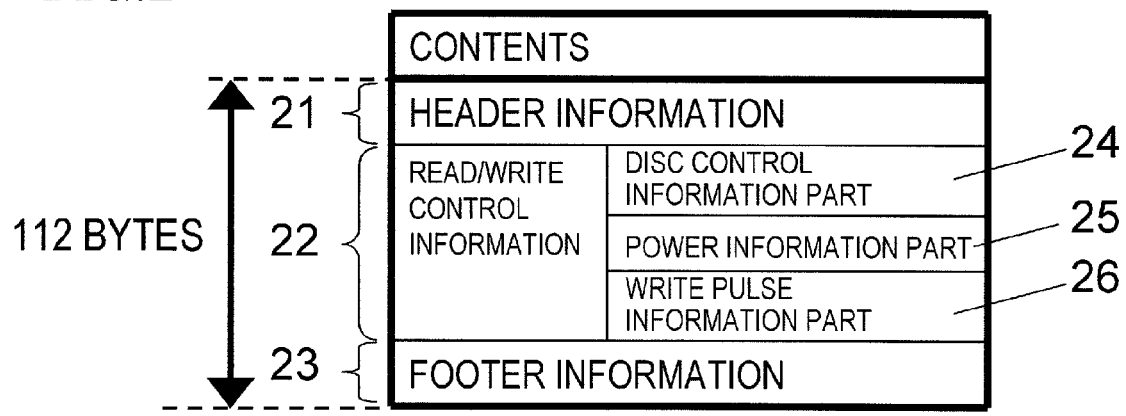
FIG. 2 schematically shows the makeup of the DI information of a BD.
Figure 3:
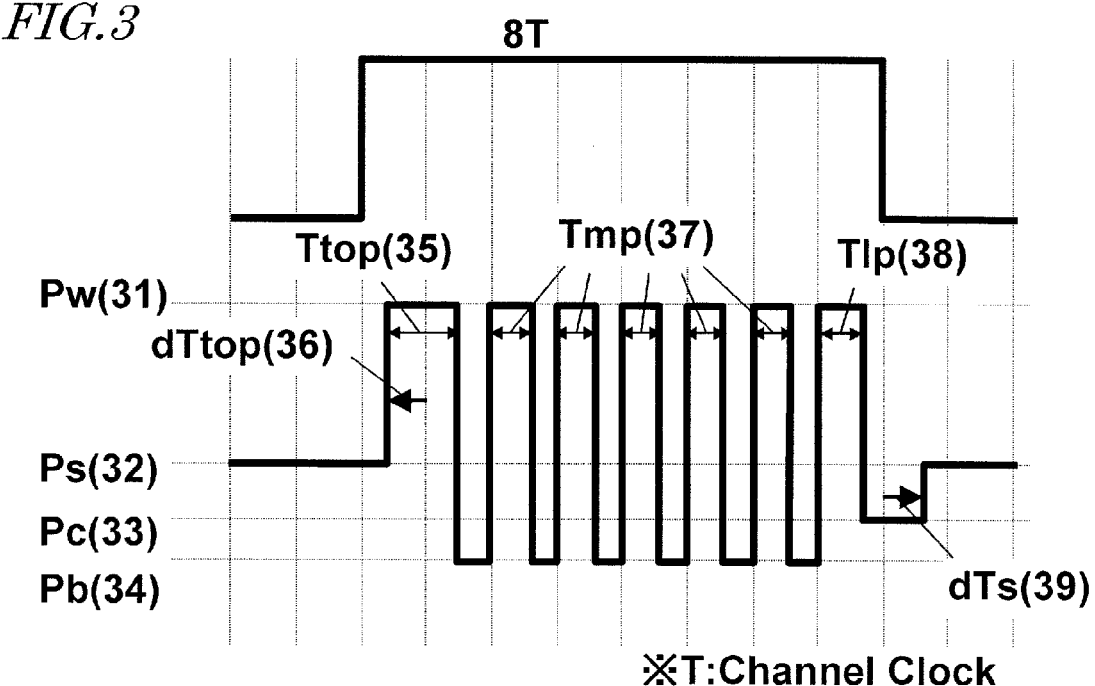
FIG. 3 illustrates an exemplary write pulse waveform.
Figure 6:
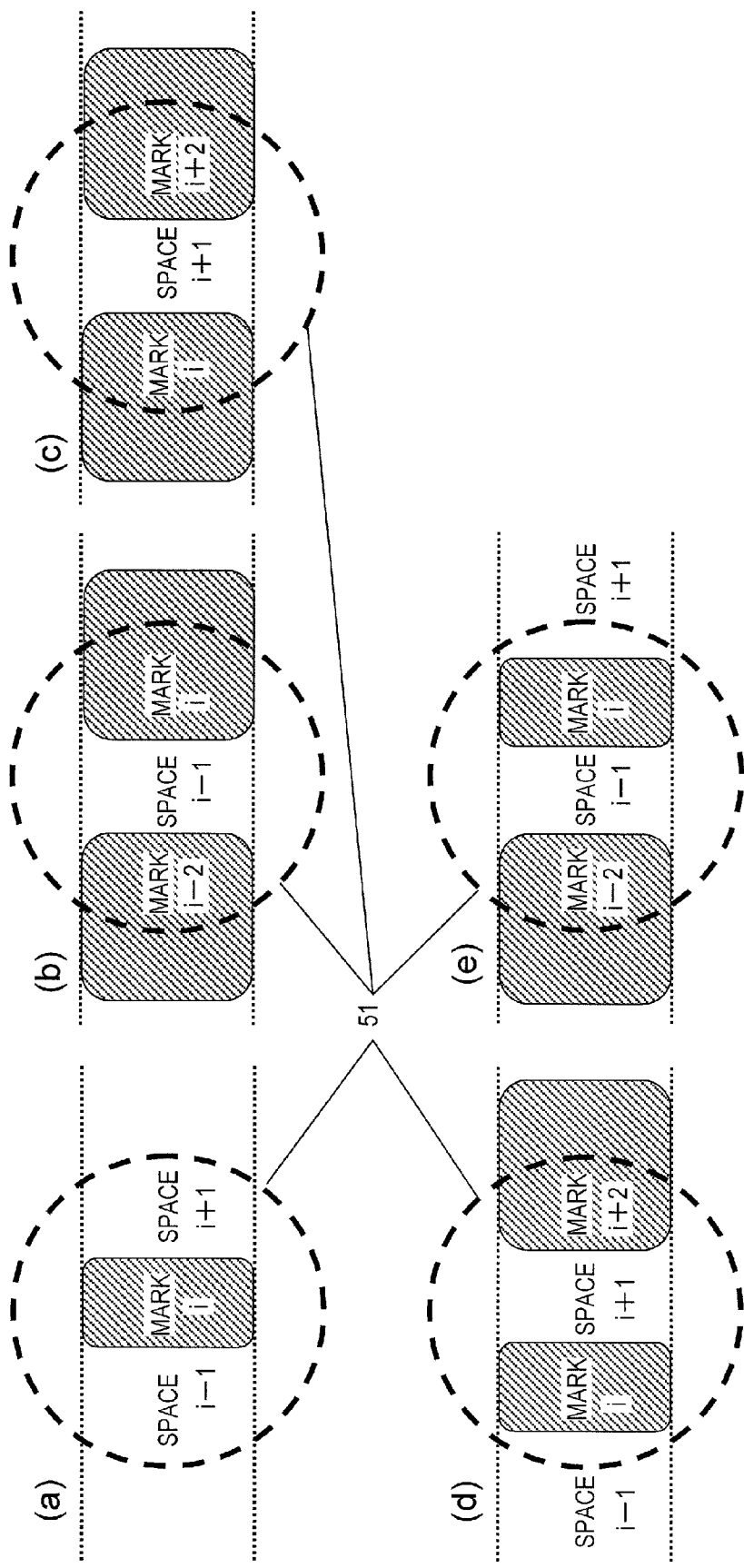

Portions (a) through (e) of FIG. 6 illustrate varying relations between a light beam spot of the same size and a number of different patterns including marks and spaces.

Figure 7:
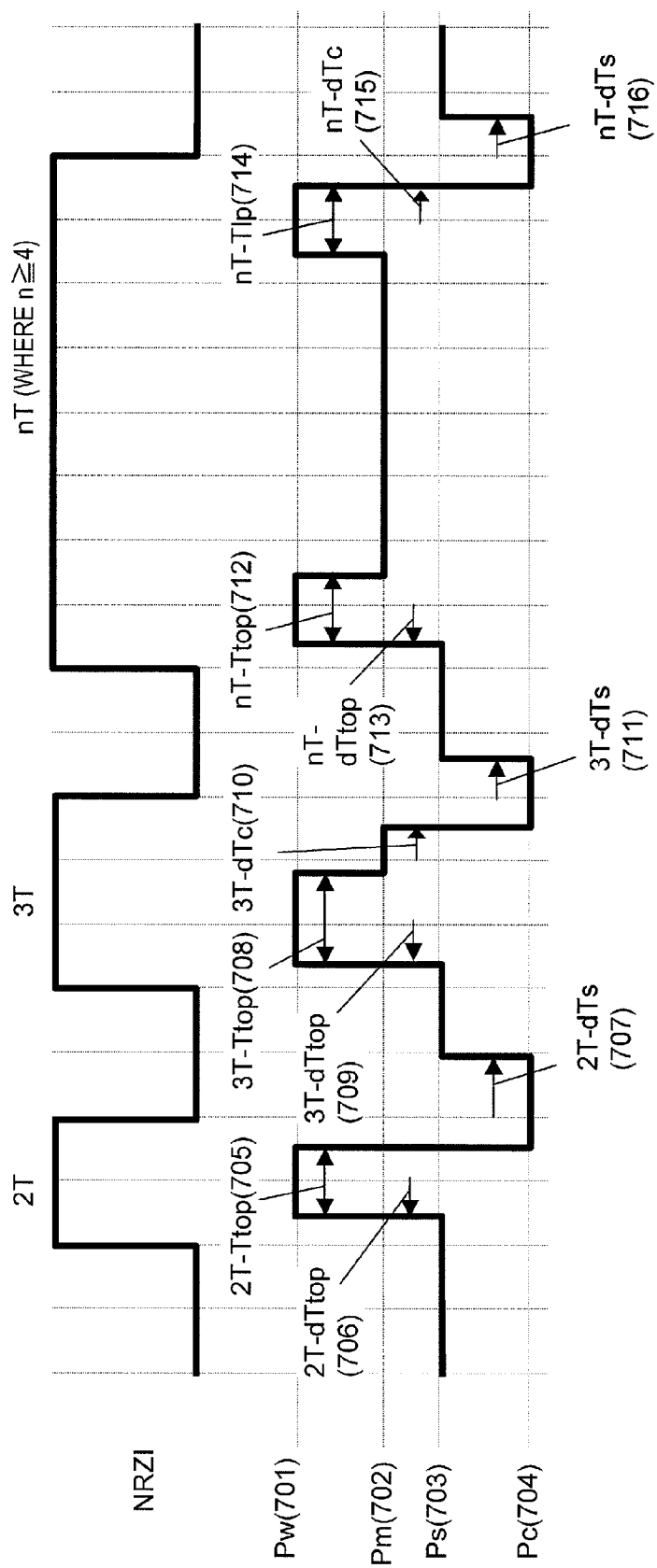

FIG. 7 illustrates an example of a castle type write strategy.

FIG. 8 shows the contents of disc information including a header information part 811, a read/write control information part 812 and a footer information part 813.

FIGS. 9(a) to 9(c) show an exemplary makeup of the read/write control information of an expanded castle type write strategy.

Figure 10:
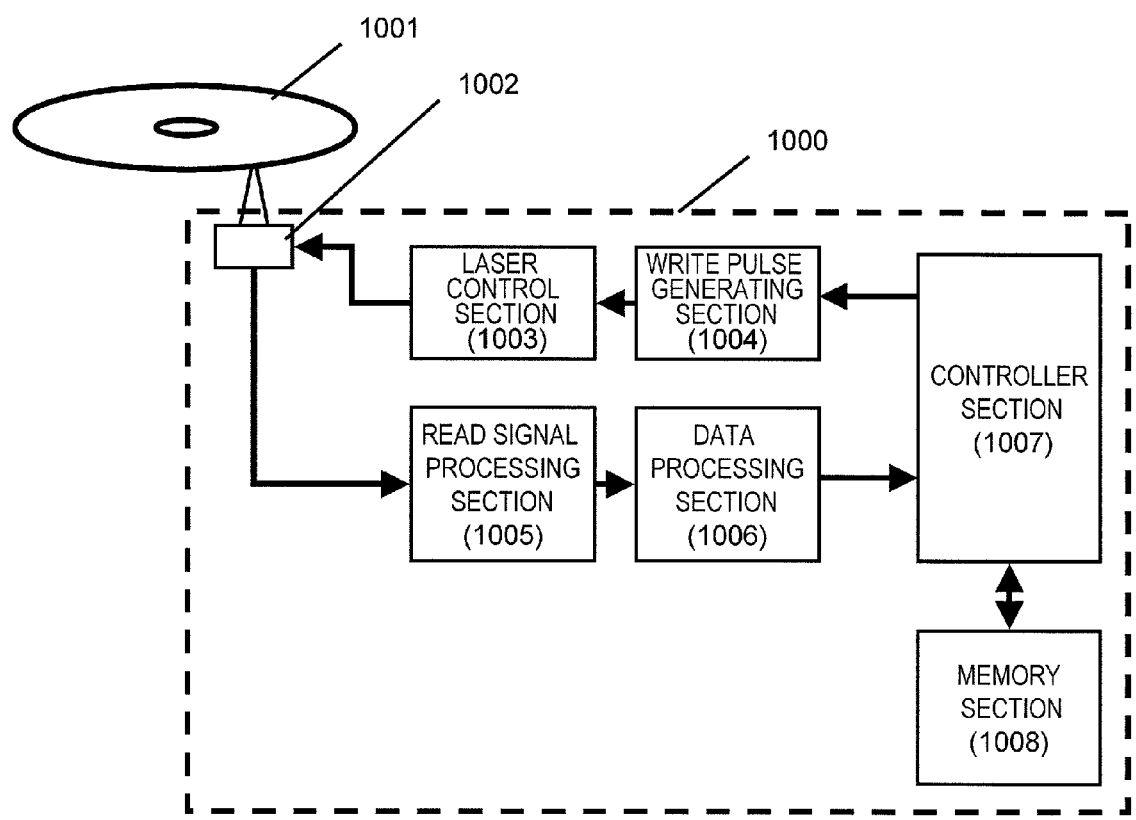

FIG. 10 illustrates an optical disc drive 1000 according to a first preferred embodiment of the present invention.

Figure 11:
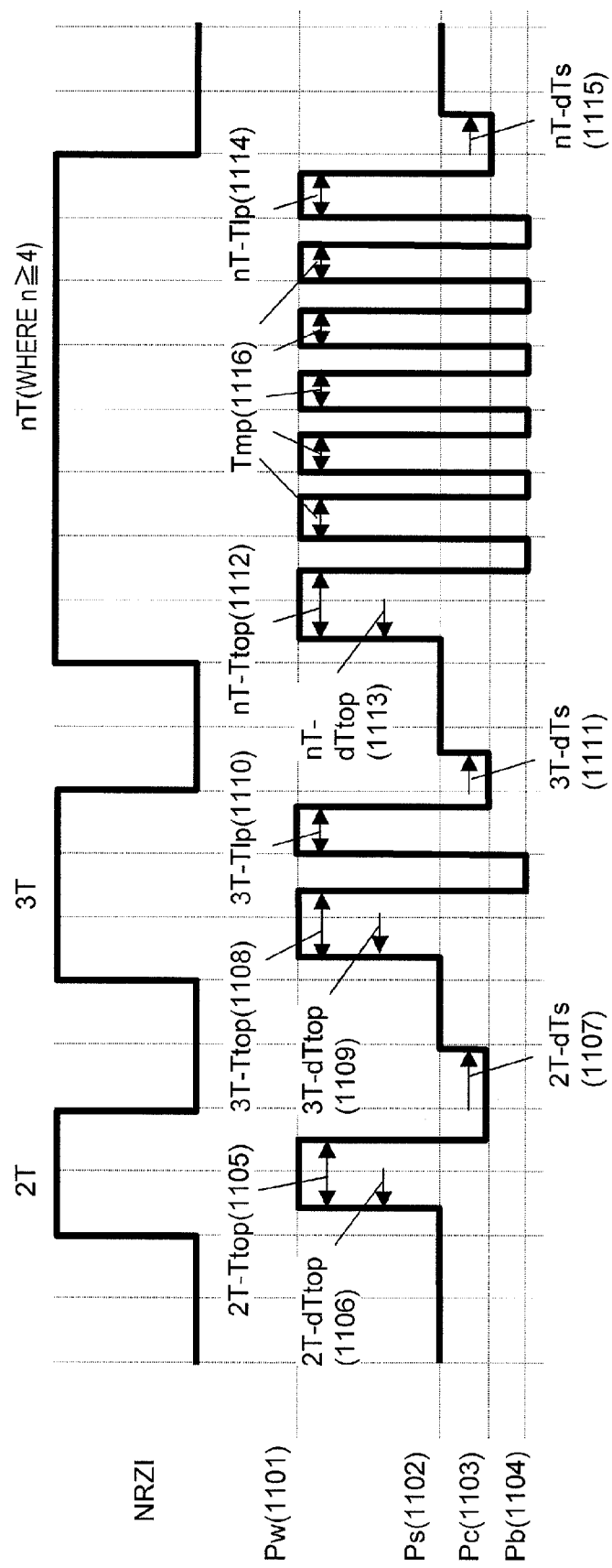

FIG. 11 illustrates an example of an N−1 type write strategy.

FIG. 12 shows the contents of disc information including a header information part 811, a read/write control information part 812 and a footer information part 813.

FIGS. 13(a) to 13(c) show an exemplary makeup of the read/write control information of an expanded N−1 type write strategy.

Figure 14:
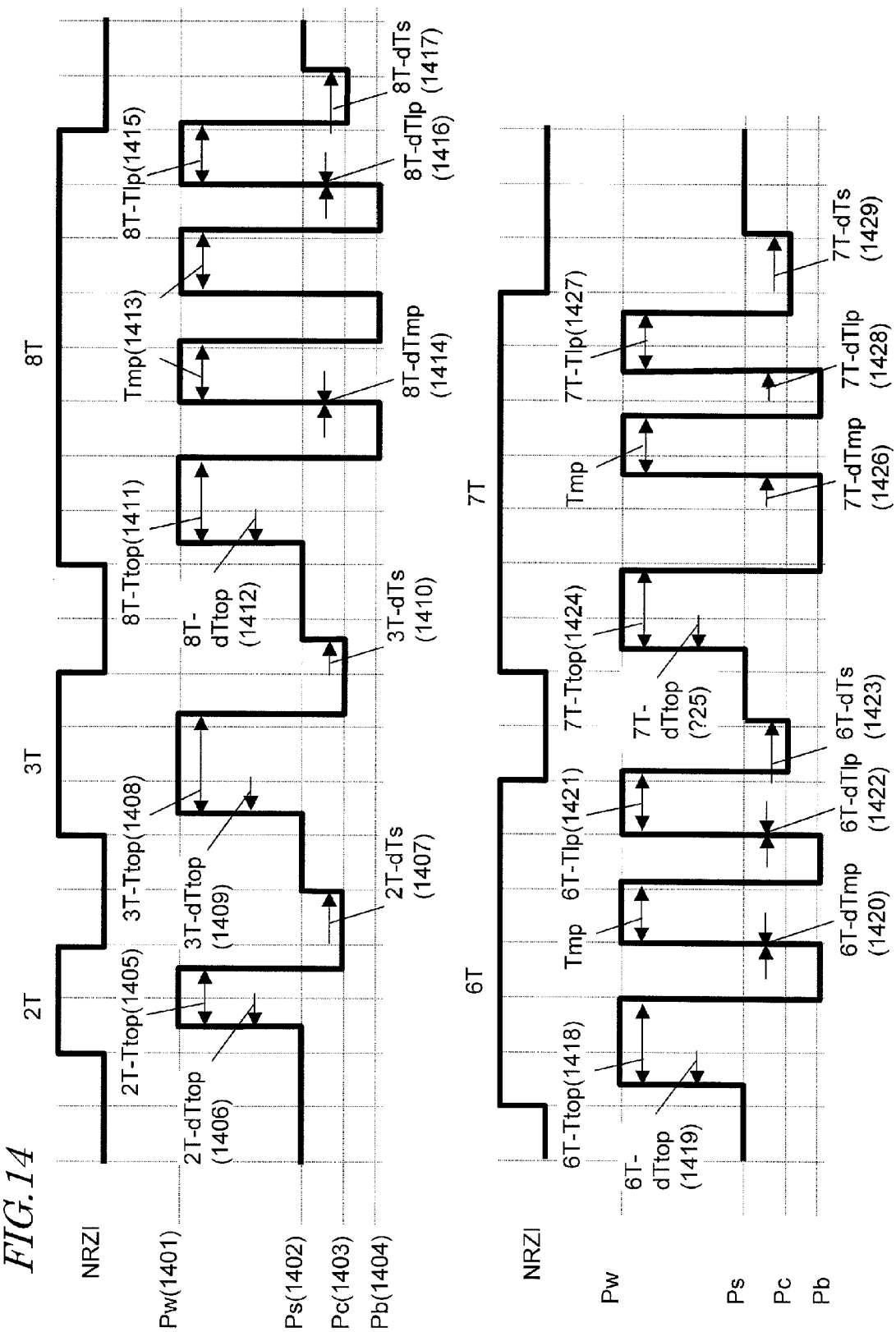

FIG. 14 illustrates an example of an N/2 type write strategy.

FIG. 15 shows an exemplary makeup of the read/write control information of the N/2 type write strategy.

Figure 16:
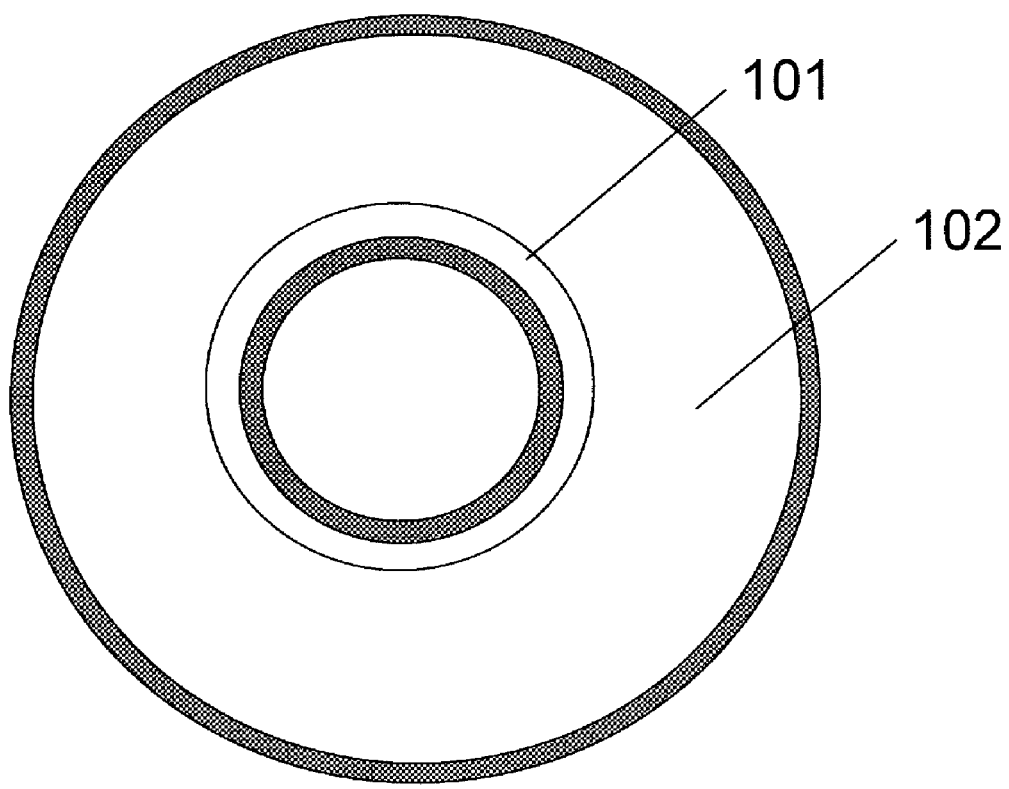

FIG. 16 is a plan view illustrating an information storage medium as a fourth preferred embodiment of the present invention.

Figure 17:
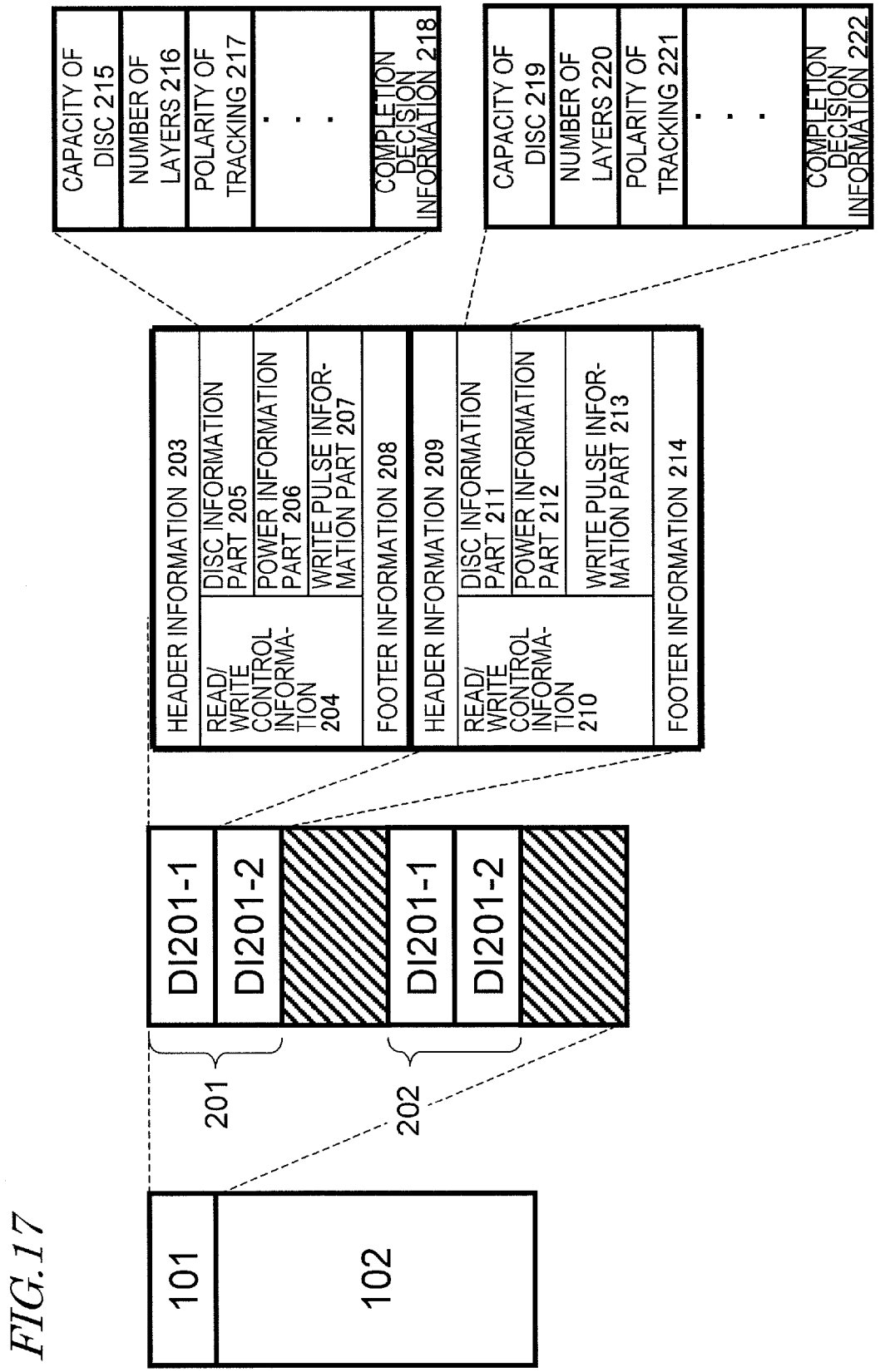

FIG. 17 shows an exemplary format for the control information area.

Figure 18:
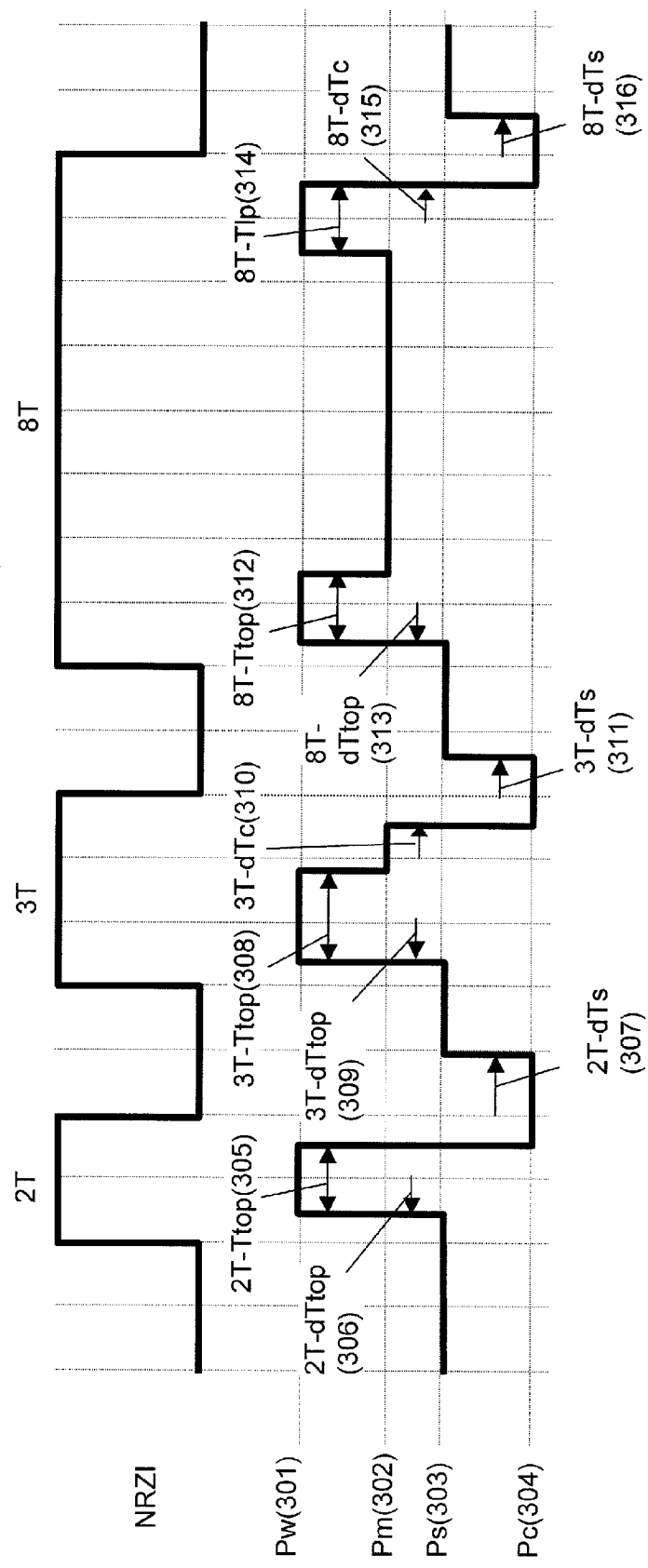

FIG. 18 illustrates an exemplary write pulse waveform with a castle type write strategy.

FIG. 19 shows an exemplary arrangement of respective pieces of information of DI 201-1 of DI 201.

FIG. 20 shows an exemplary arrangement of respective pieces of information of DI 201-2 of the DI 201.

Figure 21:
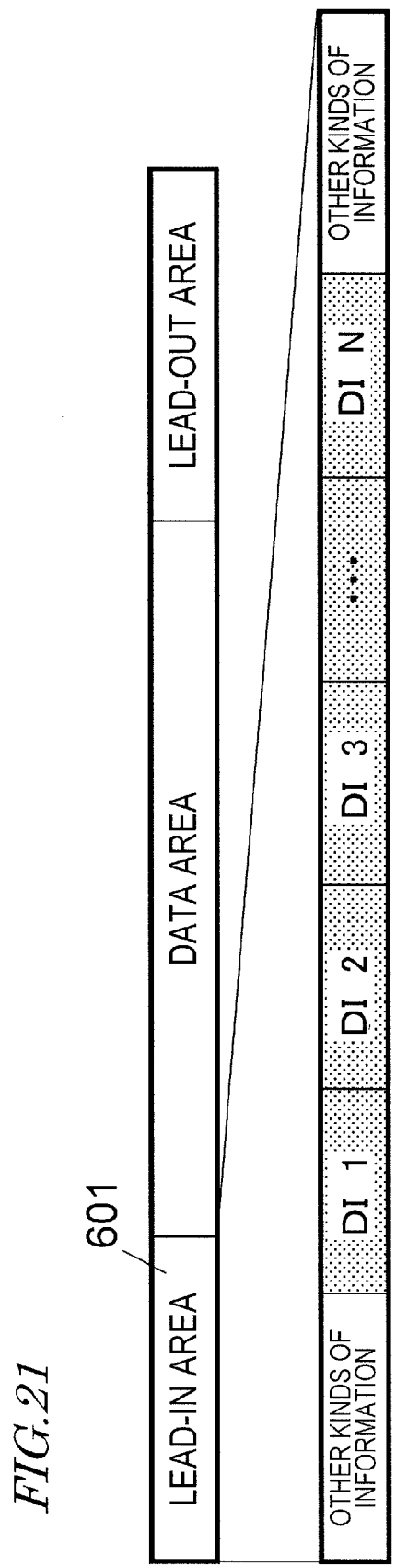

FIG. 21 schematically illustrates the structure of a BD.

Figure 22:
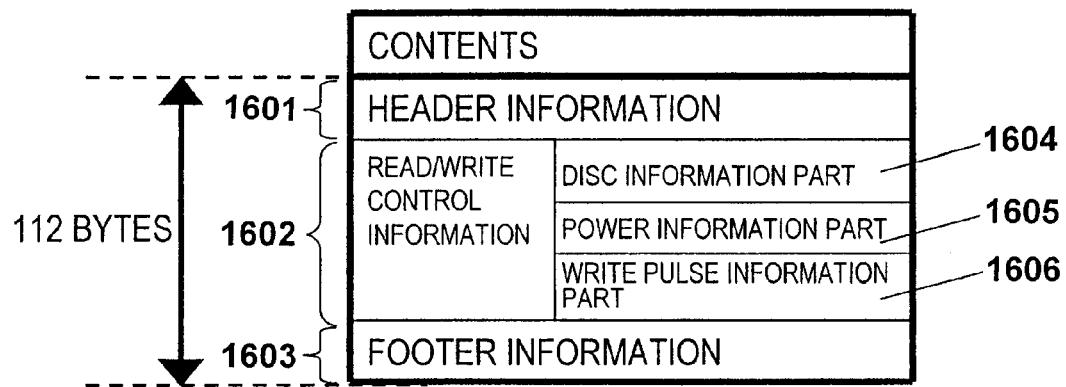

FIG. 22 schematically shows the makeup of the DI of a BD.

Figure 23:
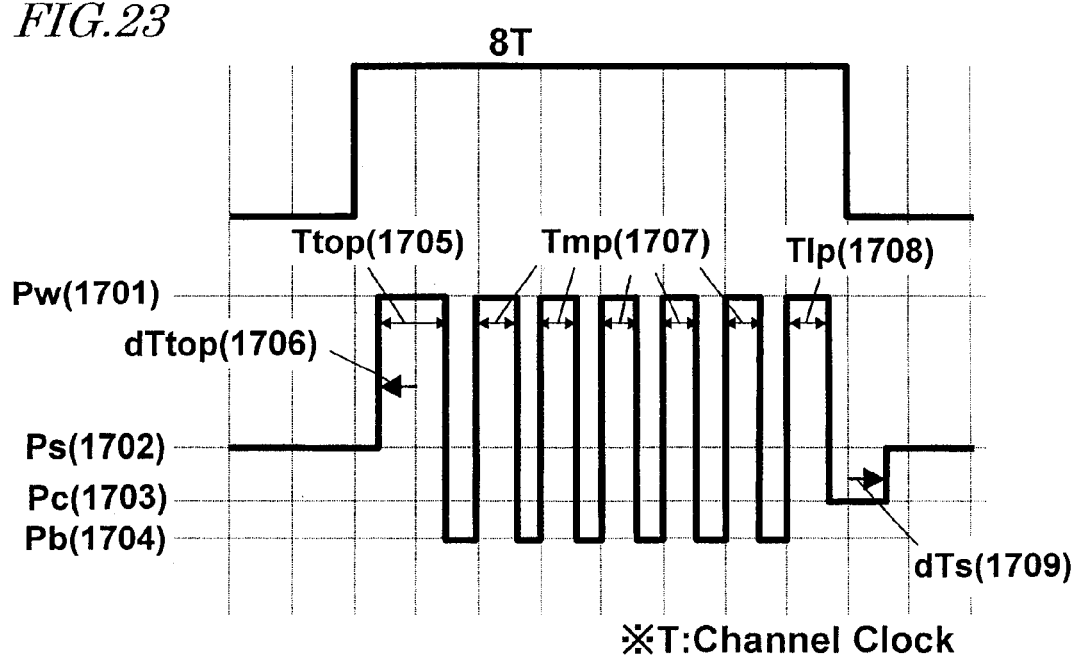

FIG. 23 illustrates an exemplary write pulse waveform.

FIG. 24 shows an exemplary storage format of DI.

Figure 25:
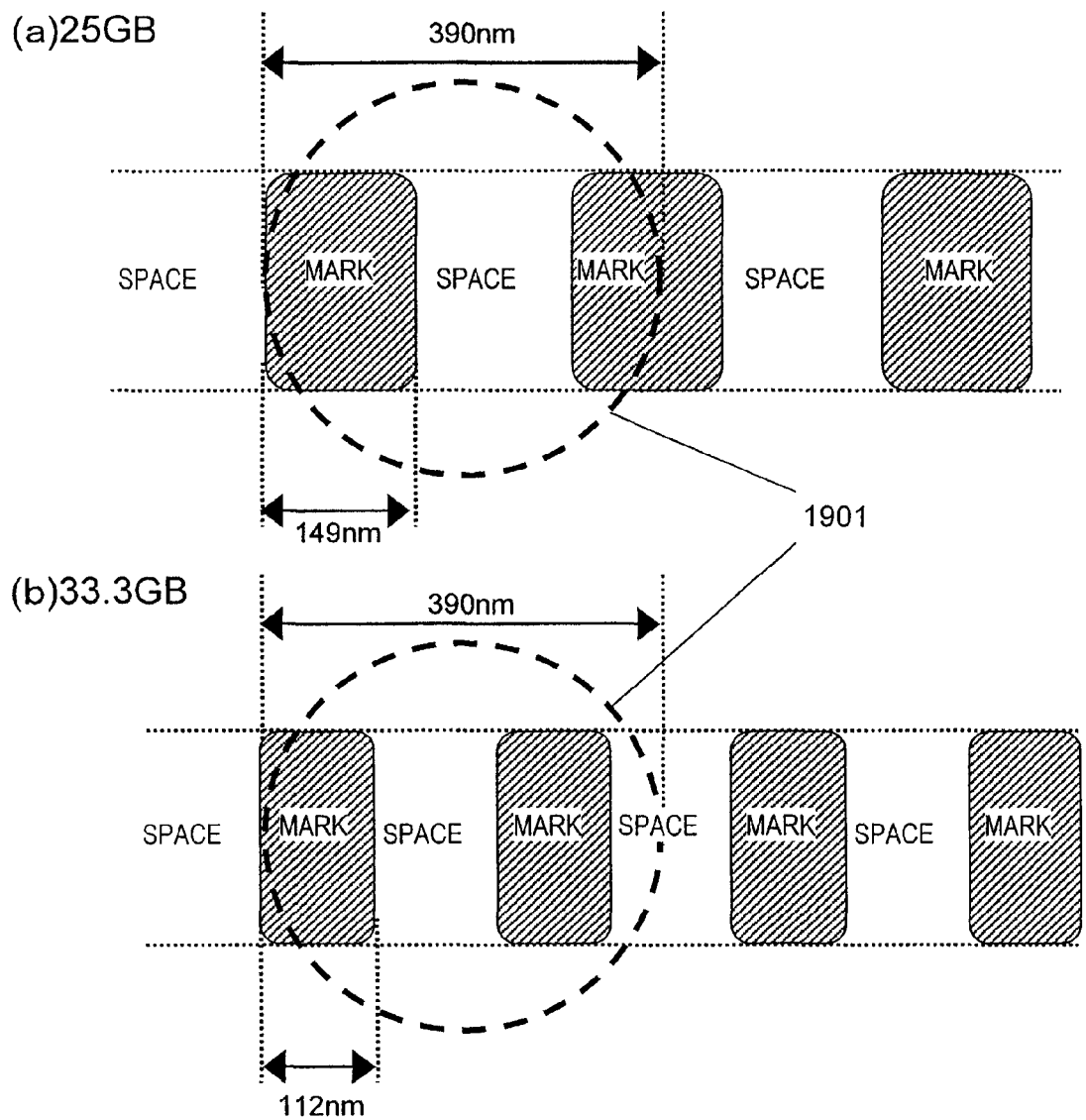

Portions (a) and (b) of FIG. 25 illustrate relations between the size of a light beam spot and mark lengths on two optical discs with mutually different storage capacities.

Figure 26:
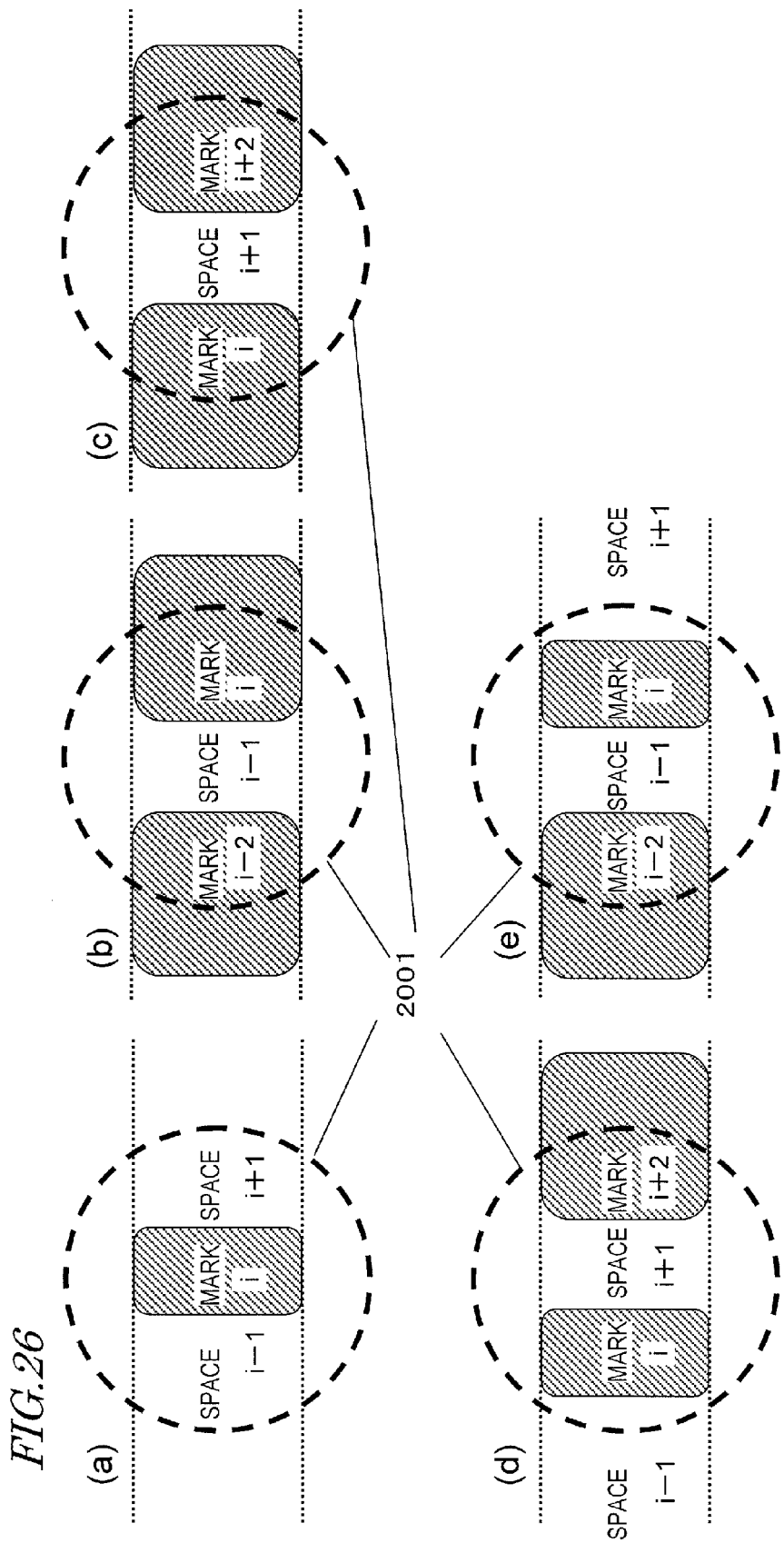

FIG. 26 illustrates typical relations between the size of a light beam spot 2001 and patterns each including multiple marks or spaces.

FIG. 27 summarizes methods of dividing the DI into various patterns.

FIG. 28 shows an exemplary set of DI for an information storage medium on which a write operation is supposed to be performed at a conventional density.

FIG. 29 shows an exemplary first set of DI for an information storage medium on which a write operation is supposed to be performed at a high density.

FIG. 30 shows an exemplary second set of DI for an information storage medium on which a write operation is supposed to be performed at a high density.

FIG. 31 shows how parameters concerning the beginning of a mark may be stored as the first set of DI.

FIG. 32 shows how parameters concerning the end of a mark may be stored as the second set of DI.

FIG. 33 shows how parameters with a greater number of bytes may be stored as the first set of DI.

FIG. 34 shows how parameters may be stored as the second set of DI in a situation where parameters with a greater number of bytes are stored as the first set of DI.

Figure 35:
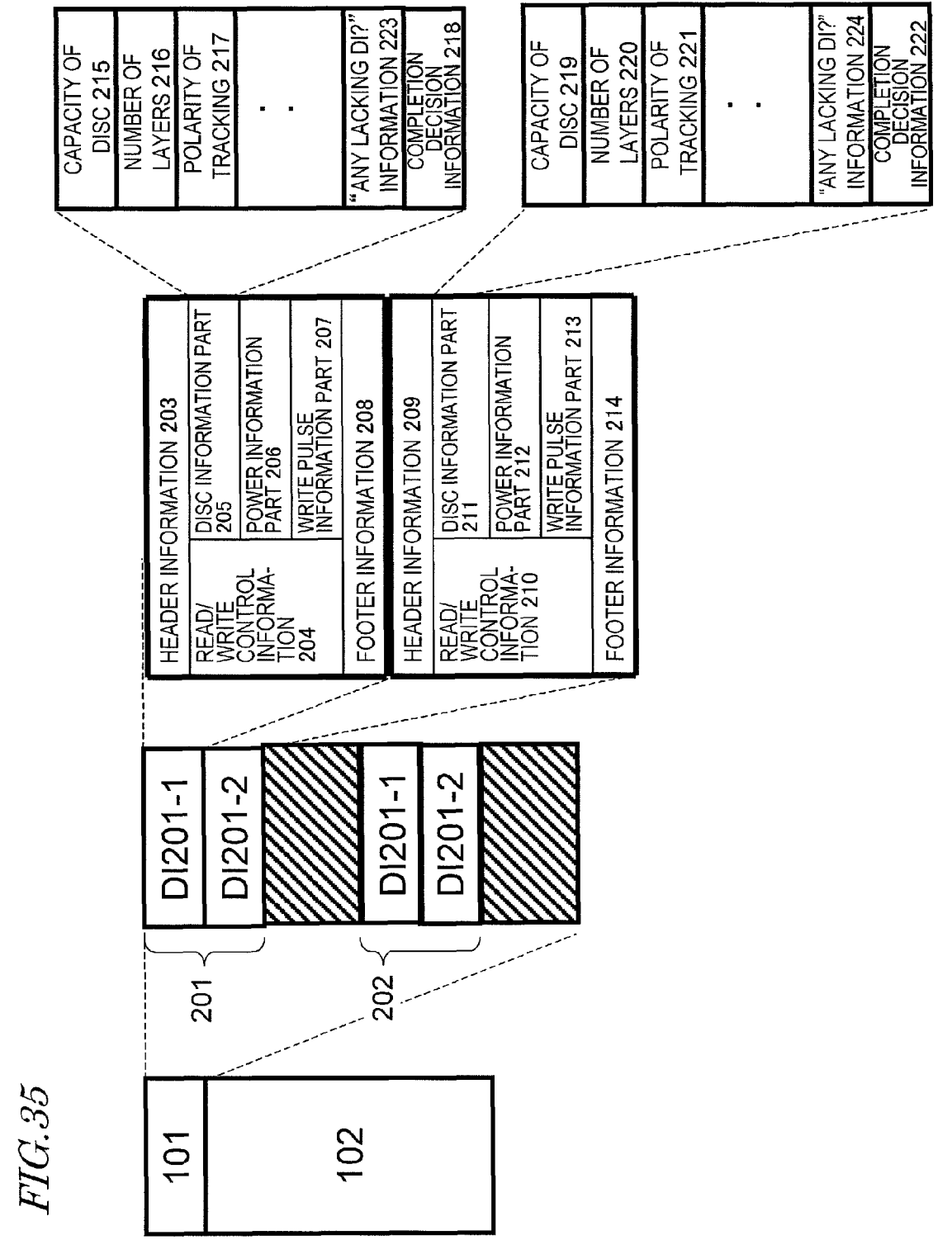

FIG. 35 shows an exemplary format for a control information area.

FIG. 36 shows an exemplary makeup of "any lacking DI?" information 223.

FIG. 37 is a schematic representation illustrating a normal structure for a multilayer disc.

FIG. 38 is a schematic representation illustrating the structure of a single-layer disc.

FIG. 39 is a schematic representation illustrating the structure of a dual-layer disc.

Figure 40:
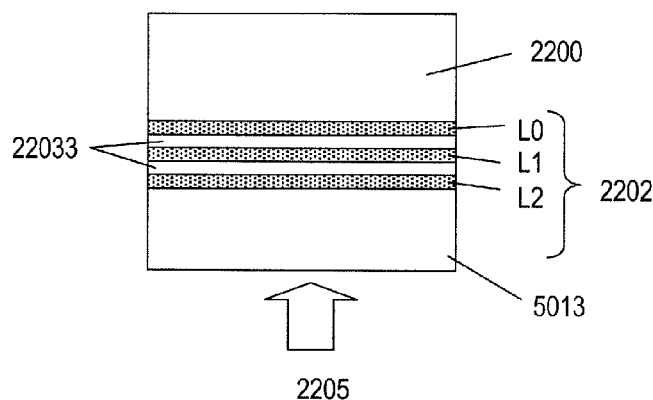

FIG. 40 is a schematic representation illustrating the structure of a three-layer disc.

Figure 41:
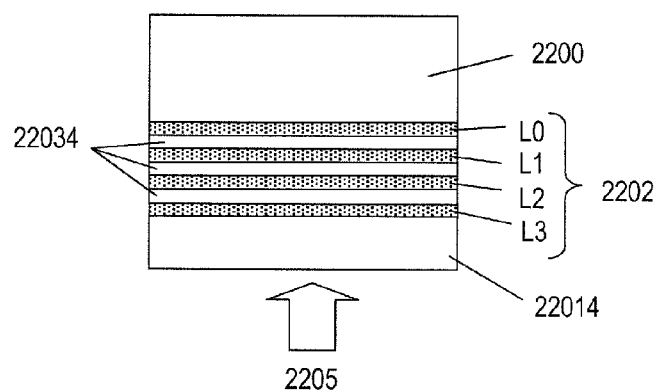

FIG. 41 is a schematic representation illustrating the structure of a four-layer disc.

Figure 42:
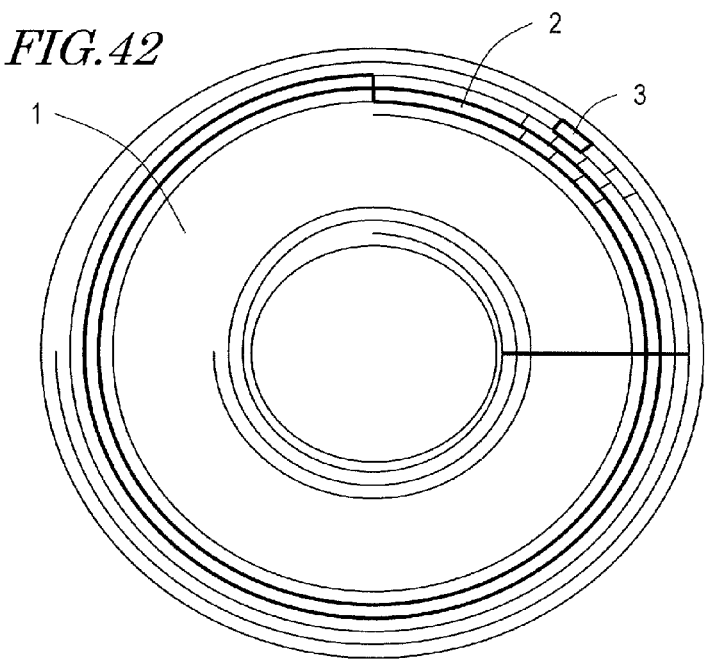

FIG. 42 is a schematic representation illustrating the physical structure of an optical disc 1 as a sixth preferred embodiment of the present invention.

FIG. 43(A) illustrates an example of a 25 GB BD, and FIG. 43(B) illustrates an example of an optical disc with an even higher storage density than a 25 GB BD.

Figure 44:
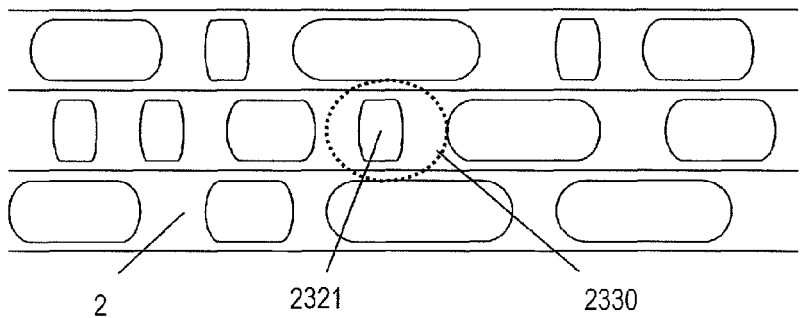

FIG. 44 is a schematic representation illustrating how a series of marks on a track is irradiated with a light beam.

Figure 45:
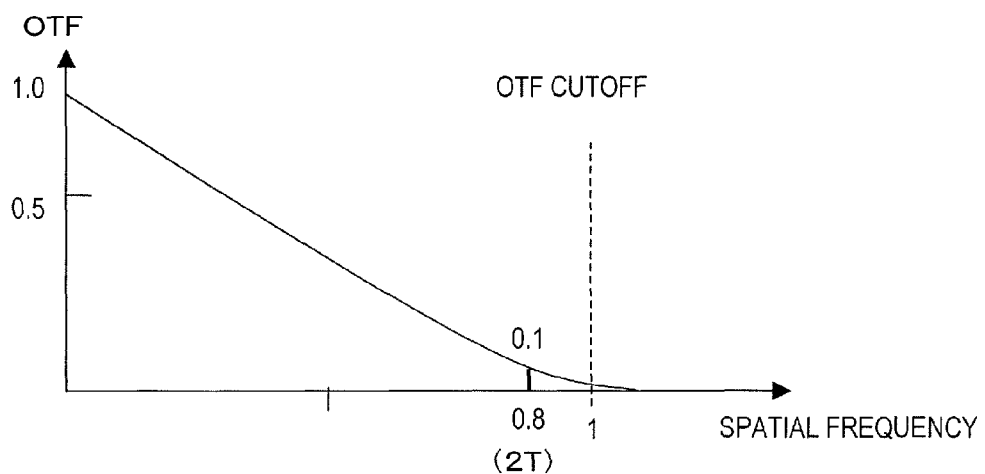

FIG. 45 is a graph showing how the OTF of a BD with a storage capacity of 25 GB changes with the shortest recording mark length.

Figure 46:
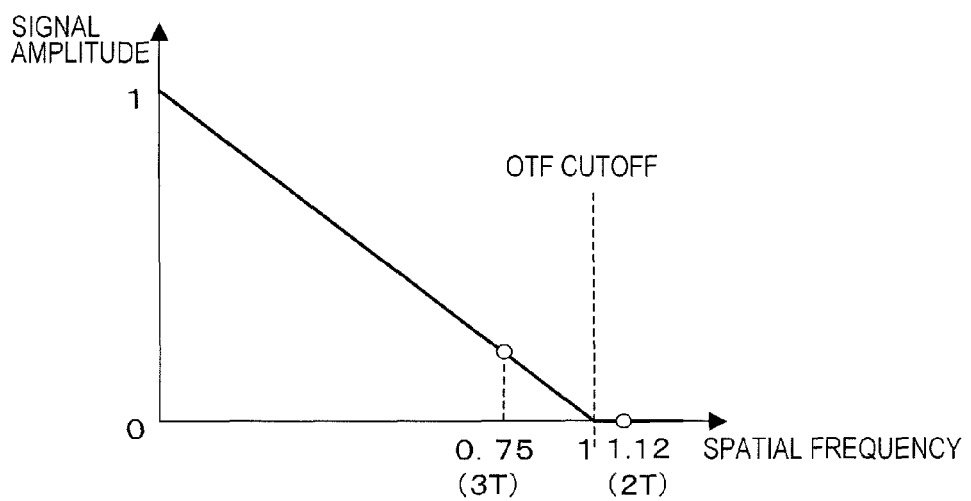

FIG. 46 is a graph showing how the signal amplitude changes with the spatial frequency in a situation where the spatial frequency of the shortest mark (2T) is higher than the OTF cutoff frequency and where the 2T read signal has zero amplitude.

Figure 47:
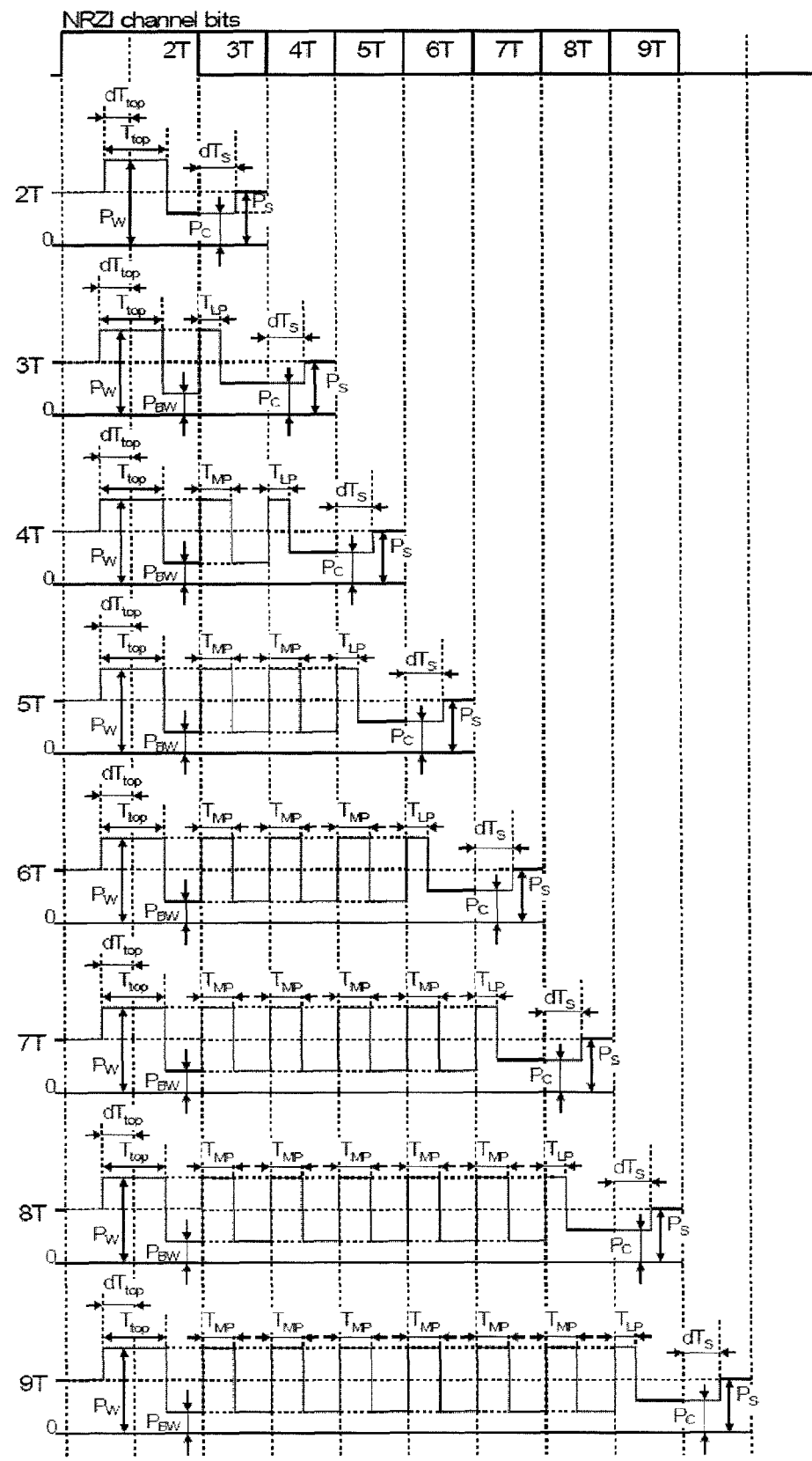

FIG. 47 illustrates a first type of write waveforms with a multi-pulse-type strategy.

Figure 48:
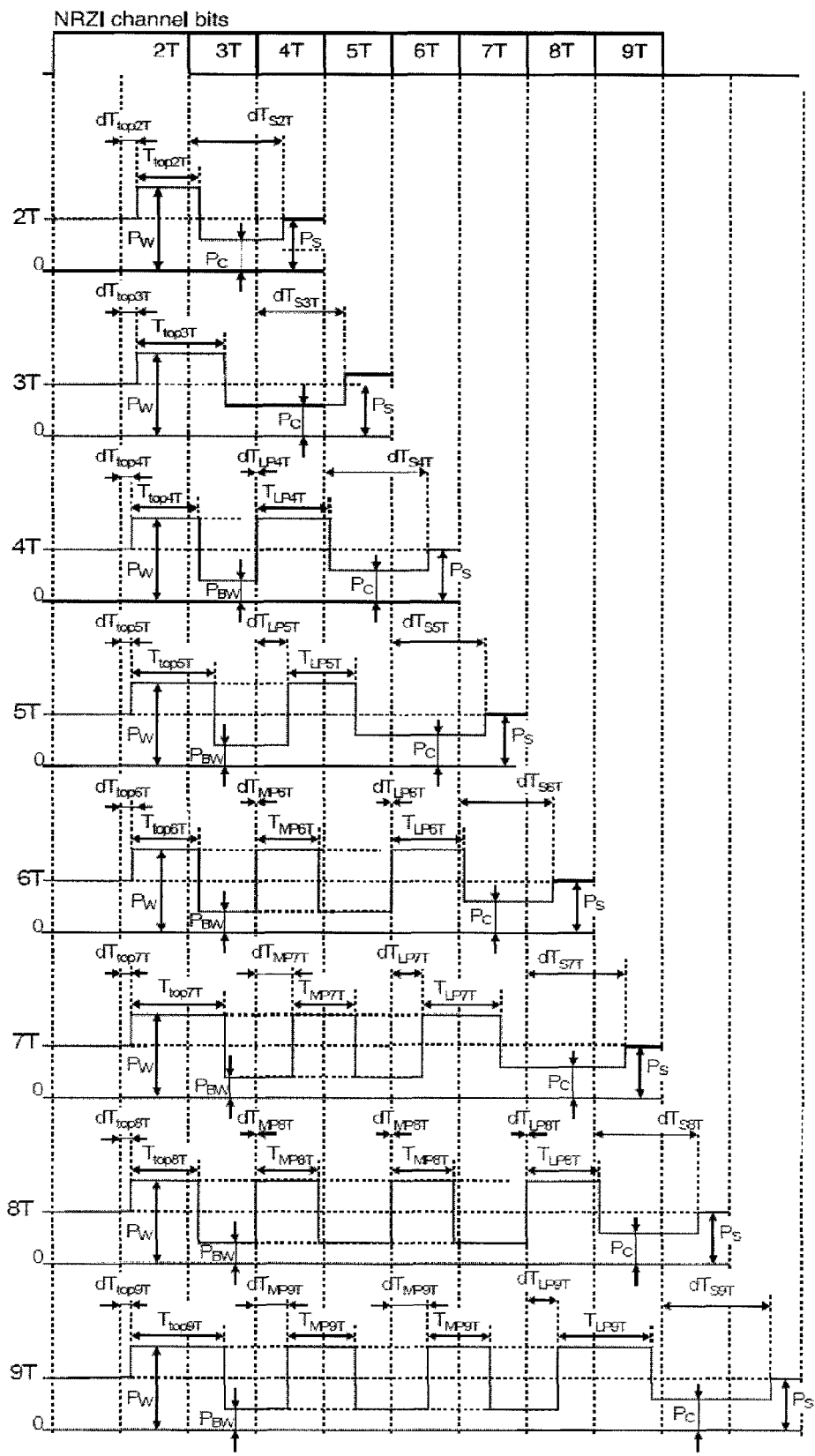

FIG. 48 illustrates a second type of write waveforms with a multi-pulse-type strategy.

Figure 49:
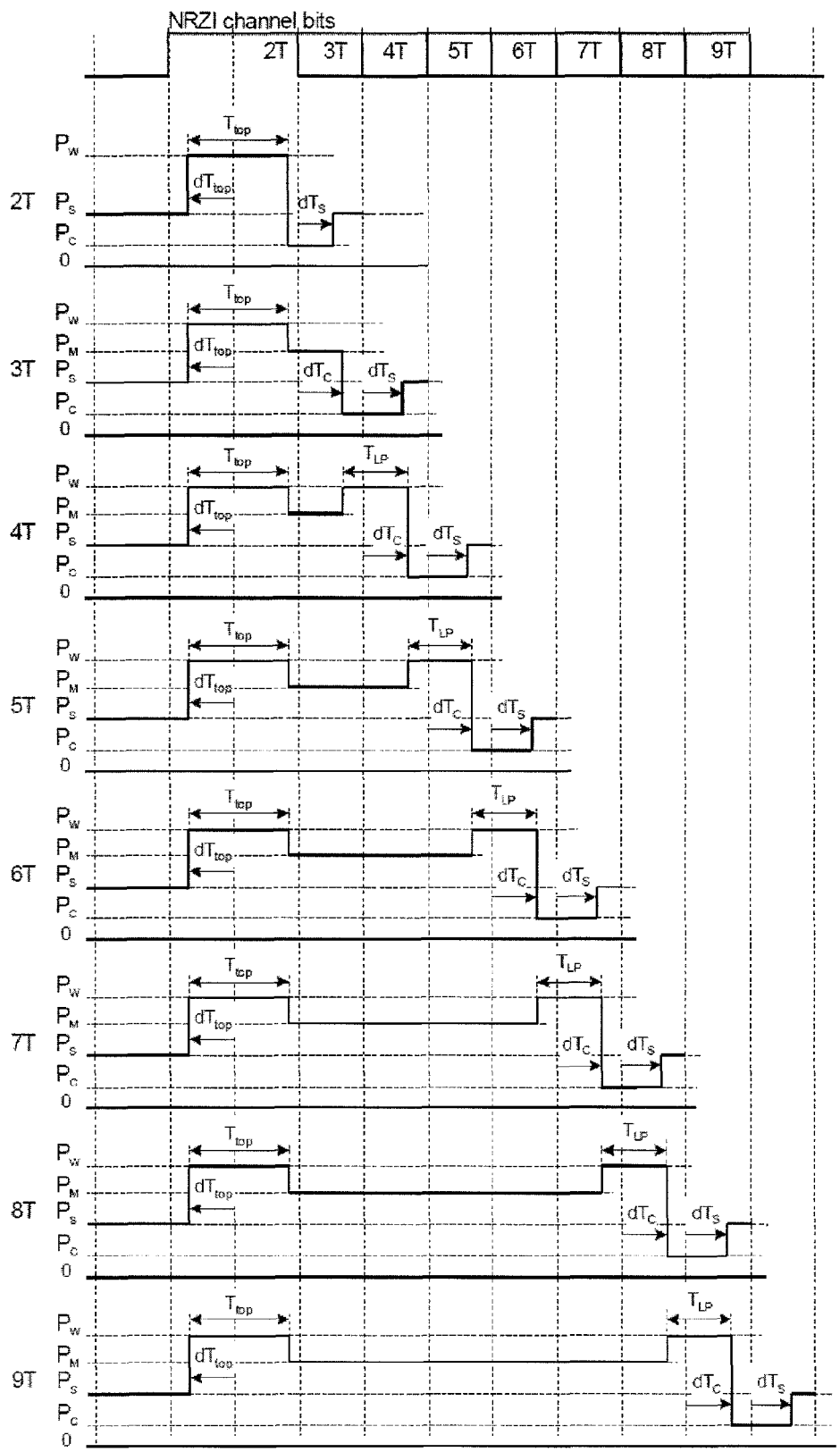

FIG. 49 illustrates a third type of write waveforms with a multi-pulse-type strategy.

DETAILED DESCRIPTION OF PREFERRED EMBODIMENTS

Hereinafter, preferred embodiments of the present invention will be described with reference to the accompanying drawings. In the following description, any pair of components shown in multiple drawings and having substantially the same function will be identified by the same reference numeral. And once such a component has been described, the description of its counterpart will be omitted herein to avoid redundancies.

In the following description of the first, second and fourth preferred embodiments of the present invention, various write strategies will be described in association with the present invention. Added to that, write strategies will also be described in detail with respect to the sixth preferred embodiment of the present invention as well.

Embodiment 1

Hereinafter, a method for defining read/write control information according to a first specific preferred embodiment of the present invention will be described.

FIG. 10 illustrates an optical disc drive 1000 according to the first preferred embodiment of the present invention.

The optical disc drive 1000 reads or writes information from/on a given information storage medium 1001.

The information storage medium 1001 may be an optical disc, for example.

The optical disc drive 1000 includes an optical head section 1002, a laser control section 1003, a write pulse generating section 1004, a read signal processing section 1005, a data processing section 1006, a controller section 1007, and a memory section 1008.

First of all, it will be described how this optical disc drive 1000 performs a read operation.

The optical head section 1002 converges a laser beam, which has been transmitted through an objective lens, onto a target storage layer of the information storage medium 1001 and receives the light reflected from it, thereby generating an analog read signal representing the information stored on the information storage medium 1001.

The analog read signal obtained from the information storage medium 1001 is subjected to signal processing by the read signal processing section 1005, which then passes a digital signal generated to the data processing section 1006.

In response, the data processing section 1006 generates read data based on the digital signal received and then provides that data for the controller section 1007.

Next, it will be described how this optical disc drive 1000 performs a write operation.

First, the controller section 1007 supplies write data and read/write control information to the write pulse generating section 1004.

That read/write control information is stored on the information storage medium 1001.

The write pulse generating section 104 generates a write signal based on the write data received and writing conditions, and then provides that write signal for the laser control section 1003.

On receiving the write signal generated, the laser control section 1003 controls the emission pattern of a laser beam from a laser diode built in the optical head section in accordance with the write signal, thereby forming marks on the information storage medium 1001. In this manner, data is written on the information storage medium 1001.

Hereinafter, an exemplary write pulse waveform for use to perform a write operation will be described.

FIG. 7 illustrates a so-called "castle type" write strategy. The write pulse waveform illustrated in FIG. 7 is supposed to be applied to a situation where a RLL (1, 7) recording code is used to form recording marks including 2T (that is the shortest one and where T is a channel clock pulse width) through 8T marks and 9T marks for use as a sync pattern to detect a particular timing such as a data start point.

The 2T mark of the castle type write strategy shown in FIG. 7 includes a top pulse, which starts at a point in time defined by 2T-dTtop 706 and which contributes to emitting a laser beam at a peak power Pw (701) for a period of time defined by 2T-Ttop 705, and a cooling pulse, which contributes to emitting a laser beam at a cooling power Pc (704) from a point in time when the top pulse falls through a point in time when the power rises from the cooling power Pc (704) to the space power Ps (703) as defined by 2T-dTs 707.

The 3T mark of the castle type write strategy shown in FIG. 7 includes a top pulse, which starts at a point in time defined by 3T-dTtop 709 and which contributes to emitting a laser beam at a peak power Pw (701) for a period of time defined by 3T-Ttop 708, and a cooling pulse, which contributes to emitting a laser beam at a cooling power Pc (704) from a point in time when the top pulse falls through a point in time when the power rises from the cooling power Pc (704) to the space power Ps (703) as defined by 3T-dTs 711.

Speaking more generally, the nT mark (where n is an integer of four through nine) of the castle type write strategy shown in FIG. 7 includes: a top pulse, which starts at a point in time defined by nT-dTtop 713 and which contributes to emitting a laser beam at the peak power Pw (701) for a period of time defined by nT-Ttop 712; a last pulse, which ends at a point in time defined by nT-dTc 715 and which contributes to emitting a laser beam at the peak power Pw (701) for a period of time defined by nT-Tlp 714; a middle pulse, which contributes to emitting a laser beam at a middle power Pm (702) from a point in time when the top pulse falls through a point in time when the last pulse rises; and a cooling pulse, which contributes to emitting a laser beam at a cooling power Pc (704) from a point in time when the last pulse falls through a point in time when the power rises from the cooling power Pc (704) to the space power Ps (703) as defined by nT-dTs 716.

It should be noted that the respective parameters of the nT mark could vary according to the n value that falls within the range of four through nine or could remain the same once the n value reaches a certain number.

Next, an exemplary makeup of the disc information, including the read/write control information represented by the castle type write strategy shown in FIG. 7, will be described with reference to FIG. 8.

FIG. 8 shows the contents of disc information including a header information part 811, a read/write control information part 812 and a footer information part 813. The disc information is made up using 112 bytes as a unit.

Also, the read/write control information part 812 includes a disc control information part 814, a power information part 815 and a write pulse information part 816.

Among the parameters included in the write pulse information part 816 shown in FIG. 8, the parameters dTtop (802) and Ttop (803) about the space preceding a recording mark are defined so as to make the write pulse adjustable with respect to the length of the preceding space.

Hereinafter, the write pulse information part 816 will be described in detail.

Every parameter included in the write pulse information part 816 shown in FIG. 8 has a size of 1 byte.

The parameters dTc 801 of the castle type write strategy are classified into the three categories of "3T mark", "4T mark", and "5T or longer mark". The total size of these three categories combined is 3 bytes.

The parameters dTtop 802 of the castle type write strategy are classified into the three categories of "2T mark", "3T mark", and "4T or longer mark". Each of these categories of recording marks is further classified into the three sub-categories of "preceding 2T space", "preceding 3T space" and "preceding 4T or longer space". The total size of these three categories combined is 9 bytes.

The parameters Ttop 803 of the castle type write strategy are also classified into the three categories of "2T mark", "3T mark", and "4T or longer mark". Likewise, each of these categories of recording marks is further classified into the three sub-categories of "preceding 2T space", "preceding 3T space" and "preceding 4T or longer space". The total size of these three categories combined is 9 bytes, too.

The parameter Tlp 804 of the castle type write strategy is defined to consist of only "4T or longer mark" and has a size of 1 byte.

The parameters dTc 801 of the castle type write strategy are classified into the three categories of "3T mark", "4T mark", and "5T or longer mark". The total size of these three recording marks combined is 3 bytes. The write pulse information part 816 also has reserved part 806 of 19 bytes.

Every bit of the reserved part 806 may be represented as zero or one. Alternatively, any other kind of information could be stored instead of the reserved part 806.

Portion (a) of FIG. 5 illustrates the relation between the size of a light beam spot 51 and the shortest marks (2T marks) in a situation where a storage capacity of 25 GB is provided. On the other hand, portion (b) of FIG. 5 illustrates the relation between the size of the light beam spot 51 and the shortest marks (2T marks) in a situation where a storage capacity of 33.3 GB is provided. Each of these drawings illustrates a situation where 2T marks are recorded on the information storage medium 1001 of this preferred embodiment. Comparing the recording marks to provide 25 GB to the recording marks to provide a capacity of as high as 33.3 GB, it can be seen that the physical length of the latter recording marks is approximately 75% of that of the former. In the exemplary 2T marks shown in portions (a) and (b) of FIG. 5, for instance, the recording marks to provide a storage capacity of 25 GB has a length of 149 nm, while the recording mark to provide a storage capacity of 33.3 GB has a length of 112 nm.

That is why to get high-density writing done on the information storage medium 1001 of this preferred embodiment, the read/write control information with the castle type write strategy that has been described with reference to FIGS. 7 and 8 is defined in view of the following considerations.

First of all, since the physical length of recording marks has shortened, a recording mark being formed could be affected by the heat generated by a laser beam that irradiated the information storage medium 1001 to make the previous mark or a laser beam that will irradiate the information storage medium 1001 to make the next mark. This is a so-called "thermal interference" phenomenon that affects even marks defined by longer channel clock pulses, and is taken into account in this preferred embodiment.

Thus, in view of this consideration, the respective parameters are classified into expanded categories of "2T mark", "3T mark", "4T mark" and "5T or longer mark".

Secondly, since the detection system of the apparatus of this preferred embodiment has been affected by such an increase in storage density (i.e., the physical length of recording marks has decreased with respect to the size of a laser beam spot), the degree of intersymbol interference when a read signal is generated will vary according to not only the length of the preceding space but also combination of other spaces and marks. This also needs to be taken into account according to this preferred embodiment. Examples of such combinations of other spaces and marks include a combination of the current mark and the preceding and succeeding spaces, a combination of the current and previous marks and the preceding space, a combination of the current and next marks and the succeeding space, a combination of the current and previous marks and the preceding and succeeding spaces, and a combination of the current and next marks and the preceding and succeeding spaces. The shorter the recording mark, the more significantly the mark will be affected by intersymbol interference.

Thus, in view of this consideration, the write pulse parameters, which have been classified based on only the lengths of the preceding space, are classified into expanded categories of a combination of the current mark and the preceding space, a combination of the current mark and the preceding and succeeding spaces, a combination of the current and previous marks and the preceding space, a combination of the current and next marks and the succeeding space, a combination of the current and previous marks and the preceding and succeeding spaces, and a combination of the current and next marks and the preceding and succeeding spaces.

This expansion is done on the shortest 2T marks. Also, the previous and next marks are just classified into only the two categories of "2T mark" and "3T or longer mark" and the preceding and succeeding spaces are also classified into only the two categories of "2T space" and "3T or longer space". In this manner, an excessive increase in the size of parameter information can be avoided.

FIG. 9 shows how the disc information is defined by such expansion and classification.

Hereinafter, that expanded and classified disc information will be described in detail with reference to FIG. 9.

First of all, to ensure compatibility in disc information between a disc with normal storage density and a disc with an increased storage density, the general makeup of the disc information, consisting of the header information part 811, the read/write control information part 812, and the footer information part 813, and their numbers of bytes are supposed to be maintained.

Since the write pulse information has been expanded as described above, the size of write pulse information required increases.

Thus, the space for the expanded write pulse information part 916, which now has an increased size, is provided by either cutting down the space left for the disc control information part 914 or the power information part 915 in the read/write control information part 812 or compressing their information retained or reducing its size.

The spaces left for the disc control information part 914 and the power information part 915 can be cut down by reducing the unused spaces of those information parts.

On the other hand, the information retained by the disc control information part 914 and the power information part 915 can be compressed or reduced by either decreasing the number of bits used and the size with the resolution of their settings lowered or decreasing the number of items of the multiple parameters by at least one. The latter can be done by deleting at least one of multiple power settings of the laser beam emitted for reading, which are defined for multiple different read rates. Alternatively, if multiple different pieces of emission power information are provided for different methods of producing emission (such as DC emission and RF superposition emission), at least one of those pieces of emission power information can be deleted.

Hereinafter, it will be described in detail how to classify the respective parameters of the write pulse information part 916 shown in FIG. 9(a). In FIGS. 9(a) to 9(c), every parameter is supposed to have a size of 1 byte.

The write pulse information part 916 of this preferred embodiment, which has been expanded to cope with high-density writing, includes a fundamental part 917 and an expanded part 918.

FIG. 9(*b*) shows exactly how the parameters are classified in the fundamental part 917, which includes a fundamental dTc 921, a fundamental dTtop 922, a fundamental Ttop 923, a fundamental Tlp 924 and a fundamental dTs 925.

In this fundamental part 917, included are parameters that do not depend on the length of the space that precedes or succeeds the current recording mark or that of the previous or next mark. A non-expanded castle type write strategy can be generated based on only the write pulse information included in this fundamental part 917.

If a write operation is performed using such a castle type write strategy that is based on only the fundamental part 917, the SNR is more likely to decrease due to thermal interference or intersymbol interference compared to a situation where a write operation is performed using an expanded castle type write strategy. The use of such a castle type write strategy based on only the fundamental part 917, however, allows even an apparatus that cannot generate an expanded castle type write strategy (such as an information reading/writing apparatus of an older generation or a lower order) to write information on an information storage medium that realizes high-density writing.

FIG. 9(*c*) shows exactly how the parameters are classified in the expanded part 918, which has the following makeup.

The expanded dTc parameters 901 of the castle type write strategy expand the write strategy of each of "3T mark", "4T mark" and "5T or longer mark" by a 2T space that succeeds the recording mark, and have a total amount of information of 3 bytes combined.

The expanded dTtop and Ttop parameters 902 and 903 of the castle type write strategy are defined as follows.

Specifically, the write strategy of each of "3T mark", "4T mark" and "5T or longer mark" has been expanded by a 2T space that precedes the recording mark. Each of the expanded dTtop and expanded Ttop parameters 902 and 903 has a size of 3 bytes.

The parameters about a 2T mark are classified based on multiple different combinations of marks and spaces. Specifically, those parameters are classified by combining a group of categories consisting of previous 2T mark-preceding 2T space, previous 3T or longer mark-preceding 2T space, and preceding 3T or longer space and another group of categories consisting of succeeding 2T space-next 2T mark, succeeding 2T space-next 3T or longer mark, and succeeding 3T or longer space. In FIG. 9(*c*), "previous 3T or longer mark" is referred to as "previous ≧3T mark" and so forth. Each of those expanded dTtop and Ttop parameters 902 and 903 has a size of 8 bytes. Nevertheless, as for combinations including a preceding 3T or longer space or a succeeding 3T or longer space, the same settings as those of the fundamental dTtop and Ttop parameters 922 and 923 are applied.

The expanded Tlp parameters 904 of the castle type write strategy expand the write strategy of each of "4T mark" and "5T or longer mark" by a 2T space that succeeds the recording mark, and have a total size of 2 bytes combined.

The expanded dTs parameters 905 of the castle type write strategy expand the write strategy of each of "3T mark", "4T mark" and "5T or longer mark" by a 2T space that succeeds the recording mark, and have a total size of 3 bytes combined.

As in the expanded dTtop parameters 902, the parameters about a 2T mark are classified based on multiple different combinations of marks and spaces. Specifically, those parameters are classified by combining a group of categories consisting of preceding 2T space and preceding 3T or longer space, and another group of categories consisting of succeeding 2T space-next 2T mark, succeeding 2T space-next 3T or longer mark, and succeeding 3T or longer space. Those parameters about 2T marks have a total size of 5 bytes. Nevertheless, as for combinations including a preceding 3T or longer space or a succeeding 3T or longer space, the same settings as those of the fundamental dTs parameter 925 are applied.

In this manner, the total amount of information allocated to the disc control information part 914, the power information part 915 and the write pulse information part 916 can be kept constant while coping with the write pulse information that has been expanded to get high-density writing done.

As described above, according to this preferred embodiment, when a high-density write operation needs to be performed on an information storage medium, even an information reading/writing apparatus that is not compatible with expanded write pulses can also perform the write operation based on the read/write control information. Meanwhile, an information reading/writing apparatus that can cope with the expanded write pulses can define the size of the read/write control information that has been expanded to get the high-density write operation performed within a predetermined range with the influence of thermal or intersymbol interference, which could cause a decrease in the SNR of a read signal, taken into consideration. As a result, compatibility can be maintained with information reading/writing apparatuses of a lower order or an older generation and with information storage media of a lower order or an older generation with the size cut down significantly.

In the preferred embodiment described above, RLL (1, 7) is supposed to be used as the recording code. However, the present invention is in no way limited to that specific preferred embodiment.

Also, in the preferred embodiment described above, the respective parameters included in the write pulse information part 916, the fundamental part 917 and the expanded part 918 do not always have to be arranged in the order shown in FIG. 9.

Furthermore, in the preferred embodiment described above, the read/write control information is supposed to be stored on an information storage medium. However, that is just an example. Alternatively, the memory section 1008 of the optical disc drive 1000 could store the read/write control information, too. In that case, the read/write control information stored in the memory section 1008 does not have to include all of the disc control information part, power information part and write pulse information part shown in FIG. 9(*a*) but may include just some of them.

Furthermore, in the preferred embodiment described above, the present invention is supposed to be applied to a castle type write strategy. However, the present invention is never limited to the castle type write strategy. Alternatively, the present invention is also applicable to the N−1 type write strategy shown in FIGS. 11 and 12 or to the N/2 type write strategy shown in FIGS. 14 and 15.

Also, in the preferred embodiment described above, the mark and space lengths are supposed to be classified with specific numerical values. However, the present invention is in no way limited to that specific preferred embodiment. Alternatively, when 2T through 9T recording marks need to be formed, the mark and space lengths may also be classified into the categories of 2T, 3T, 4T, 5T and 6T or more, for example.

Furthermore, in the preferred embodiment described above, in the fundamental part of the write pulse information, parameters are supposed to be classified by longer preceding and succeeding spaces or longer previous and next marks. However, the present invention is in no way limited to that specific preferred embodiment. For example, the dTc parameter of the write pulse information to form a 3T mark may also have its fundamental part defined by a parameter associated with a succeeding 2T space and have its expanded part defined by a parameter associated with a succeeding 3T or longer space.

Embodiment 2

Hereinafter, an optical disc drive as a second specific preferred embodiment of the present invention will be described.

The optical disc drive of this second preferred embodiment has the same configuration as the optical disc drive 1000 shown in FIG. 10. That is why the optical disc drive of this preferred embodiment will be described with reference to FIG. 10 again.

The optical disc drive of this second preferred embodiment performs a partially different kind of processing from the optical disc drive 1000 shown in FIG. 10. Thus, the following description will be focused on only those differences and the rest of the processing procedure to be performed in common by both of the optical disc drives of the first and second preferred embodiments will not be described again to avoid redundancies.

The configuration of the optical disc drive 1000 of the second preferred embodiment of the present invention is also shown in FIG. 10.

FIG. 11 illustrates a so-called "N-1 type" write strategy. The write pulse waveform illustrated in FIG. 11 is supposed to be applied to a situation where a RLL (1, 7) recording code is used to form recording marks including 2T (that is the shortest one and where T is a channel clock pulse width) through 8T marks and 9T marks for use as a sync pattern to detect a particular timing such as a data start point.

The 2T mark of the N-1 type write strategy shown in FIG. 11 includes a top pulse, which starts at a point in time defined by 2T-dTtop 1106 and which contributes to emitting a laser beam at a peak power Pw (1101) for a period of time defined by 2T-Ttop 1105, and a cooling pulse, which contributes to emitting a laser beam at a cooling power Pc (1103) from a point in time when the top pulse falls through a point in time when the power rises from the cooling power Pc (1103) to the space power Ps (1102) as defined by 2T-dTs 1107.

The 3T mark of the N-1 type write strategy shown in FIG. 11 includes a top pulse, which starts at a point in time defined by 3T-dTtop 1109 and which contributes to emitting a laser beam at a peak power Pw (1101) for a period of time defined by 3T-Ttop 1108, a last pulse, which starts in 2T after NRZI and which contributes to emitting a laser beam at a peak power Pw (1101) for a period of time defined by 3T-Tlp 1110, a bottom pulse, which contributes to emitting a laser beam at a bottom power Pb (1104) from a point in time when the top pulse falls through a point in time when the last pulse rises, and a cooling pulse, which contributes to emitting a laser beam at a cooling power Pc (1103) from a point in time when the last pulse falls through a point in time when the power rises from the cooling power Pc (1103) to the space power Ps (1102) as defined by 3T-dTs 1111.

Speaking more generally, the nT mark (where n is an integer of four through nine) of the N-1 type write strategy shown in FIG. 11 includes: a top pulse, which starts at a point in time defined by nT-dTtop 1113 and which contributes to emitting a laser beam at the peak power Pw (1101) for a period of time defined by nT-Ttop 1112; multiple pulses, which start synchronously with an NRZI channel clock pulse and which contribute to emitting a laser beam at the peak power Pw (1101) for a period of time defined by Tmp 1116 and at the bottom power Pb (1104) until the laser beam is emitted at the peak power Pw next time from 2T after the NRZI through (n-1)T of NRZI; a last pulse, which starts in (n-1)T after the NRZI and which contributes to emitting a laser beam at the peak power Pw (1101) for a period of time defined by nT-Tlp 1114; and a cooling pulse, which contributes to emitting a laser beam at a cooling power Pc (1103) from a point in time when the last pulse falls through a point in time when the power rises from the cooling power Pc (1103) to the space power Ps (1102) as defined by nT-dTs 1115. It should be noted that the respective parameters of the nT mark could vary according to the n value that falls within the range of four through nine or could remain the same once the n value reaches a certain number.

In the example illustrated in FIG. 11, the bottom power Pb (1104) is supposed to be lower than the cooling power Pc (1103). However, the present invention is in no way limited to that specific preferred embodiment. Alternatively, Pb=Pc or Pb>Pc could be satisfied, too.

Next, an exemplary makeup of the read/write control information, represented by the N-1 type write strategy shown in FIG. 11, will be described with reference to FIG. 12.

FIG. 12 shows the contents of disc information including a header information part 811, a read/write control information part 812 and a footer information part 813. The disc information is made up using 112 bytes as a unit.

Also, the read/write control information part 812 includes a disc control information part 1214, a power information part 1215 and a write pulse information part 1216.

Among the parameters included in the write pulse information part 1216 shown in FIG. 12, the parameters dTtop (1202) and Ttop (1203) about the space preceding a recording mark are defined so as to make the write pulse adjustable with respect to the length of the preceding space.

On the other hand, as each of the Tmp parameter 1201 representing the width of the multiple pulses, the Ttop parameter 1203 representing the width of the top pulse, and the Tlp parameter 1204 representing the width of the last pulse, both a parameter representing a pulse width defined by the frequency divided clock pulses of the channel clock pulse T and a parameter representing a pulse width defined by a fixed clock pulse are retained. However, only one of the pulse width defined by the frequency divided clock pulses and the pulse width defined by the fixed clock pulse may be used.

In the example shown in FIG. 12, each of the frequency divided clock pulses is supposed to have a size that is a sixteenth of that of a channel clock pulse.

Hereinafter, the write pulse information part 1216 will be described in detail.

The Tmp parameter 1201 of the N-1 type write strategy is not provided for 2T and 3T marks but is provided for only 4T or longer marks. This means that only 4T or longer marks can be formed of multiple pulses. The Tmp parameter 1201 describes the value of one of multiple pulses that are located between the top and last pulses. That value is used in common for all of those 4T or longer marks. However, the Tmp parameter 1201 also describes a value representing the pulse width of the frequency divided clock pulses and a value representing the pulse width of the fixed clock pulse. Each of those values has a size of 4 bits and the total size becomes equal to 1 byte.

The parameters dTtop 1202 of the N-1 type write strategy are classified into the three categories of "2T mark", "3T mark", and "4T or longer mark". Each of these categories of recording marks is further classified into the four sub-categories of "preceding 2T space", "preceding 3T space", "preceding 4T space" and "preceding 5T or longer space". The total size of these three categories combined is 12 bytes.

The parameters Ttop 1203 of the N−1 type write strategy are also classified into the three categories of "2T mark", "3T mark", and "4T or longer mark". And each of those three categories is further classified into an information part describing a parameter about the pulse width of the frequency divided clock pulses and an information part describing a parameter about the pulse width of the fixed clock pulse. Consequently, the Ttop parameters 1203 are roughly classified into six categories.

And each of these six categories of recording marks is further classified into the four sub-categories of "preceding 2T space", "preceding 3T space" and "preceding 4T space" and "preceding 5T or longer space". The size of the information assigned to each recording mark is 1 byte and the Ttop parameter 1203 has a total size of 24 bytes combined.

The parameters Tlp 1204 of the N−1 type write strategy are classified into the two categories of "3T mark" and "4T or longer mark". In each of the recording marks, an amount of information of 4 bits is assigned to the pulse width of the frequency divided clock pulses and to that of the fixed clock pulse. And the Tlp parameter 1204 has a size of 2 bytes combined.

The parameters dTs 1205 of the N−1 type write strategy are classified into the three categories of "2T mark", "3T mark", and "4T or longer mark". The total size of these three recording marks combined is 3 bytes.

The write pulse information part 1216 also has reserved part 1206 of 2 bytes.

Every bit of the reserved part 1206 may be represented as zero or one. Alternatively, any other kind of information could be stored instead of the reserved part 1206.

Portion (a) of FIG. 5 illustrates the relation between the size of a light beam spot 51 and the shortest marks (2T marks) in a situation where a storage capacity of 25 GB is provided. On the other hand, portion (b) of FIG. 5 illustrates the relation between the size of the light beam spot 51 and the shortest marks (2T marks) in a situation where a storage capacity of 33.3 GB is provided. Each of these drawings illustrates a situation where 2T marks are recorded on the information storage medium 1001 of this preferred embodiment. Comparing the recording marks to provide 25 GB to the recording marks to provide a capacity of as high as 33.3 GB, it can be seen that the physical length of the latter recording marks is approximately 75% of that of the former. In the exemplary 2T marks shown in portions (a) and (b) of FIG. 5, for instance, the recording marks to provide a storage capacity of 25 GB has a length of 149 nm, while the recording mark to provide a storage capacity of 33.3 GB has a length of 112 nm.

That is why to get high-density writing done on the information storage medium 1001 of this preferred embodiment, the read/write control information with the N−1 type write strategy that has been described with reference to FIGS. 11 and 12 is defined in view of the following considerations.

First of all, since the physical length of recording marks has shortened, a recording mark being formed could be affected by the quantity of heat generated by a laser beam that irradiated the information storage medium 1001 to make the previous mark or a laser beam that will irradiate the information storage medium 1001 to make the next mark. This is a so-called "thermal interference" phenomenon that affects even marks defined by longer channel clock pulses, and is taken into account in this preferred embodiment.

Thus, in view of this consideration, the respective parameters are classified into expanded categories of "2T mark", "3T mark", "4T mark" and "5T or longer mark".

Secondly, since the detection system of the apparatus of this preferred embodiment has been affected by such an increase in storage density (i.e., the physical length of recording marks has decreased with respect to the size of a laser beam spot), the degree of intersymbol interference when a read signal is generated will vary according to not only the length of the preceding space but also combination of other spaces and marks. This also needs to be taken into account according to this preferred embodiment. Examples of such combinations of other spaces and marks include a combination of the current mark and the preceding and succeeding spaces, a combination of the current and previous marks and the preceding space, a combination of the current and next marks and the succeeding space, a combination of the current and previous marks and the preceding and succeeding spaces, and a combination of the current and next marks and the preceding and succeeding spaces. The shorter the recording mark, the more significantly the mark will be affected by intersymbol interference.

Thus, in view of this consideration, the write pulse parameters, which have been classified based on only the lengths of the preceding space, are classified into expanded categories of a combination of the current mark and the preceding space, a combination of the current mark and the preceding and succeeding spaces, a combination of the current and previous marks and the preceding space, a combination of the current and next marks and the succeeding space, a combination of the current and previous marks and the preceding and succeeding spaces, and a combination of the current and next marks and the preceding and succeeding spaces.

In this case, to optimize the SNR of a read signal representing the recording mark scanned, 2T mark, in which the SNR decreases most sensitively with respect to a parameter setting, is subjected to the write pulse information expansion described above. Each of the Tmp, Ttop and Tlp parameters about the pulse width include two kinds of parameters represented by a frequency divided clock pulse and a fixed clock pulse. However, just one of these two types is actually used. That is why the size of the parameters is cut down by using only the frequency divided clock pulses.

The size is further reduced in the following manner.

The respective parameters (dTtop, Ttop, Tlp and dTs), which form a mark of the same length with respect to preceding and succeeding spaces and the previous and next marks, are defined to have the same size.

Thus, the representative value of each of these parameters is supposed to be a reference value and the parameter's value with respect to the preceding and succeeding spaces and the previous and next marks is defined as an offset value from the reference value.

In this case, the "reference value" represents the magnitude of delay of a pulse with respect to a channel clock pulse or a value representing the width of any of various types of pulses including top, last and cooling pulses. On the other hand, the "offset value" represents the difference between width of a write pulse and the reference value, or the difference between magnitude of delay and the reference value.

It should be noted that the "reference value" could be a positive or negative one or zero. As far as a write pulse width is concerned, its value can be nothing but positive or zero. As for a write pulse position (which may be a leading or trailing edge position), on the other hand, its value can be not only positive or zero but also negative as well.

The reference value is represented by one byte, while the offset value may be represented by four bits (i.e., 0000b through 1111b), which is a half of one byte. If the frequency divided clock pulse is one-sixteenth of a channel clock pulse, a non-signed number (which is positive in every case) can be represented as 0 through 15 and a signed number (which is supposed to be negative if the most significant bit is one) can be represented as −8 through 7. And an offset of 1T can be represented. On the other hand, if the frequency divided clock pulse is one-thirty second of a channel clock pulse, an offset of 0.5T can be defined.

According to this preferred embodiment, the length of a recording mark is defined to be 2T through 9T at a step of 1T. That is why if the write pulse is shifted by 0.5T or more, probably the given mark should be recognized erroneously to be a mark that is 1T longer or shorter than the actual one. For that reason, even if the parameter value with respect to the preceding and succeeding spaces and the previous and next marks is reduced to a small size of 4 bits and stored as an offset value with respect to the reference value, it is unlikely that that would decrease significantly the SNR of a read signal representing a recording mark scanned.

FIGS. 13(a) to 13(c) show how the disc information is defined by such expansion and classification.

Hereinafter, that expanded and classified disc information will be described in detail with reference to FIG. 13.

First of all, to ensure compatibility in disc information between a disc with normal storage density and a disc with an increased storage density, the general makeup of the disc information, consisting of the header information part 811, the read/write control information part 812, and the footer information part 813, and their numbers of bytes are supposed to be maintained.

Since the write pulse information has been expanded as described above, the size of write pulse information required increases.

Thus, the space for the expanded write pulse information part 1316, which now has an increased size, is provided by either cutting down the space left for the disc control information part 1314 or the power information part 1315 in the read/write control information part 812 or compressing their information retained or reducing its size.

The spaces left for the disc control information part 1314 and the power information part 1315 can be cut down by reducing the unused spaces of those information parts.

On the other hand, the information retained by the disc control information part 1314 and the power information part 1315 can be compressed or reduced by either decreasing the number of bits used and the size with the resolution of their settings lowered or decreasing the number of items of the multiple parameters by at least one. The latter can be done by deleting at least one of multiple power settings of the laser beam emitted for reading, which are defined for multiple different read rates. Alternatively, if multiple different pieces of emission power information are provided for different methods of producing emission (such as DC emission and RF superposition emission), at least one of those pieces of emission power information can be deleted.

Hereinafter, it will be described in detail how to classify the respective parameters of the write pulse information part 1316 shown in FIG. 13(a).

The write pulse information part 1316 of this preferred embodiment, which has been expanded to cope with high-density writing, includes a fundamental part 1317 and an expanded part 1318.

In FIGS. 13(a) to 13(c), for every parameter, a single reference value stored in the fundamental part 1317 is supposed to have a size of 1 byte and a single offset value stored in the expanded part 1318 is supposed to have a size of 0.5 bytes (=4 bits).

The fundamental part 1317 includes a Tmp 1301, a fundamental dTtop 1321, a fundamental Ttop 1322, a fundamental Tlp 1323 and a fundamental dTs 1324.

In this fundamental part 1317, included are parameters that do not depend on the length of the space that precedes or succeeds the current recording mark or that of the previous or next mark. A non-expanded N−1 type write strategy can be generated based on only the write pulse information included in this fundamental part 1317.

If a write operation is performed using such a castle type write strategy that is based on only the fundamental part 1317, the SNR is more likely to decrease due to thermal interference or intersymbol interference compared to a situation where a write operation is performed using an expanded N−1 type write strategy. The use of such a castle type write strategy based on only the fundamental part 1317, however, allows even an apparatus that cannot generate an expanded N−1 type write strategy (such as an information reading/writing apparatus of an older generation or a lower order) to write information on an information storage medium that realizes high-density writing.

FIG. 13(c) shows exactly how the parameters are classified in the expanded part 1318, which has the following makeup. However, the Tmp 1301 of the N−1 type write strategy has the same settings as the fundamental part 1317 and is not described in this expanded part.

The expanded dTtop and expanded Ttop parameters 1302 and 1303 of the N−1 type write strategy are classified into the categories of "2T mark", "3T mark", "4T mark" and "5T or longer mark". If the 3T, 4T and 5T or longer marks among these recording marks have a preceding 2T, 3T or 4T space, then their parameter classification is expanded. If the preceding space is 5T or longer, then the settings of the fundamental dTtop or fundamental Ttop parameter 1321 or 1322 are applied. Otherwise, the parameter is represented by the magnitude of offset from the fundamental dTtop or fundamental Ttop parameter 1321 or 1322. Each of the expanded dTtop and expanded Ttop parameters 1302 and 1303 has a size of 4.5 bytes.

Just like the expanded dTtop parameter 1302 and other parameters, the parameters about a 2T mark are classified based on multiple different combinations of marks and spaces. Specifically, those parameters are classified by combining a group of categories consisting of previous 2T mark-preceding 2T space, previous 3T or longer mark-preceding 2T space, preceding 3T space, preceding 4T space and preceding 5T or longer space and another group of categories consisting of succeeding 2T space-next 2T mark, succeeding 2T space-next 3T or longer mark, and succeeding 3T or longer space. If the combination consists of preceding 5T or longer space and next 3T or longer space, then the settings of the fundamental dTtop or fundamental Ttop parameter 1321 or 1322 are applied. Otherwise, the parameter is represented by the magnitude of offset from the fundamental dTtop or fundamental Ttop parameter 1321 or 1322. Each of the expanded dTtop and expanded Ttop parameters 1302 and 1303 has a size of 7 bytes.

The expanded Tlp parameters 1304 of the N−1 type write strategy are classified into the categories of "3T mark", "4T mark" and "5T or longer mark". These recording marks are classified into the categories of succeeding 2T space, succeeding 3T space, succeeding 4T space and succeeding 5T or longer space. If the succeeding space is 5T or longer, then the settings of the fundamental Tlp parameter 1323 are applied.

Otherwise, the parameter is represented by the magnitude of offset from the fundamental Tlp parameter 1323. The expanded Tlp parameter 1304 has a size of 4.5 bytes.

The expanded dTs parameters 1305 of the N−1 type write strategy are classified into the categories of "2T mark", "3T mark", "4T mark" and "5T or longer mark". Among these recording marks, the 3T, 4T and 5T or longer marks are classified into the categories of succeeding 2T space, succeeding 3T space, succeeding 4T space and succeeding 5T or longer space. If the succeeding space is 5T or longer, then the settings of the fundamental dTs parameter 1324 are applied. Otherwise, the parameter is represented by the magnitude of offset from the fundamental dTs parameter 1324. The dTs parameters 1305 that are classified into the categories of 3T mark, 4T mark and 5T or longer mark have a total size of 4.5 bytes.

The parameters about a 2T mark are classified based on multiple different combinations of marks and spaces. Specifically, those parameters are classified by combining a group of categories consisting of preceding 2T space and preceding 3T or longer space and another group of categories consisting of succeeding 2T space-next 2T mark, succeeding 2T space-next 3T or longer mark, and succeeding 3T or longer space. If the combination consists of preceding 3T or longer space and next 3T or longer space, for which parameter classification is defined, then the settings of the fundamental dTs parameter 1324 are applied. Otherwise, the parameter is represented by the magnitude of offset from the fundamental dTs parameter 1324. A total amount of information of 2.5 bytes is allocated to the parameter classification about 2T mark of the dTs parameters 1305.

In this manner, the total size of information allocated to the disc control information part 1314, the power information part 1315 and the write pulse information part 1316 can be kept constant while coping with the write pulse information that has been expanded to get high-density writing done.

As described above, according to this second preferred embodiment, when a high-density write operation needs to be performed on an information storage medium, even an information reading/writing apparatus that is not compatible with expanded write pulses can also perform the write operation based on the read/write control information. Meanwhile, an information reading/writing apparatus that can cope with the expanded write pulses can define the size of the read/write control information that has been expanded to get the high-density write operation performed within a predetermined range with the influence of thermal or intersymbol interference, which could cause a decrease in the SNR of a read signal, taken into consideration. As a result, compatibility can be maintained with information reading/writing apparatuses of a lower order or an older generation and with information storage media of a lower order or an older generation with the size cut down significantly.

In the preferred embodiment described above, RLL (1, 7) is supposed to be used as the recording code. However, the present invention is in no way limited to that specific preferred embodiment.

Also, in the preferred embodiment described above, the respective parameters included in the write pulse information part 1316, the fundamental part 1317 and the expanded part 1318 do not always have to be arranged in the order shown in FIG. 13.

Furthermore, in the preferred embodiment described above, the read/write control information is supposed to be stored on an information storage medium. However, that is just an example. Alternatively, the memory section 1008 of the optical disc drive 1000 could store the read/write control information, too. In that case, the read/write control information stored in the memory section 1008 does not have to include all of the disc control information part, power information part and write pulse information part but may include just some of them.

Also, in the preferred embodiment described above, the frequency divided clock pulse is defined to be one-sixteenth of a channel clock pulse. However, the present invention is in no way limited to that specific preferred embodiment. Alternatively, the frequency divided clock pulse may also be one-eighth or one-twentieth of a channel clock pulse.

Furthermore, in the preferred embodiment described above, the present invention is supposed to be applied to the N−1 type write strategy. However, the present invention is never limited to the N−1 type write strategy. Alternatively, the present invention is also applicable to the castle type write strategy shown in FIGS. 7 and 8 or to the so-called "N/2 type" write strategy shown in FIGS. 14 and 15.

Also, in the preferred embodiment described above, the mark and space lengths are supposed to be classified with specific numerical values. However, the present invention is in no way limited to that specific preferred embodiment. Alternatively, when 2T through 9T recording marks need to be formed, the mark and space lengths may also be classified into the categories of 2T, 3T, 4T, 5T and 6T or more, for example.

Embodiment 3

In this preferred embodiment, a optical disc drive that is different from that in the second preferred embodiment is described.

The optical disc drive of this third preferred embodiment has the same configuration as the optical disc drive 1000 shown in FIG. 10. That is why the optical disc drive of this preferred embodiment will be described with reference to FIG. 10 again.

The optical disc drive of this third preferred embodiment performs a partially different kind of processing from the optical disc drive of the first and second preferred embodiments. Thus, the following description will be focused on only those differences and the rest of the processing procedure to be performed in common by both of the optical disc drives of the first and third preferred embodiments will not be described again to avoid redundancies.

FIG. 10 illustrates an optical disc drive 1000 as a third preferred embodiment of the present invention.

Every parameter of the expanded read/write control information, which is included in the disc information that has been retrieved from the information storage medium 1001, is supposed to have a size of 1 byte. Also, the read/write control information is supposed to be split into two pieces of disc information.

In that case, the controller section 1007 classifies each parameter into the fundamental part 1317 and expanded part 1318 shown in FIG. 13. As for the parameters in the expanded part 1318, the controller section 1007 calculates the magnitude of offset from the reference value in the fundamental part 1317 and defines its size to be smaller than the information included in the fundamental part 1317 (e.g., four bits).

The memory section 1008 stores the parameters of the fundamental and expanded parts 1317 and 1318 that have been calculated by the controller section 1007. Alternatively, the parameters of the fundamental and expanded parts 1317 and 1318 could also be stored in a permitted area on the information storage medium 1001.

As described above, according to this preferred embodiment, the size of the read/write control information that has been expanded to get a high-density write operation performed is defined within a predetermined range. As a result, compatibility can be maintained with information reading/writing apparatuses of a lower order or an older generation and with information storage media of a lower order or an older generation with the size cut down significantly.

As described above, the first to third preferred embodiments of the present invention described above provide an information storage medium with multiple tracks, on which marks are formed by irradiating the tracks with pulses of a laser beam and on which information is stored as a data sequence where marks and spaces are arranged alternately. More specifically, the information storage medium has at least one information storage layer to store information. The information storage layer has an information storage area to store information and a control information area for use to perform a read/write operation on the at least one information storage layer. The control information area stores at least one set of control information. The at least one set of control information includes first and second kinds of write pulse information. Information, can be written on the information storage medium of the present invention by reference to either only the first kind of write pulse information or both of the first and second kinds of write pulse information.

Embodiment 4

A fourth specific preferred embodiment of the present invention relates to an information storage medium on which information is written by being irradiated with a laser beam, and more particularly relates to the arrangement of control information, which is stored in advance on the information storage medium to perform a read/write operation thereon.

Before the fourth preferred embodiment of the present invention is described, the read/write control information will be described once again. In the following description, the DI of a BD will be taken as an example.

FIG. 21 schematically illustrates the structure of a BD. According to Patent Document No. 1, at least one piece of DI is stored in an area called "lead-in area 601". Also, according to Patent Document No. 1, the DI has a size of 112 bytes and a single write pulse waveform, associated with a single layer and a single writing speed, is stored in the one piece of DI.

FIG. 22 schematically shows the makeup of the DI of a BD. As shown in FIG. 22, the DI consists of header information 1601, read/write control information 1602, and footer information 1603. The read/write control information 1602 includes a disc information part 1604 including information about the type and the structure of the disc, a power information part 1605 for use to control the power during reading or writing, and a write pulse information part 1606 for use to control the write pulse waveform during writing.

A write pulse applied to make a recording mark on an optical disc includes power information indicating the power level of that pulse and write pulse information indicating the position and width of that pulse. In the following description, the power information and the write pulse information will be collectively referred to herein as a "write strategy".

Hereinafter, the power information and the write pulse information will be described with reference to FIG. 23, which illustrates an exemplary write pulse waveform for making an 8T mark, which is eight times as long as the width T of a channel clock pulse.

In the example illustrated in FIG. 23, the power information includes pieces of information about the parameters of a write pulse in the amplitude direction, including a peak power Pw (1701), a space power Ps (1702), a cooling power Pc (1703), and a bottom power Pb (1704). On the other hand, the write pulse information includes pieces of information about the parameters of a write pulse in the time axis direction, including a top pulse width Ttop (1705), a top pulse width start point dTtop (1706), a multi-pulse width Tmp (1707), a last pulse width 1708, and a cooling pulse end point dTs (1709).

These parameters are included in the DI in the format shown in FIG. 24, for example. Optionally, these pieces of read/write control information could also be written by an information storage medium recorder/player in a designated area on an information storage medium in the same format as, or in a format similar to, the one shown in FIG. 24.

However, not just the read/write control information but also the length of the space that precedes or succeeds a mark will be more and more affected by thermal interference between the marks as the writing speed or the storage density increases. If a write operation were performed on each of preceding or succeeding spaces that have varying lengths by reference to the same write pulse information when such a phenomenon is observed, the lengths of the recording marks would vary according to the lengths of their preceding or succeeding spaces.

Consequently, each piece of write pulse information may sometimes be defined by not only the length of each mark but also that of a space that precedes or succeeds that mark.

Recently, as the densities of information storage media have been increasing year by year, the shortest mark length of recording marks has come closer and closer to the limit of resolution that depends on the detection system. If the information storage medium is an optical disc medium, for example, the "resolution that depends on the detection system" refers to the optical resolution to be determined by the size of a light beam spot being formed by condensing a laser beam. Since the shortest mark length is on the verge of reaching that limit of resolution, an increase in intersymbol interference and a decrease in SNR (signal to noise ratio) have become more and more significant these days.

Hereinafter, this phenomenon will be described with an optical disc medium that uses a blue laser beam with a wavelength of 405 nm and that has a diameter of 12 cm taken as an example. According to Non-Patent Document No. 1, in an optical disc medium that uses a blue laser beam, the light beam spot formed by condensing a laser beam has a size of 390 nm. And if the storage capacity per storage layer is 25 GB and if RLL (1, 7) is used as a recording code, the shortest mark has a length of 149 nm. If such an optical disc medium needs to have a storage capacity of 33.3 GB per storage layer, the shortest mark should have a length of 112 nm. And to further increase the storage capacity, the shortest mark should have an even shorter length.

Supposing the same detection system is used, if the storage capacity per storage layer is 25 GB, then a single light beam spot 1901 covers 2.6 shortest marks or spaces as shown in portion (a) of FIG. 25. However, if the storage capacity per storage layer is increased to 33.3 GB, a single light beam spot 1901 covers 3.5 shortest marks or spaces as shown in portion (b) of FIG. 25. Consequently, the length of each mark decreases with respect to the same size of the light beam spot formed by a detection system for the optical disc medium.

As a result, the mark/space combination to fall within the light beam spot could not just be a combination of a single mark and its preceding or succeeding space but also be a combination of multiple marks and multiple spaces.

This point will be described with reference to FIG. 26, which illustrates typical relations between the size of a light beam spot 2001 (or the mark at the present time i) and patterns each including multiple marks or spaces. Specifically, portion (a) of FIG. 26 illustrates a combination of a mark at the present time i, the preceding space at a time i−1, and the succeeding space at a time i+1. Portion (b) of FIG. 26 illustrates a combination of a mark at the present time i, the previous mark at a time i−2, and the preceding space at the time i−1. Portion (c) of FIG. 26 illustrates a combination of a mark at the present time i, the succeeding space at the time i+1, and the next mark at a time i+2.

Portion (d) of FIG. 26 illustrates a combination of a mark at the present time i, the preceding space at the time i−1, the succeeding space at the time i+1 and the next mark at the time i+2. And portion (e) of FIG. 6 illustrates a combination of a mark at the present time i, the previous mark at the time i−2, the preceding space at the time i−1 and the succeeding space at the time i+1.

Thus, as the storage density is increased, the write pulse information will be defined by not just a combination of a current mark and the preceding or succeeding space but also a combination of the current mark and the preceding and succeeding spaces, a combination of the current and previous marks and the preceding space, a combination of the current and next marks and the succeeding space, a combination of the current and previous marks and the preceding and succeeding spaces, and a combination of the current and next marks and the preceding and succeeding spaces as shown in FIG. 26. Furthermore, for that purpose, the writing conditions need to be specified more finely with the resolution of these writing conditions increased.

To avoid specifying the writing conditions as finely as described above, the light beam spot size could be decreased by shortening the wavelength of the laser beam used. To do that, however, a new optical system should be developed. Particularly when a laser diode with a different wavelength is used, not just its initial property but also its temperature property, the degree of expected deterioration with time, yield to be increased, and sundry other problems should be handled properly. And it would take a lot of time to get them done. On top of that, it is also necessary to see if the newly developed optical system is compatible with an information storage medium with a conventional density in performing a read/write operation on it.

When a conventional optical system is used, on the other hand, it is not necessary to see if that optical system is compatible with an information storage medium with a conventional density to perform a read/write operation on it. However, it is not clear exactly how to store the read/write control information, of which the size is increasing as the storage density increases by leaps and bounds, on the information storage medium.

In view of these considerations, this fourth preferred embodiment of the present invention provides an information storage medium, from which the read/write control information can be retrieved appropriately and on which user data can be written properly based on the read/write control information retrieved even if the size of the read/write control information has increased due to the increase in the storage density or the number of storage layers stacked in a storage medium. The preferred embodiment also provides an information storage medium on which the read/write control information is stored so that the change of reading algorithms can be minimized between a situation where the read/write control information is retrieved from an information storage medium with a conventional density and a situation where the read/write information is retrieved from an information storage medium with a high density.

Hereinafter, an information storage medium according to this preferred embodiment will be described with reference to the accompanying drawings. FIG. 16 is a plan view illustrating an information storage medium as a fourth preferred embodiment of the present invention. As shown in FIG. 16, the information storage medium has a control information area 101 and an information storage area 102.

FIG. 17 shows an exemplary format for the control information area. As shown in FIG. 17, the control information area 101 has DI 201 and 202, header information 203, a first kind of read/write control information 204, a first disc information part 205, a first power information part 206, a first write pulse information part 207, footer information 208, header information 209, a second kind of read/write control information 210, a second disc information part 211, a second power information part 212, a second write pulse information part 213 and footer information 214.

It should be noted that the DI 201 and the DI 202 have the same contents. By storing the same piece of information twice in this manner, even if the DI 201 were non-retrievable due to a scratch, for example, the read/write control information could also be obtained by retrieving the DI 202 instead.

In this preferred embodiment, the DI 201 and the DI 202 are supposed to be the DI of a castle type write strategy. However, the DI does not have to be that of a castle type write strategy. Optionally, in an area between the DI 201 and the DI 202, the DI of an N−1 type write strategy, dummy data or a particular kind of data such as zero could be stored, for example.

The same piece of information is stored as the header information 203 and 209. And if the header information is detected, then it can be seen that there is read/write control information right after the header information. Likewise, the same piece of information is stored as the footer information 208 and 214. And if the footer information is detected, then it can be seen that the footer information will be immediately followed by read/write control information.

The disc information parts 205 and 211 store not just information about the capacity of the disc, information about the number of storage layers available for writing, and information about the polarity of tracking servo but also completion decision information indicating whether or not this DI is a completed one or not. Thus, according to this preferred embodiment, the completion decision information of the disc information part 205 indicates that the DI is not completed but that of the disc information part 211 indicates that the DI is completed.

Optionally, in addition to these pieces of information, the disc information parts 205 and 211 could also include layer information that specifies the storage layer on which data needs to be written, writing speed information that specifies the writing speed to take, number of DI information indicating the total number of pieces of DI, and information about the position of the currently retrieved DI in all pieces of DI.

The power information parts 206 and 212 include the power information of a castle type write strategy. The write pulse information parts 207 and 213 include write pulse information of the castle type write strategy.

Next, look at FIG. 18, which illustrates an exemplary write pulse waveform with a castle type write strategy. The write pulse waveform is used to make 2T, 3T and 8T marks, which are respectively twice, three times and eight times as long as one channel clock pulse T.

The power information includes a write power Pw (301), a middle power Pm (302), a space power Ps (303) and a cooling power Pc (304). The write pulse information includes 2T-dTtop 306 specifying the start point of write power to record a 2T mark, 2T-Ttop 305 defining the duration of application of the write power, 2T-dTs 307 specifying the end point of cooling power, 3T-dTtop 309 specifying the start point of write power to record a 3T mark, 3T-Ttop 308 defining the duration of application of the write power, 3T-dTc 310 specifying the end point of the middle power, 3T-dTs 311 specifying the end point of the cooling power, 8T-dTtop 313 specifying the start point of the write power of the first pulse to record an 8T mark, 8T-Ttop 312 defining the duration of application of the write power of the first pulse, 8T-Tlp 314 defining the duration of application of the write power of the last pulse, 8T-dTc 315 defining the end point of the write power of the last pulse, and 8T-dTs 316 specifying the end point of the cooling power.

In this preferred embodiment, the marks are supposed to have lengths of 2T to 8T. However, the marks may also have any other lengths. Also, in the preferred embodiment described above, the 2T mark is supposed to be recorded by being irradiated with a laser beam with only the write power, the 3T mark is supposed to be recorded by being irradiated with a laser beam with write and middle powers, and the 4T to 8T marks are supposed to be recorded by being irradiated with a laser beam with the write power at the top, a laser beam with the middle power next, and then a laser beam with the write power. However, this is just an example.

Next, look at FIG. 19, which shows an exemplary arrangement of respective pieces of information of DI 201-1 of the DI 201. In FIG. 19, the respective parameter values shown in FIG. 18 are stored and arranged following a predetermined rule. According to this preferred embodiment, mutually different values can be set for dTc 401 between 4T mark and 5T or longer mark and a common value is set for 5T or longer marks.

As for dTtop 402, on the other hand, a common value is set for 4T or longer marks. For Ttop 403, a common value is set for 4T or longer marks.

Likewise, as for Tlp 404 and dTs 405, a common value is also set for 4T or longer marks.

Furthermore, in dTtop 402, for 4T or longer marks, 3T mark and 2T mark, mutually different values can be set depending on whether the preceding space is 2T space, 3T space or 4T or longer space.

In the same way, in Ttop 403, for 4T or longer marks, 3T mark and 2T mark, mutually different values can also be set depending on whether the preceding space is 2T space, 3T space or 4T or longer space.

In this preferred embodiment, as for dTc 401, mutually different values can be set for 4T mark and 5T or longer marks and a common value is set for 5T or longer marks. However, this is only an example.

Likewise, although a common value is supposed to be set for each of dTtop 402 and Ttop 403 if the mark is equal to or longer 4T, the present invention is in no way limited to this specific example.

In the same way, although a common value is supposed to be set for each of Tlp 404 and dTs 405 if the mark is equal to or longer 4T, any other settings can also be adopted according to the present invention.

Furthermore, in dTtop 402, for 4T or longer marks, 3T mark and 2T mark, mutually different values can be set depending on whether the preceding space is 2T space, 3T space or 4T or longer space. But this is just an example and no way limiting.

And in Ttop 403, for 4T or longer marks, 3T mark and 2T mark, mutually different values can also be set depending on whether the preceding space is 2T space, 3T space or 4T or longer space. However, the settings may also be changed in any other way according to the present invention.

Now, look at FIG. 20, which shows an exemplary arrangement of respective pieces of information of DI 201-2 of the DI 201. In FIG. 20, the respective parameter values shown in FIG. 18 are arranged and stored following a predetermined rule. According to this DI 201-2, even marks for which a common value is set in the DI 201-1 may have different settings depending on the length of the preceding or succeeding space. Optionally, different additional settings than the ones adopted in this preferred embodiment may also be used. For example, mutually different values may be set for 5T mark and 6T or longer marks. Also, according to this preferred embodiment, no additional settings are made in the power information part, and therefore, a common value is included in the power information parts 206 and 212.

In the dTc 501 of this preferred embodiment, mutually different values can be set depending on the length of the succeeding space, which may be 2T, 3T or 4T or longer, for each of the 3T, 4T and 5T or longer marks defined by the dTc 401.

According to this dTc 501, mutually different values can be set for 3T mark, for example, depending on whether the succeeding space is 2T space, 3T space or 4T or longer space. Alternatively, the value of 3T mark defined by the dTc 401 may be the same as one of the three values defined by the dTc 501 (e.g., the value of 3T mark followed by 4T or longer space). Still alternatively, the 3T mark value defined by the dTc 501 could also be a difference from the value defined by the dTc 401. The same can be said about each of the parameters to be described below.

Also, in the dTtop 502, mutually different values can be set depending on the length of the mark preceding the 2T space, which may be 2T, 3T or 4T or longer mark, for the 2T mark preceded by 2T space as defined by the dTtop 402.

Also, in the Ttop 503, mutually different values can be set depending on the length of the mark preceding the 2T space, which may be 2T, 3T or 4T or longer mark, for the 2T mark preceded by 2T space as defined by the Ttop 403.

Furthermore, in the Tlp 504, mutually different values can be set depending on the length of the succeeding space, which may be 2T, 3T or 4T or longer, for the 4T or longer mark as defined by the Tlp 404.

In the dTs 505, mutually different values can be set depending on the length of the succeeding space, which may be 2T, 3T or 4T or longer, for each of the 2T, 3T and 4T or longer marks defined by the dTs 405.

Furthermore, mutually different values can be set depending on the length of the mark that succeeds the 2T space, which may be 2T or 3T or longer mark, for the succeeding 2T space.

In the dTc 501 of this preferred embodiment, mutually different values are supposed to be set depending on the length of the succeeding space, which may be 2T, 3T or 4T or longer, for each of the 3T, 4T and 5T or longer marks defined by the dTc 401. However, this is only an example.

Also, although mutually different values are supposed to be set according to the dTtop 502 depending on the length of the mark preceding the 2T space, which may be 2T, 3T or 4T or longer mark, for the 2T mark preceded by 2T space as defined by the dTtop 402, the present invention is in no way limited to such a specific example.

Likewise, mutually different values are supposed to be set according to the Ttop 503 depending on the length of the mark preceding the 2T space, which may be 2T, 3T or 4T or longer mark, for the 2T mark preceded by 2T space as defined by the Ttop 403. But it is not absolutely necessary to adopt this setting.

Furthermore, mutually different values are supposed to be set according to the Tlp 504 depending on the length of the succeeding space, which may be 2T, 3T or 4T or longer, for the 4T or longer mark as defined by the Tlp 404. However, this is nothing but an example.

On top of that, mutually different values are supposed to be set according to the dTs 505 depending on the length of the succeeding space, which may be 2T, 3T or 4T or longer, for each of the 2T, 3T and 4T or longer marks defined by the dTs 405. But other settings may be adopted as well. And mutually different values are supposed to be set depending on the length of the mark that succeeds the 2T space, which may be 2T or 3T or longer mark, for the succeeding 2T space. However, there are other options, too.

According to this preferred embodiment, the DI 201-1 provides parameters to be classified when a write operation is performed at a conventional density. On the other hand, the DI 202-2 provides parameters to be classified when a write operation is performed at high density. That is to say, the parameters provided by the DI 201-2 prevent the thermal interference to be produced between marks when the density is increased from shifting the edge positions of a recording mark, depending on the length of the space that precedes or succeeds the mark or the length of a mark that is adjacent to a 2T space, in particular.

In the preferred embodiment described above, as for dTtop 402 and Ttop 403, the DI 201-1 is defined according to the space length. However, if the influence of thermal interference is not so significant at the conventional density, every space-length-based setting could be included in the DI 202-2, too.

Also, in the preferred embodiment described above, additional information of the DI 202-2 is provided for only the write pulse information part. However, additional information for high-density writing could also be provided for the power information part, too. For example, the write powers could be changed only when the recording mark is 2T.

Furthermore, in the preferred embodiment described above, the completion decision information 218 indicates that the DI is not quite complete and the completion decision information 222 indicates that the DI is complete. However, the completion decision information 218 could also indicate what pieces of information are not complete yet in the power information and the write pulse information. If it is known exactly what pieces of information are not complete yet, then only those pieces of information need to be retrieved, and therefore, the extra time that would be wasted to retrieve unnecessary pieces of DI can be saved.

In the preferred embodiment described above, the DI 202 is divided into two sets of DI consisting of conventional parameters and additional parameters, respectively. However, the number of sets of DI does not have to be two but may also be three or more. Also, the completion decision information may include information indicating the total number of sets of DI or the position of the current set of DI. Then, the additional set of DI can be retrieved more safely.

In the preferred embodiment described above, no additional settings are provided for the power information part and common values are stored as the power information parts 206 and 212. However, if no additional settings are provided, either dummy data or a particular kind of data such as zeros may be stored as the power information part 212. By storing dummy data or a particular kind of data, the recorder can know for sure that there are no additional settings to realize high-density writing.

Also, in the preferred embodiment described above, no additional settings are provided for the power information part and common values are stored as the power information parts 206 and 212. Optionally, if no additional settings are provided, then the power information part itself can be deleted. By doing that, the extra time that would otherwise be wasted to retrieve unnecessary parts of the DI can be saved.

In the preferred embodiment described above, the DI 202-1 consists of parameters that need to be classified when a write operation is performed at a conventional density. According to such classification, when DI is retrieved from an information storage medium on which a write operation is supposed to be performed at a conventional density, there is no need to change the reading algorithms of the recorder. As a result, the difference from the algorithm for retrieving DI from a high-density information storage medium can be minimized. That is to say, when loaded with an information storage medium on which a write operation is supposed to be performed at a conventional density, the recorder may retrieve the conventional DI corresponding to the DI 202-1. On the other hand, when loaded with an information storage medium on which a write operation is supposed to be performed at a high density, the recorder may retrieve the DI 202-1 by conventional algorithm and then retrieve the DI 202-2. Then, only an algorithm for retrieving the DI 202-2 needs to be added.

For example, if there is a sequence for retrieving DI from an information storage medium on which a write operation is supposed to be performed at a conventional density and writing predetermined bytes of the DI on a designated area of a recorder, that sequence can also be used in the same way for an information storage medium on which a write operation is supposed to be performed at a high density. In that case, the DI may be retrieved and written onto a designated area in the recorder by using a new sequence only for additional information for the DI.

Furthermore, in the preferred embodiment described above, parameters that need to be classified when a write operation is performed at a conventional density are arranged as the DI 202-1 and parameters that need to be classified more finely when a write operation is performed at a high density are arranged as the DI 202-2. According to such an arrangement, if the light beam spot size further shrinks thanks to development of a new optical system in the near future, a write operation can be performed at a high density just by retrieving the parameters of the DI 202-1. As a result, the extra time that would otherwise be wasted to retrieve unnecessary parts of the DI can be saved.

In the preferred embodiment described above, the DI is supposed to be divided into two sets of DI consisting of parameters that need to be used to get writing done at a conventional density and additional parameters that need to be used to get writing done at a high density, respectively. However, the DI may also be divided in any other way as well.

Optionally, the recorder may store part or all of the DI information of this preferred embodiment in a predetermined area on an information storage medium. In that case, values that are based on the DI information but that have been changed with a variation in the performance of the recorder taken into account may be stored. Then, data can be written quickly next time just by retrieving the DI information from the predetermined area.

Alternatively, the recorder may store part or all of the DI information of this preferred embodiment in a predetermined memory. In that case, values that are based on the DI information but that have been changed with a variation in the performance of the recorder taken into account may be stored. Then, data can be written quickly next time just by retrieving the DI information from the predetermined memory.

Furthermore, in the preferred embodiment described above, parameters that need to be classified when a write operation is performed at a conventional density are arranged as the DI 202-1 and parameters that need to be classified more finely when a write operation is performed at a high density are arranged as the DI 202-2. According to such an arrangement, if the storage density of the DI is as high as a conventional information storage medium, even a conventional recorder that usually performs a write operation on conventional information storage media can retrieve the DI and can quickly recognize the information storage medium as a one on which a write operation needs to be performed at a high density.

In the preferred embodiment described above, the DI is supposed to be divided into two sets of DI consisting of parameters that need to be used to perform a write operation at a conventional density and parameters that need to be used to perform a write operation at a high density. However, it is not always necessary to divide the DI in this manner. Now look at FIG. 27, which summarizes methods of dividing the DI into various patterns.

In FIG. 27, the pattern (1) is the one that has already been described for the preferred embodiment of the present invention. In this case, parameters that need to be classified when a write operation is performed at a conventional density are stored as the first set of DI and parameters that need to be classified when a write operation is performed at a high density are stored as the second set of DI.

By adopting the storage pattern (1), when DI is retrieved from an information storage medium on which a write operation is supposed to be performed at a conventional density, there is no need to change the reading algorithms of the recorder and the difference from the algorithm for retrieving the DI from a high-density information storage medium can be minimized.

In addition, by adopting the storage pattern (1), if the light beam spot size further shrinks thanks to development of a new optical system in the near future, a write operation can be performed at a high density just by retrieving the second set of DI. As a result, the extra time that would otherwise be wasted to retrieve unnecessary parts of the DI can be saved.

On top of that, by adopting the storage pattern (1), even a conventional recorder that usually performs a write operation on conventional information storage media can retrieve the DI and can quickly recognize the information storage medium as a one on which a write operation needs to be performed at a high density.

The pattern (2) is used in a situation where the parameters are arranged in the same order as the DI of an information storage medium on which a write operation is performed at a conventional density. FIG. 28 shows an exemplary set of DI for an information storage medium on which a write operation is supposed to be performed at a conventional density. On the other hand, the first and second sets of DI for use in an information storage medium on which a write operation is supposed to be performed at a high density are shown in FIGS. 29 and 30, respectively.

(2) By adopting the storage pattern (2), parameters such as dTtop are never dispersed, and therefore, errors to be committed in entering information can be reduced while a stamper is being cut for the information storage medium.

Also, by avoiding splitting a single parameter such as dTtop into the first and second sets, the recorder will commit read errors much less often in retrieving the DI.

The pattern (3) is used in a situation where parameters are divided into ones concerning the beginning of a mark and ones concerning the end of the mark. The first and second sets of DI in that case are shown in FIGS. 31 and 32, respectively. As shown in FIGS. 31 and 32, parameters concerning the beginning of a mark are stored as the first set of DI and parameters concerning the end of a mark are stored as the second set of DI.

Generally speaking, thermal interference often affects the beginning of a mark. That is why according to the storage pattern (3), if important parameters for writing are arranged in the former set, the chances of getting minimum required data written will increase even in a situation where DI cannot be retrieved from the second set.

The pattern (4) is used in a situation where parameters with a greater number of bytes are stored as the first set of DI. Examples of the first and second sets of DI are shown in FIGS. 33 and 34, respectively. In FIG. 33, dTtop and Ttop both have a size of 11 bytes. In FIG. 34, dTc, Tlp and dTs have sizes of 9 bytes, 3 bytes and 10 bytes, respectively.

Generally speaking, the greater the number of bytes of a parameter, the higher the degree of precision of control the parameter requires. By adopting the storage pattern (4), the chances of getting minimum required data written will increase even in a situation where DI cannot be retrieved from the second set.

According to this preferred embodiment, dTc, Tlp, and dTs are supposed to be stored in this order as shown in FIG. 34. Alternatively, these parameters may also be arranged in the order of dTs, dTc and Tlp according to their numbers of bytes.

Optionally, although such a pattern is not shown in FIG. 27, parameters that depend on neither marks nor spaces, parameters that depend on only marks and parameters that depend on both marks and spaces may also be arranged in this order through the first and second sets of DI. With such an arrangement of parameters, the degrees of complexity of the parameters gradually increase from a simple one to a complex one. And if the parameters are arranged in such a proper order, errors to be committed in entering information can be reduced while a stamper is being cut for the information storage medium. The same can be said even in a situation where the degrees of complexity of the parameters gradually decrease from a complex one to a simple one.

Optionally, when the parameters are stored through the first and second sets of DI in the order of parameters that depend on neither marks nor spaces, parameters that depend on only marks and parameters that depend on both marks and spaces, the parameters in each section can be arranged by their time stamps on a first come, first store basis. For example, if dTtop and Ttop are included within the same section, dTtop is stored earlier than Ttop. And if Tlp and dTs are included within the same section, Tlp is stored earlier than dTs. And if the parameters are stored in such an order on a first come, first store basis, the parameters will be properly arranged by their time stamps within the same section. As a result, errors to be committed in entering information can be reduced while a stamper is being cut for the information storage medium.

It should be noted that if the parameters are just arranged by their time stamps without being divided into those sets, the parameters can also be arranged properly with time. Consequently, errors to be committed in entering information can be reduced while a stamper is being cut for the information storage medium.

Next, look at FIG. 35, which shows an exemplary format for the control information area. As shown in FIG. 35, the control information area 101 has DI 201 and 202, header information 203, a first kind of read/write control information 204, a first disc information part 205, a first power information part 206, a first write pulse information part 207, footer information 208, header information 209, a second kind of read/write control information 210, a second disc information part 211, a second power information part 212, a second write pulse information part 213 and footer information 214.

It should be noted that the DI 201 and the DI 202 have the same contents. By storing the same piece of information twice in this manner, even if the DI 201 were non-retrievable due to a scratch, for example, the read/write control information could also be obtained by retrieving the DI 202 instead.

In this preferred embodiment, the DI 201 and the DI 202 are supposed to be the DI of a castle type write strategy. However, the DI does not have to be that of a castle type write strategy. Optionally, in an area between the DI 201 and the DI 202, various kinds of DI shown in FIG. 23, the DI of a castle type write strategy for a different layer, or the DI of a castle type write strategy for a different writing speed may also be stored.

The same piece of information is stored as the header information 203 and 209. And if the header information is detected, then it can be seen that there is read/write control information right after the header information. Likewise, the same piece of information is stored as the footer information 208 and 214. And if the footer information is detected, then it can be seen that the footer information will be immediately followed by read/write control information.

The disc information parts 205 and 211 store not just information about the capacity of the disc, information about the number of storage layers available for writing, and information about the polarity of tracking servo but also completion decision information indicating whether or not this DI is a completed one or not. Thus, according to this preferred embodiment, the completion decision information of the disc information part 205 indicates that the DI is not completed but that of the disc information part 211 indicates that the DI is completed.

Optionally, in addition to these pieces of information, the disc information parts 205 and 211 could also include layer information that specifies the storage layer on which data needs to be written, writing speed information that specifies the writing speed to take, number of DI information indicating the total number of pieces of DI, and information about the position of the currently retrieved DI in all pieces of DI.

The disc information part 205 may further store "any lacking DI?" information. The same piece of information is stored as the "any lacking DI?" information 223 and 224. If every piece of DI required is stored in the area between the DI 201 and 202, then the "any lacking DI?" information 223 and 224 turns their flag off to indicate that there is no lacking DI information at all.

On the other hand, if there is any piece of additional DI information other than the DI stored in the area between the DI 201 and 202, then the "any lacking DI?" information 224 turns their flag on to indicate that there is lacking DI information in the control information area 101 and provides information about the number of items of lacking DI information and the storage locations of those items of lacking DI information. FIG. 36 shows an exemplary format for the "any lacking DI?" information 223. As shown in FIG. 36, the "any lacking DI?" information includes a flag 2101 indicating whether or not there is any lacking DI, lacking DI storage location information 2102 and number of lacking DI information 2103.

As shown in FIG. 21, N sets of DI can be stored in the lead-in area. However, as the number of storage layers in a disc increases thanks to advancement of disc making technologies or as the rotational frequency and writing speed rise owing to advancement of motor technologies, there can be a shortage of the number of items of available DI in the near future. Meanwhile, even if some space is left for the DI, unused areas are filled with dummy data or a particular kind of data such as zeros. That is why to leave as ample a space as possible for the data area, the space for the DI is preferably a minimum required one. In view of these considerations, according to this preferred embodiment, if the "any lacking DI?" information 223 and 224 turns their flag on to indicate that there is a lacking DI in the control information area 101, that lacking piece of DI, which is not included in the control information area 101, is written somewhere else (e.g., superposed on the wobbling tracks), not in the control information area 101. In the preferred embodiment described above, the area to store the information about the lacking DI is provided for both of the disc information parts 205 and 211. Alternatively, the area may be provided for just one of these two disc information parts 205 and 211.

In this preferred embodiment, the DI that cannot be stored in the control information area 101 is supposed to be stored somewhere else. However, both the DI stored in the control information area 101 and the lacking DI that is not stored in the control information area 101 may be stored elsewhere.

Also, in this preferred embodiment, the DI that cannot be stored in the control information area 101 is stored in a different control information area or superposed on the wobbling tracks. Alternatively, the DI can also be stored in a burst cutting area (BCA), which is provided inside of the control information area 101, or in any other area.

In the preferred embodiment described above, the "any lacking DI?" information is supposed to be stored in the control information area. However, the "any lacking DI?" information can also be stored in any other area (such as a BCA area). Information can be retrieved from the BCA area even when only the focus servo is established. That is why more accurate "any lacking DI?" information can be obtained more quickly in that case.

Also, when the DI that cannot be stored in the control information area is written on a different area, a space needs to be left for the DI in the area designated by the lacking DI storage location information 2102. Even so, if there were unused areas, those areas could be stuffed with dummy data or a particular kind of data such as zeros and the original areas could not be used effectively.

For that reason, it is preferred that in a different area from the control information area to store the DI, either a format that leaves a space for lacking DI even when there is no lacking DI and a format that does not leave any space for lacking DI unless there is any lacking DI be selectable. And a flag specifying one of these two formats may be included in the "any lacking DI?" information.

By storing the "any lacking DI?" information as is done in the preferred embodiment described above, if the predetermined control information area cannot leave a sufficient space for the DI, the shortage of space for the DI can be detected quickly and a space for the DI can be found elsewhere smoothly.

It should be noted that such a method of this preferred embodiment, in which "any lacking DI?" information is provided and in which the lacking information is stored elsewhere, is particularly effectively applicable to a situation where the control information area is consumed increasingly and a situation where a single writing condition should be stored separately as multiple pieces of DI.

As described above, information storage media may have so high densities in the near future that the write pulse information will be expanded and the size of the read/write control information will increase significantly. Or the number of storage layers included in a single information storage medium may increase so much as to increase the total size of the read/write control information. Or the rotational frequency of the motor and the writing speed patterns of the information storage medium may increase so much as to increase the total size of the read/write control information significantly. Even so, the read/write control information can still be retrieved appropriately from the information storage medium of the present invention described above. And user data can be written properly on the information storage medium based on the read/write control information retrieved.

The information storage medium of this preferred embodiment has multiple tracks, on which information is written by irradiating the tracks with pulses of a laser beam. More specifically, the information storage medium has an information storage area to store information and a control information area for use to perform a read/write operation. The control information area stores first and second kinds of control information. Information can be written by reference to either only the first kind of control information or both of the first and second kinds of control information.

As a result, the change of reading algorithms can be minimized between a situation where read/write control information is retrieved from an information storage medium with a conventional density and a situation where read/write control information is retrieved from an information storage medium with a high density.

Also, the information storage medium of this preferred embodiment has an information storage area to store information and a control information area for use to perform a read/write operation. Information is written on the information storage medium by irradiating the storage medium with a laser beam under at least two different sets of pulse application conditions, which are stored in the control information area. If the number of different sets of pulse application conditions of the laser beam for writing information is greater than that of the sets of pulse application conditions stored in the control information area, the control information area turns its flag on to indicate that not all of those pulse application conditions are included within the control information area.

In the near future, information storage media may have so high densities that the write pulse information will be expanded and the size of the read/write control information will increase significantly. Or the number of storage layers included in a single information storage medium may increase so much as to increase the total size of the read/write control information. Or the rotational frequency of the motor and the writing speed patterns of the information storage medium may increase so much as to increase the total size of the read/write control information significantly. Even so, the read/write control information can still be retrieved appropriately from the information storage medium of the present invention described above. And user data can be written properly on the information storage medium based on the read/write control information retrieved.

Embodiment 5

Examples of storage media to which the present invention is applicable include Blu-ray Disc (BD) and sundry other optical discs compliant with different standards. The first through fourth preferred embodiments of the present invention described above, however, are supposed to be applied to a BD, and the structure of a BD will be outlined below.

Main Parameters

BDs are classified according to the property of their recording film into various types. Examples of those various BDs include a BD-ROM (read-only), a BD-R (write-once), and a BD-RE (rewritable). And the present invention is applicable to any type of BD or an optical disc compliant with any other standard, no matter whether the storage medium is an R (write-once) or an RE (rewritable). Main optical constants and physical formats for Blu-ray Discs are disclosed in "Blu-ray Disc Reader" (published by Ohmsha, Ltd.) and on White Paper at the website of Blu-ray Disc Association (http://www.blu-raydisc.com), for example.

Specifically, as for a BD, a laser beam with a wavelength of approximately 405 nm (which may fall within the range of 400 nm to 410 nm supposing the tolerance of errors is ±5 nm with respect to the standard value of 405 nm) and an objective lens with an NA (numerical aperture) of approximately 0.85 (which may fall within the range of 0.84 to 0.86 supposing the tolerance of errors is ±0.01 with respect to the standard value of 0.85) are used. A BD has a track pitch of about 0.32 μm (which may fall within the range of 0.310 to 0.330 μm supposing the tolerance of errors is ±0.010 μm with respect to the standard value of 0.320 μm) and has one or two information storage layers. A BD has a single-sided single-layer or a single-sided dual-layer structure on the laser beam incident side, and its storage plane or storage layer is located at a depth of 75 μm to 100 μm as measured from the surface of the protective coating of the BD.

A write signal is supposed to be modulated by 17PP modulation technique. Recording marks are supposed to have the shortest mark length of 0.149 μm or 0.138 μm (which is the length of a 2T mark, where T is one cycle of a reference clock pulse and a reference period of modulation in a situation where a mark is recorded in accordance with a predetermined modulation rule), i.e., a channel bit length T of 74.50 nm or 69.00 nm. The BD has a storage capacity of 25 GB or 27 GB (more exactly, 25.025 GB or 27.020 GB) if it is a single-sided, single-layer disc but has a storage capacity of 50 GB or 54 GB (more exactly, 50.050 GB or 54.040 GB) if it is a single-sided, dual-layer disc.

The channel clock frequency is supposed to be 66 MHz (corresponding to a channel bit rate of 66.000 Mbit/s) at a standard BD transfer rate (BD 1×), 264 MHz (corresponding to a channel bit rate of 264.000 Mbit/s) at BD 4× transfer rate, 396 MHz (corresponding to a channel bit rate of 396.000 Mbit/s) at BD 6× transfer rate, and 528 MHz (corresponding to a channel bit rate of 528.000 Mbit/s) at BD 8× transfer rate.

And the standard linear velocity (which will also be referred to herein as "reference linear velocity" or "1×") is supposed to be 4.917 m/sec or 4.554 m/sec. The 2×, 4×, 6× and 8× linear velocities are 9.834 m/sec, 19.668 m/sec, 29.502 m/sec, and 39.336 m/sec, respectively. A linear velocity higher than the standard linear velocity is normally a positive integral number of times as high as the standard linear velocity. But the factor does not have to be an integer but may also be a positive real number. Optionally, a linear velocity that is lower than the standard linear velocity (such as a 0.5× linear velocity) may also be defined.

It should be noted that these parameters are those of single-layer or dual-layer BDs already on the market, which have a storage capacity of approximately 25 GB or approximately 27 GB per layer. To further increase the storage capacities of BDs, high-density BDs with a storage capacity of approximately 32 GB or approximately 33.4 GB per layer and three- or four-layer BDs have already been researched and developed. Hereinafter, exemplary applications of the present invention to such BDs will be described.

Structure with Multiple Information Storage Layers

For example, supposing the optical disc is a single-sided disc, from/on which information is read and/or written by having a laser beam incident on the protective coating (cover layer) side, if two or more information storage layers need to be provided, then those multiple information storage layers should be arranged between the substrate and the protective coating. An exemplary structure for such a multilayer disc is shown in FIG. 37. The optical disc shown in FIG. 37 has (n+1) information storage layers 2202 (where n is an integer that is more than zero). Specifically, in this optical disc, a cover layer 2201, (n+1) information storage layers (layers Ln through L0) 2202, and a substrate 2200 are stacked in this order on the surface on which a laser beam 2205 is incident. Also, between each pair of adjacent ones of the (n+1) information storage layers 2202, inserted as an optical buffering member is a spacer layer 2203. That is to say, the reference layer L0 may be arranged at the deepest level that is located at a predetermined depth from the light incident surface (i.e., at the greatest distance from the light source). Multiple information storage layers L1, L2, ... and Ln may be stacked one upon the other from over the reference layer L0 toward the light incident surface.

In this case, the depth of the reference layer L0 as measured from the light incident surface of the multi-layer disc may be equal to the depth (e.g., approximately 0.1 mm) of the only information storage layer of a single-layer disc as measured from the light incident surface. If the depth of the deepest layer (i.e., the most distant layer) is constant irrespective of the number of storage layers stacked (i.e., if the deepest layer of a multilayer disc is located at substantially the same distance as the only information storage layer of a single-layer disc), compatibility can be ensured in accessing the reference layer, no matter whether the given disc is a single-layer one or a multilayer one. In addition, even if the number of storage layers stacked increases, the influence of tilt will hardly increase. This is because although the deepest layer is affected by tilt most, the depth of the deepest layer of a multilayer disc is approximately the same as that of the only information storage layer of a single-layer disc, and never increases in this case even if the number of storage layers stacked is increased.

As for the beam spot moving direction (which will also be referred to herein as a "tracking direction" or a "spiral direction"), the optical disc may be either a parallel path type or an opposite path type.

In a disc of the parallel path type, the spot goes in the same direction on every layer, i.e., from some inner radial location toward the outer edge of the disc or from some outer radial location toward the inner edge of the disc on every information storage layer.

On the other hand, in a disc of the opposite path type, the spot moving directions are changed into the opposite one every time the layers to scan are changed from an information storage layer into an adjacent one. For example, if the spot on the reference layer L0 goes from some inner radial location toward the outer edge (which direction will be simply referred to herein as "outward"), then the spot on the information storage layer L1 will go from some outer radial location toward the inner edge (which direction will be simply referred to herein as "inward"), the spot on the information storage layer L2 will go outward, and so forth. That is to say, the spot on the information storage layer Lm (where m is either zero or an even number) will go outward but the spot on the information storage layer Lm+1 will go inward. Conversely, the spot on the information storage layer Lm (where m is either zero or an even number) will go inward but the spot on the information storage layer Lm+1 will go outward.

As for the thickness of the protective coating (cover layer), to minimize the influence of spot distortion due to either a decrease in focal length with an increase in numerical aperture NA or the tilt, the protective coating may have its thickness reduced. A numerical aperture NA is defined to be 0.45 for a CD, 0.65 for a DVD, but approximately 0.85 for a BD. For example, if the information storage medium has an overall thickness of approximately 1.2 mm, the protective coating may have a thickness of 10 μm to 200 μm. More specifically, a single-layer disc may include a transparent protective coating with a thickness of approximately 0.1 mm and a substrate with a thickness of approximately 1.1 mm. On the other hand, a dual-layer disc may include a protective coating with a thickness of approximately 0.075 mm, a spacer layer with a thickness of approximately 0.025 mm and a substrate with a thickness of approximately 1.1 mm. And if the disc has three or more information storage layers, the thickness(es) of the protective coating and/or the spacer layer can be further reduced.

Configurations for Single- to Four-Layer Discs

FIGS. 38, 39, 40 and 41 illustrate exemplary configurations for single-layer, dual-layer, three-layer and four-layer discs, respectively. As described above, if the distance from the light incident surface to the reference layer L0 is supposed to be constant, each of these discs may a total disc thickness of approximately 1.2 mm (but is more preferably 1.40 mm or less if there is a label printed) and the substrate 2200 may have a thickness of approximately 1.1 mm. That is why the distance from the light incident surface to the reference layer L0 will be approximately 0.1 mm. In the single-layer disc shown in FIG. 38 (i.e., if n=0 in FIG. 37), the cover layer 22011 has a thickness of approximately 0.1 mm. In the dual-layer disc shown in FIG. 39 (i.e., if n=1 in FIG. 37), the cover layer 22012 has a thickness of approximately 0.075 mm and the spacer layer 22032 has a thickness of approximately 0.025 mm. And in the three-layer disc shown in FIG. 40 (i.e., if n=2 in FIG. 37) and in the four-layer disc shown in FIG. 41 (i.e., if n=3 in FIG. 37), the cover layer 22013, 220014 and/or the spacer layer 22033, 22034 may be even thinner.

Optical Disc Manufacturing Process

Such a single- or multilayer disc (which will be referred to herein as a "disc with k storage layers" (where k is an integer that is equal to or greater than one)) may be made by the following manufacturing process:

Specifically, first of all, k storage layers, from which information can be read by being irradiated with a laser beam having a wavelength of 400 to 410 nm through an objective lens with a numerical aperture of 0.84 to 0.86, are formed on a substrate with a thickness of approximately 1.1 mm.

Next, (k−1) spacer layers are formed between the storage layers. In the case of a single-layer disc, k=1, k−1=0, and therefore, no spacer layers are formed.

Thereafter, a protective coating with a thickness of 0.1 mm or less is formed on the $k^{th}$ storage layer as counted from the substrate (i.e., the storage layer that is located most distant from the substrate if the disc is a multilayer disc).

During the process step of forming the storage layers, when an $i^{th}$ storage layer (where i is an odd number in the range of one to k) as counted from the substrate is formed, either concentric or spiral tracks are formed so that those tracks will be scanned from some inner radial location on the disc toward its outer edge. Also, when a $j^{th}$ storage layer (where j is an even number in the range of one to k) as counted from the substrate is formed, either concentric or spiral tracks are formed so that those tracks will be scanned from some outer radial location on the disc toward its inner edge. Since k=1 in a single-layer disc, the odd number i that falls within the range of one through k must be one if k=1. That is why in that case, only one storage layer is formed as the $i^{th}$ storage layer, and no $j^{th}$ storage layer will be formed because there is no even number j that falls within the range of one through k if k=1.

And various sorts of areas can be allocated to the tracks of each storage layer.

According to the present invention, the method for writing write pulse information, included in the control information, on a control information area as already described for the first through fourth preferred embodiments may also be carried out by performing the following manufacturing process, which is a method of making an information storage medium on which a data sequence is writable as a combination of marks and spaces, the method including the steps of:

stacking a substrate, an information storage layer, and a transparent protective coating in this order;

defining an information storage area to store information on the information storage layer;

defining a control information area to store control information, which is used to perform a read/write operation on the information storage layer; and writing the control information on the control information area, wherein the control information includes a first kind of write pulse information that includes information to be used as a reference value and a second kind of write pulse information that includes information to be used as an offset value, and wherein the size of the offset value is at least a half as large as that of the reference value, and/or wherein the control information includes a first kind of write pulse information including information to be used as a reference value and a second kind of write pulse information including information to be used as an offset value, and wherein if the pulse width or pulse position of a write pulse is definable with a precision of 1T/n (where T is a channel clock pulse width and n is a positive integer), the size of the offset value is large enough to define at least a 2/n range.

Optical Disc Reading Apparatus and Method

Information can be read from such a single- or multilayer disc (which will be referred to herein as a "disc with k storage layers" (where k is an integer that is equal to or greater than one)) by a player with a configuration to be described later.

The disc includes a substrate with a thickness of approximately 1.1 mm, k storage layers stacked on the substrate, k−1 spacer layers between the storage layers (but there are no spacer layers in a single-layer disc because k=1 and k−1=0), and a protective coating with a thickness of 0.1 mm or less, which has been arranged on the $k^{th}$ storage layer as counted from the substrate (i.e., the storage layer located most distant from the substrate if the disc is a multilayer disc). Each of those k storage layers has tracks, to at least one of which various areas can be allocated. And information can be read from each of those k storage layers by using an optical head that irradiates the disc with a laser beam having a wavelength of 400 to 410 nm through an objective lens with a numerical aperture of 0.84 to 0.86 and through the surface of the protective coating.

On an $i^{th}$ storage layer (where i is an odd number in the range of one to k) as counted from the substrate, either concentric or spiral tracks are formed. And by getting the scanning direction controlled by a control section that scans the disc from some inner radial location toward its outer edge, information can be read from the $i^{th}$ storage layer.

On the other hand, on a $j^{th}$ storage layer (where j is an odd number in the range of one to k) as counted from the substrate, either concentric or spiral tracks are formed. And by getting the scanning direction controlled by a control section that scans the disc from some outer radial location toward its inner edge, information can be read from the $j^{th}$ storage layer.

According to the present invention, a method for reading information from either an information storage medium on which the write pulse information as already described for the first through fourth preferred embodiments of the present invention is stored or an information storage medium made by the manufacturing process described above includes the steps of:

irradiating the information storage area with a laser beam; and reading a data sequence that has been written on the information storage area using a write waveform that has been adjusted by reference to the first and second kinds of write pulse information included in the control information.

Modulation Technique

Next, it will be described how to modulate a write signal. In writing data (which may be original source data or binary data yet to be modulated) on a storage medium, the data is divided into multiple sections of a predetermined size, each of those data sections of the predetermined size is further divided into a number of frames having a predetermined length, and then a predetermined sync code and/or sync code sequence is/are inserted into each frame (in a frame sync area). Then, the data that has been subdivided into those frames is written as a data code sequence that has been modulated following a predetermined modulation rule that matches the read/write signal characteristic of the storage medium (in a frame data area).

In this case, the modulation rule may be RLL (run length limited) coding technique that limits the mark length, for example. If the RLL coding technique is represented as RLL (d, k), where d and k are natural numbers that satisfy d<k, it means that the minimum number of zeros appearing between two ones is equal to d and the maximum number thereof is k. For example, where d=1 and k=7 and if T represents one reference modulation cycle, the recording marks and spaces will have the shortest length of 2T and the greatest length of 8T. Optionally, this RLL (1, 7) modulation technique may also be modified into 1-7 PP modulation technique with the following features [1] and [2] introduced. In 1-7 PP, PP is the acronym of Parity preserve/Prohibit repeated minimum transition length. Specifically, the feature [1] lies in "Parity preserve", representing the first P, which means that the parity of the number of source data bits "1" yet to be modulated agrees with that of the number of ones of the modulated bit pattern. The second feature [2] is determined by the latter P (i.e., Prohibit repeated minimum transition length), which refers to a scheme for limiting the number of times of repetition of the shortest marks and spaces on a modulated write waveform.

For example, the number of times of repetition of 2T may be defined to be at most six times.

According to the various formats and schemes described above, if the storage density increased anywhere, then there could be multiple different storage densities. However, depending on the difference in storage density, some of them may be adopted but others need not be adopted to use a different format or scheme.

Embodiment 6

FIG. 42 illustrates the physical structure of an optical disc 1 according to this preferred embodiment. On the disklike optical disc 1, a lot of tracks 2 are arranged either concentrically or spirally. And each of those tracks 2 is subdivided into a lot of sectors. As will be described later, data is supposed to be written on each of those tracks 2 on the basis of a block 3 of a predetermined size.

The optical disc 1 of this preferred embodiment has a greater storage capacity per information storage layer than a conventional optical disc (such as a 25 GB BD). The storage capacity is increased by increasing the storage linear density, e.g., by shortening the mark length of recording marks to be left on the optical disc, for example. As used herein, "to increase the storage linear density" means shortening the channel bit length, which is a length corresponding to one cycle time T of a reference clock signal (i.e., a reference cycle time T of modulation in a situation where marks are recorded by a predetermined modulation rule). The optical disc 1 may have multiple information storage layers. In the following description, however, only one information storage layer thereof will be described for convenience sake. In a situation where there are multiple information storage layers in the same optical disc, even if the tracks have the same width between the respective information storage layers, the storage linear densities could also be different from one layer to another by uniformly varying the mark lengths on a layer-by-layer basis.

Each track 2 is divided into a lot of blocks every 64 kB (kilobytes), which is the data storage unit. And those blocks are given sequential block addresses. Each of those blocks is subdivided into three subblocks, each having a predetermined length. The three subblocks are assigned subblock numbers of 0, 1 and 2 in this order.

Storage Density

Hereinafter, the storage density will be described with reference to FIGS. 43, 44, and 45.

FIG. 43(A) illustrates an example of a 25 GB BD, for which the laser beam 123 is supposed to have a wavelength of 405 nm and the objective lens 220 is supposed to have a numerical aperture (NA) of 0.85.

As in a DVD, data is also written on the track 2 of a BD as a series of marks 2320, 2321 that are produced as a result of a physical variation. The shortest one of this series of marks will be referred to herein as the "shortest mark". In FIG. 43(A), the mark 2321 is the shortest mark.

In a BD with a storage capacity of 25 GB, the shortest mark 2321 has a physical length of 0.149 μm, which is approximately 1/2.7 of the shortest mark of a DVD. And even if the resolution of a laser beam is increased by changing the parameters of an optical system such as the wavelength (405 nm) and the NA (0.85), this value is still rather close to the limit of optical resolution, below which recording marks are no longer sensible for the light beam.

FIG. 44 illustrates a state where a light beam spot has been formed on the series of recording marks on the track. In a BD, the light beam spot 2330 has a diameter of approximately 0.39 μm, which may vary with parameters of the optical system. If the storage linear density is increased without changing the structures of the optical system, then the recording marks will shrink for the same spot size of the light beam spot 2330 and the read resolution will decrease.

On the other hand, FIG. 43(B) illustrates an example of an optical disc with an even higher storage density than a 25 GB BD. But even for such a disc, the laser beam 2323 is also supposed to have a wavelength of 405 nm and the objective lens 2420 is also supposed to have a numerical aperture (NA) of 0.85. Among the series of marks 2324, 2325 of such a disc, the shortest mark 2325 has a physical length of 0.1115 μm. Compared to FIG. 43(A), the spot size remains approximately 0.39 μm but both the recording marks and the interval between the marks have shrunk. As a result, the read resolution will decrease.

The shorter a recording mark, the smaller the amplitude of a read signal to be generated when the recording mark is scanned with a light beam. And the amplitude goes zero when the mark length gets equal to the limit of optical resolution. The inverse number of one period of these recording marks is called a "spatial frequency" and a relation between the spatial frequency and the signal amplitude is called an "optical transfer function (OTF)". As the spatial frequency rises, the signal amplitude decreases almost linearly. And the readable limit at which the amplitude of the signal goes zero is called an OTF cutoff.

FIG. 45 is a graph showing how the OTF of a BD with a storage capacity of 25 GB changes with the shortest recording mark length. The spatial frequency of the shortest mark on a BD is approximately 80% of, and is rather close to, the OTF cutoff frequency. It can also be seen that a read signal representing the shortest mark has amplitude that is as small as approximately 10% of the maximum detectable amplitude. The storage capacity at which the spatial frequency of the shortest mark on a BD is very close to the OTF cutoff frequency (i.e., the storage capacity at which the read signal has almost no amplitude) corresponds to approximately 31 GB in a BD. When the frequency of the read signal representing the shortest mark comes close to, or exceeds, the OTF cutoff frequency, the limit of optical resolution may have been reached or even surpassed for the laser beam. As a result, the read signal comes to have decreased amplitude and the SNR drops steeply.

That is why the high storage density optical disc shown in FIG. 43(B) would have its storage linear density defined by the frequency of the read signal representing the shortest mark, which may be in the vicinity of the OTF cutoff frequency (i.e., it is lower than, but not significantly lower than, the OTF cutoff frequency) or higher than the OTF cutoff frequency.

FIG. 46 is a graph showing how the signal amplitude changes with the spatial frequency in a situation where the spatial frequency of the shortest mark (2T) is higher than the OTF cutoff frequency and where the 2T read signal has zero amplitude. In FIG. 46, the spatial frequency of the shortest mark 2T is 1.12 times as high as the OTF cutoff frequency.

Relation Between Wavelength, NA and Mark Length

A disc B with high storage density needs to satisfy the following relation between the wavelength, the numerical aperture, and the mark/space lengths.

Supposing the shortest mark length is TM nm and the shortest space length is TS nm, the sum P of the shortest mark length and the shortest space length is (TM+TS) nm. In the case of 17 modulation, P=2T+2T=4T. Using the three parameters of the wavelength λ of the laser beam (which is 405 nm±5 nm, i.e., in the range of 400 nm to 410 nm), the numerical aperture NA (which is 0.85±0.01, i.e., in the range of 0.84 to 0.86) and the sum P of the shortest mark length and the shortest space length (where P=2T+2T=4T in the case of 17 modulation, in which the shortest length is 2T), if the unit length T decreases to the point that the inequality $$P \leq \lambda/2NA$$

is satisfied, then the spatial frequency of the shortest mark exceeds the OTF cutoff frequency.

If NA=0.85 and λ=405, then the unit length T corresponding to the OTF cutoff frequency is calculated by $$T=405/(2\times 0.85)/4=59.558 \text{ nm}$$

Conversely, if P>λ/2NA is satisfied, then the spatial frequency of the shortest mark becomes lower than the OTF cutoff frequency.

As can be seen easily, just by increasing the storage linear density, the SNR would decrease due to the limit of optical resolution. That is why if the number of information storage layers per disc were increased excessively, then the decrease in SNR might be an intolerable degree, considering the system margin. Particularly around a point where the frequency of the shortest recording mark exceeds the OTF cutoff frequency, the SNR will start to decrease steeply.

In the foregoing description, the storage linear density has been described by comparing the frequency of the read signal representing the shortest mark to the OTF cutoff frequency. However, if the storage density of BDs is further increased, then the storage density (and the storage linear density and the storage capacity) can be defined based on the same principle as what has just been described by reference to the relation between the frequency of the read signal representing the second shortest mark (or the third shortest mark or an even shorter recording mark) and the OTF cutoff frequency.

Storage Density and Number of Layers

A BD, of which the specifications include a wavelength of 405 m and a numerical aperture of 0.85, may have one of the following storage capacities per layer. Specifically, if the spatial frequency of the shortest marks is in the vicinity of the OTF cutoff frequency, the storage capacity could be approximately equal to or higher than 29 GB (such as 29.0 GB±0.5 GB or 29 GB±1 GB), approximately equal to or higher than 30 GB (such as 30.0 GB±0.5 GB or 30 GB±1 GB), approximately equal to or higher than 31 GB (such as 31.0 GB±0.5 GB or 31 GB±1 GB), or approximately equal to or higher than 32 GB (such as 32.0 GB±0.5 GB or 32 GB±1 GB).

On the other hand, if the spatial frequency of the shortest marks is equal to or higher than the OTF cutoff frequency, the storage capacity per layer could be approximately equal to or greater than 32 GB (such as 32.0 GB±0.5 GB or 32 GB±1 GB), approximately equal to or greater than 33 GB (such as 33.0 GB±0.5 GB or 33 GB±1 GB), approximately equal to or greater than 33.3 GB (such as 33.3 GB±0.5 GB or 33.3 GB±1 GB), approximately equal to or greater than 33.4 GB (such as 33.4 GB±0.5 GB or 33.4 GB±1 GB), approximately equal to or greater than 34 GB (such as 34.0 GB±0.5 GB or 34 GB±1 GB) or approximately equal to or greater than 35 GB (such as 35.0 GB±0.5 GB or 35 GB±1 GB).

Particularly, if the storage density per layer is approximately 33.3 GB, an overall storage capacity of approximately 100 GB (more exactly, 99.9 GB) is realized by the three storage layers combined. On the other hand, if the storage density per layer is 33.4 GB, an overall storage capacity that is more than 100 GB (more exactly, 100.2 GB) is realized by the three storage layers combined. Such a storage capacity is almost equal to the capacity in a situation where four storage layers, each having a storage density of 25 GB, are provided for a single BD. For example, if the storage density per layer is 33 GB, the overall storage capacity is 33×3=99 GB, which is just 1 GB (or less) smaller than 100 GB. On the other hand, if the storage density per layer is 34 GB, the overall storage capacity is 34×3=102 GB, which is 2 GB (or less) larger than 100 GB. Furthermore, if the storage density per layer is 33.3 GB, the overall storage capacity is 33.3×3=99.9 GB, which is only 0.1 GB (or less) smaller than 100 GB. And if the storage density per layer is 33.4 GB, the overall storage capacity is 33.4×3=100.2 GB, which is just 0.2 GB (or less) larger than 100 GB.

It should be noted that if the storage density were increased significantly, then it would be difficult to perform a read operation accurately because the shortest marks should be read under rather severe conditions. That is why a realistic storage density that would realize an overall storage capacity of 100 GB or more without increasing the storage density too much would be approximately 33.4 GB per layer.

In this case, the optical disc may have either a four-layer structure with a storage density of 25 GB per layer or a three-layer structure with a storage density of 33-34 GB per layer. If the number of information storage layers stacked in a disc is increased, however, the read signal obtained from each of those layers will have decreased amplitude (or a decreased SNR) and stray light will also be produced from those layers (i.e., the read signal obtained from each information storage layer will be affected by a signal obtained from an adjacent layer). For that reason, if a three-layer disc with a storage density of 33-34 GB per layer is adopted instead of a four-layer disc with a storage density of 25 GB per layer, then an overall storage capacity of approximately 100 GB will be realized by the smaller number of layers (i.e., three instead of four) with the influence of such stray light minimized. That is why a disc manufacturer who'd like to realize an overall storage capacity of approximately 100 GB while minimizing the number of information storage layers stacked would prefer a three-layer disc with a storage density of 33-34 GB per layer. On the other hand, a disc manufacturer who'd like to realize an overall storage capacity of approximately 100 GB using the conventional format as it is (i.e., a storage density of 25 GB per layer) could choose a four-layer disc with a storage density of 25 GB per layer. In this manner, manufacturers with different needs could achieve their goals using mutually different structures, and, and therefore, are afforded an increased degree of flexibility in disc design.

Alternatively, if the storage density per layer is in the 30-32 GB range, the overall storage capacity of a three-layer disc will be short of 100 GB (i.e., approximately 90-96 GB) but that of a four-layer disc will be 120 GB or more. Among other things, if the storage density per layer is approximately 32 GB, a four-layer disc will have an overall storage capacity of approximately 128 GB, which is the seventh power of two that would be processed easily and conveniently by a computer. On top of that, compared to the overall storage capacity of approximately 100 GB realized by a three-layer disc, even shortest marks could also be read under less severe conditions.

That is why when the storage density needs to be increased, a number of different storage densities per layer (such as approximately 32 GB and approximately 33.4 GB) are preferably offered as multiple options so that a disc manufacturer can design a disc more flexibly by adopting one of those multiple storage densities and any number of storage layers in an arbitrary combination. For example, a manufacturer who'd like to increase the overall storage capacity while minimizing the influence of multiple layers stacked is offered an option of making a three-layer disc with an overall storage capacity of approximately 100 GB by stacking three storage layers with a storage density of 33-34 GB per layer. On the other hand, a manufacturer who'd like to increase the overall storage capacity while minimizing the impact on read performance is offered an option of making a four-layer disc with an overall storage capacity of approximately 120 GB or more by stacking four storage layers with a storage density of 30-32 GB per layer.

It should be noted that the write waveforms described above are just examples. That is to say, the first through fifth preferred embodiments of the present invention described above are not limited to only those write waveforms. Instead, the present invention is also applicable to other types of write waveforms. Hereinafter, the three alternative write waveforms mentioned above (namely, N−1, N/2 and castle write strategies) will be described complementarily.

Generally speaking, a write operation is performed on an optical disc by modulating data to be written (i.e., source data) following a predetermined modulation rule to generate multiple modulated recording code patterns, irradiating the disc with pulsed light beams, and making recording marks and spaces (to be left between the recording marks), each having a length corresponding to that of an associated one of the multiple modulated recording code patterns. Hereinafter, three write strategies will be described as exemplary write waveforms on which those pulsed light beams are generated. In each of FIGS. 47 through 49, the shortest mark is supposed to have a length of 2T (where T is one reference cycle time of a reference clock and modulation) for the sake of convenience. However, the shortest mark does not have to have a length of 2T.

N−1 Type Write Strategy

FIG. 47 illustrates a first type of write waveforms. Each write waveform of this first type has a multi-pulse-type strategy (i.e., includes multiple pulses), and consists of a first pulse (with a width Ttop) to be arranged earlier than any other one of the multiple pulses, a last pulse (with a width Tlp) to be arranged at the very last, and middle pulses (with a width Tmp) interposed between the first and last pulses. Among the recording-power-related parameters, Pw represents the recording power, Pbw represents the bottom power, Pc represents the cooling power, and Ps and Pe represent the bias power. More specifically, Ps represents a space power in a write-once disc and Pe represents an erase power in a rewritable disc.

The write waveform to record the shortest mark (2T) has no last pulse or middle pulses. The write waveform to record the second shortest mark (3T) has no middle pulses. The middle pulses start to be included in the write waveform to record the third shortest mark (4T). And every time the length increases by 1T, the number of middle pulses increases by one. This first type of write waveform is partly characterized in that a write waveform to record an nT mark (where n is a natural number) has (n−1) pulses.

In this case, the various types of parameters may be defined by classifying the lengths of the recording marks and their adjacent spaces in the following manner.

First of all, dTtop and Ttop representing the leading edge position and width of the first pulse may be defined by classifying the lengths of the recording marks into the three categories of "2T", "3T" and "4T or more" and/or classifying the lengths of adjacent preceding spaces into the four categories of "2T", "3T", "4T" and "5T or more".

Also, Tlp representing the width of the last pulse may be defined by classifying the lengths of the recording marks into the two categories of "3T" and "4T or more".

Furthermore, dTs marking the end point of the cooling power level Pc (or the start point of the bias power level Ps or Pe) may be defined by classifying the lengths of the recording marks into the three categories of "2T", "3T" and "4T or more".

N/2 Type Write Strategy

FIG. 48 illustrates a second type of write waveforms. Each write waveform of this second type also has a multi-pulse-type strategy. The write waveforms to record the shortest mark (2T) and the second shortest mark (3T) have no last pulse or middle pulses. The write waveforms to record the third shortest mark (4T) and the fourth shortest mark (5T) have no middle pulses. The middle pulses start to be included in the write waveform to record the fifth shortest mark (6T). And every time the length increases by 2T, the number of middle pulses increases by one. This second type of write waveform is partly characterized in that a write waveform to record an mT mark (where m is a natural number) is the quotient of (m÷2).

In this case, the various types of parameters may be defined by classifying the lengths of the recording marks in the following manner.

First of all, dTtop and Ttop representing the leading edge position and width of the first pulse may be defined by classifying the lengths of the recording marks into the four categories of "2T", "3T", "4T, 6T or 8T" and "5T, 7T or 9T".

Also, dTmp representing the leading edge position of the middle pulses may be defined by classifying the lengths of the recording marks into the two categories of "6T or 8T" and "7T or 9T". Furthermore, the leading edge position may agree with that of the reference clock pulse in the former category and may shift from that of the reference clock pulse by T/2 in the latter category.

Furthermore, dTlp and Tlp representing the position and width of the leading edge of the last pulse may be defined by classifying the lengths of the recording marks into the two categories of "4T, 6T or 8T" and "5T, 7T or 9T". Optionally, the leading edge position dTlp may agree with that of the reference clock pulse in the former category and may shift from that of the reference clock pulse by T/2 in the latter category.

Furthermore, dTs marking the end point of the cooling power level Pc (or the start point of the bias power level Ps or Pe) may be defined by classifying the lengths of the recording marks into the four categories of "2T", "3T", "4T, 6T or 8T" and "5T, 7T or 9T".

Castle Type Write Strategy

FIG. 49 illustrates a third type of write waveforms. Unlike the first and second types of write waveforms with the multi-pulse-type strategy, each waveform of this third type is shaped such that the power level between pulses, for which the recording powers Pw are set, does not decrease to the bottom power Pbw but is maintained at a certain intermediate power level Pm. That is to say, the write waveform of this third type has a castle-type write strategy, and also consists of a first pulse (with a width Ttop) to be arranged at the top, a last pulse (with a width Tlp) to be arranged at the very last, and a middle pulse interposed between the first and last pulses. Among the recording-power-related parameters, Pw represents the recording power, Pm represents the intermediate power, Pc represents the cooling power, and Ps and Pe represent the bias power. More specifically, Ps represents a space power in a write-once disc and Pe represents an erase power in a rewritable disc.

The write waveform to record the shortest mark (2T) has no last pulse or middle pulse. The write waveform to record the second shortest mark (3T) have no last pulse. The last and middle pulses start to be both included in the write waveform to record the third shortest mark (4T). In each write waveform to make a recording mark of 3T or more, the end point of the first pulse agrees with the start point of the middle pulse. And in each write waveform to make a recording mark of 4T or more, the end point of the middle pulse agrees with the start point of the last pulse.

It should be noted that such a castle type strategy may have any of several shapes.

One of them is a so-called "castle shape". Specifically, in the castle shape, the write waveform to make a recording mark consists of only one write pulse and has a shape that includes a first interval that begins with the leading edge of the write pulse and that defines a first power level (i.e., the recording power Pw), a second interval that begins with the end point of the first interval and that defines a second power level (i.e., the intermediate power Pm) that is lower than the first power level, and a third interval that begins with the end point of the second interval and that defines a power level that is higher than the second power level but is as high as, or lower than, the first power level (i.e., the recording power Pw). An L shape write waveform, having a shape in which the power level of the third interval is as high as that of the second interval, is also known. Furthermore, a mono-pulse write waveform, having a shape in which the first, second and third intervals all have the same power level, is also known.

In the example illustrated in FIG. 49, the power levels of the first and third intervals are supposed to be equal to each other to avoid complicating the description overly. Naturally, however, mutually different levels may be set for these two intervals, too. In any case, in the foregoing description, a portion of this write pulse for which the power level of the first interval is defined is called a "first pulse", another portion of the write pulse for which the power level of the second interval is defined a "middle pulse", and the other portion of the write pulse for which the power level of the third interval is defined a "last pulse". Thus, this naming (i.e., the first, middle and last pulses) will be used continuously for the rest of the description.

In this case, the various types of parameters may be defined by classifying the lengths of the recording marks and their adjacent spaces in the following manner.

First of all, dTtop and Ttop representing the leading edge position and width of the first pulse may be defined by classifying the lengths of the recording marks into the three categories of "2T", "3T" and "4T or more" and/or classifying the lengths of adjacent preceding spaces into the three categories of "2T", "3T", and "4T or more".

Also, Tlp representing the width of the last pulse may be defined by regarding the lengths of the recording marks to be "4T or more". That is to say, every recording mark including the last pulse and having a length of 4T or more may have the same width.

Furthermore, dTc marking the start point of the cooling power level Pc may be defined by classifying the lengths of the recording marks into the three categories of "3T", "4T" and "5T or more".

Furthermore, dTs marking the end point of the cooling power level Pc (i.e., the start point of the bias power level Ps or Pe) may be defined by classifying the lengths of the recording marks into the three categories of "2T", "3T" and "4T or more".

In the example described above, the classification is supposed to be done according to a different standard for convenience sake from the one used in the present invention. For example, the classification is supposed to be done according to either only the lengths of recording marks or the length of each recording mark and that of one of the two spaces adjacent to that recording mark in combination. Naturally, however, the classification could also be done according to the exemplary standard adopted in the present invention.

Optionally, the classification may also be done differently according to the storage density (which may be 25 GB per storage layer, 32 GB per storage layer and/or 33.4 GB per storage layer) or the type of the given storage medium (which may be read-only, write-once or rewritable).

It should be noted that when each pulse and/or each power level are defined, the position and width thereof could be adjusted with a step of T/16 (or with an even finer step of T/32) in any of the first to third types of write waveforms. And this adjustment step could be varied according to the storage density (which may be 25 GB per storage layer, 32 GB per storage layer and/or 33.4 GB per storage layer) or the type of the given storage medium (which may be write-once or rewritable).

As for the relation between these types of write waveforms and writing speeds, it could be said that the second type of write waveform is more suitable for high-speed writing than the first type and that the third type of write waveform is more suitable for high-speed writing than the second type. This is because the second type of write waveform would require more frequent application of the recording power Pw (i.e., would take a greater total amount of time to make the pulses rise and fall) than the third type of write waveform, thus delaying the high-speed processing more significantly. Considering this point, the writing conditions may be stored on an optical disc in the following manner.

First of all, if writing conditions for a 1× writing speed (i.e., the standard writing speed) are stored, parameters about the first type of write waveform may be stored as indispensable ones but parameters about the second type of write waveform could be stored optionally. Also, if the writing speed is 1×, the third type of write waveform may not be used, for example.

Also, if writing conditions for a 2× writing speed are stored, parameters about the first, second and third types of write waveforms could be stored optionally. In that case, parameters about at least one of the first and second types of write waveforms should be stored as indispensable ones.

Furthermore, if writing conditions for a 4× writing speed are stored, parameters about the third type of write waveform may be stored as indispensable ones. Also, if the writing speed is 4×, the first and second types of write waveforms may not be used, for example.

Furthermore, if writing conditions for a 6× writing speed are stored, parameters about the third type of write waveform may be stored as indispensable ones. Also, if the writing speed is 6×, the first and second types of write waveforms may not be used, for example.

Furthermore, if writing conditions for an 8× or higher writing speed are stored, the same rule as the 4× and 6× writing speeds may be applied. That is to say, parameters about the third type of write waveform may be stored as indispensable ones but the first and second types of write waveforms may not be used for a writing speed of 6×, for example.

On top of that, when those writing conditions are stored, the contents to be stored may or may not be the same depending on whether the given disc is an HTL (high to low) one (i.e., having a lower reflectance in its recorded portions than in its unrecorded portions) or an LTH (low to high) one (i.e., having a higher reflectance in its recorded portions than in its unrecorded portions).

The present invention is applicable particularly effectively to the field of technology for getting high-density writing done on information storage media.

Also, according to the present invention, even if the size of the read/write control information increases significantly as the storage densities and the number of storage layers per storage medium rise year by year, the read/write control information can still be retrieved properly. As a result, there is much less need to run a risk of changing disc formats, thus contributing to realizing general-purpose high-density information storage media.

On top of that, according to the present invention, even if there is a mix of information storage media on which a write operation is supposed to be performed at a conventional density and information storage medium on which a write operation is supposed to be performed at a high density, the difference in algorithm for retrieving the DI can be minimized. Consequently, the present invention contributes greatly to realizing high-density information storage media.

What is claimed is:

1. An information storage medium on which a data sequence is writable as a combination of marks and spaces,
   wherein the information storage medium has at least one information storage layer, and
   wherein the at least one information storage layer has an information storage area to store information and a control information area for use to perform a read/write operation on the at least one information storage layer, and
   wherein the control information area stores at least one set of control information, and
   wherein the at least one set of control information includes a first kind of write pulse information including information to be used as a reference value and a second kind of write pulse information including information to be used as an offset value,
   wherein the size of the offset value is at least a half as large as that of the reference value,
   wherein the reference value represents one of:
      a value representing width of a write pulse, or
      magnitude of delay of the write pulse with respect to a channel clock pulse, and
   wherein the offset value represents one of:
      a difference between width of a write pulse and the reference value; or
      a difference between magnitude of delay of the write pulse with respect to a channel clock pulse and the reference value.

2. The information storage medium of claim 1, wherein the first kind of write pulse information includes information to be used as a reference value for a write pulse, of which the preceding or succeeding space has a length of 5T or more (where T is a channel clock pulse width).

3. The information storage medium of claim 1, wherein the first kind of write pulse information defines information to be used as at least one reference value at any mark length that is at most equal to mT (where m is an integer).

4. The information storage medium of claim 1, wherein the second kind of write pulse information defines information to be used as offset values that have been classified according to the lengths of the preceding and succeeding spaces for only the shortest mark.

5. A method for writing information on the information storage medium of claim 1, the method comprising the steps of:
   retrieving the control information from the control information area;
   adjusting a write waveform for performing a write operation on the information storage area by reference to the first and second kinds of write pulse information that are included in the control information retrieved; and
   writing a data sequence on the information storage area using the write waveform adjusted.

6. A method for reading information from the information storage medium of claim 1, the method comprising the steps of:
   irradiating the information storage area with a laser beam; and
   reading a data sequence that has been written on the information storage area using a write waveform that has been adjusted by reference to the first and second kinds of write pulse information included in the control information.

7. A method of making an information storage medium on which a data sequence is writable as a combination of marks and spaces, the method comprising the steps of:
   stacking an information storage layer on a substrate and then stacking a transparent protective coating on the information storage layer;
   defining an information storage area to store information on the information storage layer;
   defining a control information area to store control information, which is used to perform a read/write operation on the information storage layer; and
   writing the control information on the control information area,
   wherein the control information includes a first kind of write pulse information that includes information to be used as a reference value and a second kind of write pulse information that includes information to be used as an offset value,
   wherein the size of the offset value is at least a half as large as that of the reference value,
   wherein the reference value represents one of:
      a value representing width of a write pulse, or
      magnitude of delay of the write pulse with respect to a channel clock pulse, and
   wherein the offset value represents one of:
      a difference between width of a write pulse and the reference value; or
      a difference between magnitude of delay of the write pulse with respect to a channel clock pulse and the reference value.

8. A method for writing information on an information storage medium made by the method of claim 7, the method comprising the steps of:
   retrieving the control information from the control information area;
   adjusting a write waveform for performing a write operation on the information storage area by reference to the first and second kinds of write pulse information that are included in the control information retrieved; and
   writing a data sequence on the information storage area using the write waveform adjusted.

9. A method for reading information from an information storage medium made by the method of claim 7, the method comprising the steps of:
- irradiating the information storage area with a laser beam; and
- reading a data sequence that has been written on the information storage area using a write waveform that has been adjusted by reference to the first and second kinds of write pulse information included in the control information.

10. An information storage medium on which a data sequence is writable as a combination of marks and spaces,
- wherein the information storage medium has at least one information storage layer, and
- wherein the at least one information storage layer has an information storage area to store information and a control information area for use to perform a read/write operation on the at least one information storage layer, and
- wherein the control information area stores at least one set of control information, and
- wherein the at least one set of control information includes a first kind of write pulse information including information to be used as a reference value and a second kind of write pulse information including information to be used as an offset value,
- wherein if the pulse width or pulse position of a write pulse is definable with a precision of 1T/n (where T is a channel clock pulse width and n is a positive integer), the size of the offset value is large enough to define at least a n/2 range,
- wherein the reference value represents one of:
  - a value representing width of a write pulse, or
  - magnitude of delay of the write pulse with respect to a channel clock pulse, and
- wherein the offset value represents one of:
  - a difference between width of a write pulse and the reference value; or
  - a difference between magnitude of delay of the write pulse with respect to a channel clock pulse and the reference value.

11. The information storage medium of claim 10, wherein the first kind of write pulse information includes information to be used as a reference value for a write pulse, of which the preceding or succeeding space has a length of 5T or more (where T is a channel clock pulse width).

12. The information storage medium of claim 10, wherein the first kind of write pulse information defines information to be used as at least one reference value at any mark length that is at most equal to mT (where m is an integer).

13. The information storage medium of claim 10, wherein the second kind of write pulse information defines information to be used as offset values that have been classified according to the lengths of the preceding and succeeding spaces for only the shortest mark.

14. A method for writing information on the information storage medium of claim 10, the method comprising the steps of:
- retrieving the control information from the control information area;
- adjusting a write waveform for performing a write operation on the information storage area by reference to the first and second kinds of write pulse information that are included in the control information retrieved; and
- writing a data sequence on the information storage area using the write waveform adjusted.

15. A method for reading information from the information storage medium of claim 10, the method comprising the steps of:
- irradiating the information storage area with a laser beam; and
- reading a data sequence that has been written on the information storage area using a write waveform that has been adjusted by reference to the first and second kinds of write pulse information included in the control information.

16. A method of making an information storage medium on which a data sequence is writable as a combination of marks and spaces, the method comprising the steps of:
- stacking an information storage layer on a substrate and then stacking a transparent protective coating on the information storage layer;
- defining an information storage area to store information on the information storage layer;
- defining a control information area to store control information, which is used to perform a read/write operation on the information storage layer; and
- writing the control information on the control information area,
- wherein the control information includes a first kind of write pulse information that includes information to be used as a reference value and a second kind of write pulse information that includes information to be used as an offset value,
- wherein if the pulse width or pulse position of a write pulse is definable with a precision of 1T/n (where T is a channel clock pulse width and n is a positive integer), the size of the offset value is large enough to define at least a n/2 range,
- wherein the reference value represents one of:
  - a value representing width of a write pulse, or
  - magnitude of delay of the write pulse with respect to a channel clock pulse, and
- wherein the offset value represents one of:
  - a difference between width of a write pulse and the reference value; or
  - a difference between magnitude of delay of the write pulse with respect to a channel clock pulse and the reference value.

17. A method for writing information on an information storage medium made by the method of claim 16, the method comprising the steps of:
- retrieving the control information from the control information area;
- adjusting a write waveform for performing a write operation on the information storage area by reference to the first and second kinds of write pulse information that are included in the control information retrieved; and
- writing a data sequence on the information storage area using the write waveform adjusted.

18. A method for reading information from an information storage medium made by the method of claim 16, the method comprising the steps of:
- irradiating the information storage area with a laser beam; and
- reading a data sequence that has been written on the information storage area using a write waveform that has been adjusted by reference to the first and second kinds of write pulse information included in the control information.

* * * * *